(12) United States Patent
Koga et al.

(10) Patent No.: US 6,470,015 B1
(45) Date of Patent: Oct. 22, 2002

(54) SYSTEM AND DEVICE FOR PREVENTING WIRETAP

(75) Inventors: Masayuki Koga; Akihisa Erami, both of Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/153,844

(22) Filed: Sep. 15, 1998

(30) Foreign Application Priority Data

Mar. 20, 1998 (JP) .......................................... 10-071816

(51) Int. Cl.⁷ .......................... H04L 9/00; H04L 12/28; H04K 1/00
(52) U.S. Cl. .................... 370/395.1; 370/397; 713/153; 713/200; 380/255; 380/42
(58) Field of Search ................................ 370/394, 389, 370/395.1, 397; 713/200–201, 150, 153, 160, 162, 165, 187, 190; 380/255, 37, 42

(56) References Cited

U.S. PATENT DOCUMENTS 5,757,922 A * 5/1998 Shiroshita ..................... 380/37
6,052,786 A * 4/2000 Tsuchida ..................... 713/201
6,205,142 B1 * 3/2001 Vallee ......................... 370/394

FOREIGN PATENT DOCUMENTS

JP 9-162876 6/1997

* cited by examiner

Primary Examiner—Wellington Chin
Assistant Examiner—Maikhanh Tran
(74) Attorney, Agent, or Firm—Katten Muchin Zavis Rosenman

(57) ABSTRACT

A transmitting sequence changing/restoring unit receives, from an ATM control unit, ATM cells stored with the transmitting target information in a segmented state. The transmitting sequence changing/restoring unit groups the cells of this cell string by fours, adds the synchronous cell to the head each group, and changes the sequence thereof. The respective cells are transferred in the changed sequence in sections ranging from the transmitting sequence changing/restoring unit of the transmitting-side ATM node to the unit of the receiving-side ATM node. Accordingly, even if the ATM cell string is intercepted by the third part in this section, this third party cannot reproduce the original transmitting target information. The transmitting sequence changing/restoring unit of the receiving-side ATM node is capable of recognizing where the groups of the received cell string are delimited based on the synchronous cells and restoring the sequence of the ATM cells within the thus recognized group, whereby the transmitting target information can be reproduced.

20 Claims, 38 Drawing Sheets

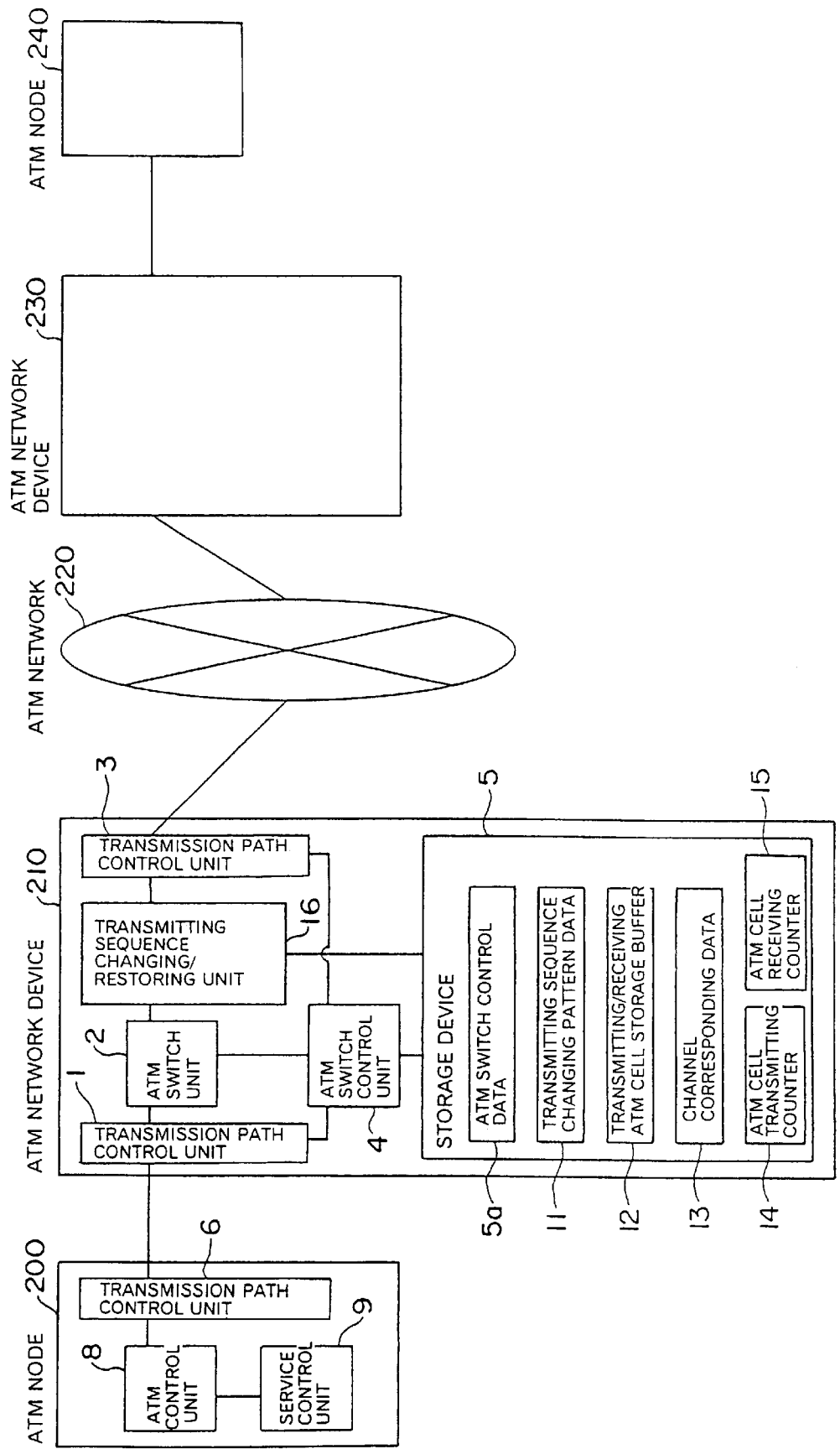

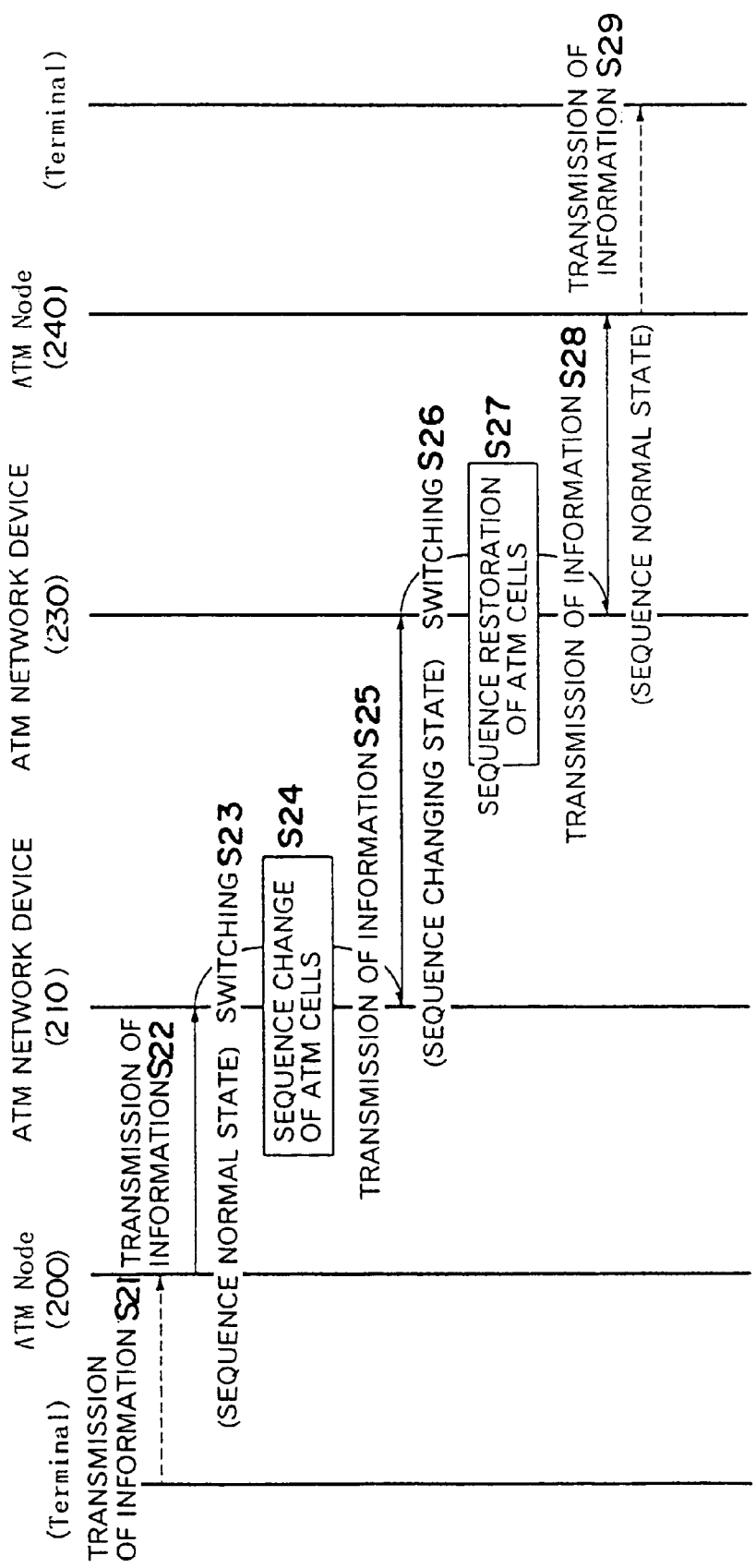

SYSTEM AND DEVICE FOR PREVENTING WIRETAP

BACKGROUND OF THE INVENTION

1. Field of the Invention

The present invention relates to a system for preventing an illegal interception of information (data information, image information and voice information) in an ATM (Asynchronous Transfer Mode) communication network where the information is transferred as segmented ATM cells.

2. Prior Art

In recent years, an ATM system has been adopted as a digital information transferring system for a B-ISDN (Broadband Integrated Service Digital Network) that is a public network and a LAN (Local Area Network). According to the ATM system, all pieces of communication information having different bandwidth are segmented into cells each having a fixed length (53 octets) and these cells are transferred in mixture through a transmission path by hardware switching. The communication network utilizing the ATM system described above is referred to as an ATM network.

According to the ATM system described above, a large quantity of digital information transferred and switched at a high speed, and consequently the damages caused by wiretap become enormous. Therefore, a variety of methods of preventing the wiretap in the ATM network have been proposed. FIG. 43 shows one example of those methods.

Referring to FIG. 43, an ATM network 720 is constructed of a multiplicity of ATM network devices connected to each other via physical lines. ATM nodes 700, 740 are individually connected to two units of ATM network devices 710, 730. User terminals (not shown) are further respectively connected to these ATM nodes 700, 740.

In the case of transmitting information due to a call set between the user terminals, the ATM node 700 at the transmission side divides the information from the user terminal to store the information in a multiplicity of ATM cells. The ATM node 700 transmits the ATM cells towards the ATM network device 710 in a first-in first-out order.

In the ATM network device 710, a transmission path control unit 711 receives the ATM cells transmitted from the ATM node 700. An ATM switch control unit 714 identifies an ATM virtual channel allocated to the call to which the ATM cell concerned belongs on the basis of a VPI (Virtual Path Identifier)/VCI (Virtual Channel Identifier) written to the header of the ATM cell received by the transmission path control unit 711, and controls an ATM switch unit 712 in order to send the same ATM cell along the identified ATM virtual channel (writes routing information to the header of the ATM cell concerned so as to be outputted from a desired port within the ATM switch unit 712, and rewrites the VPI/VCI of the ATM cell concerned in an outgoing-side transmission path control unit 713). ATM switch control data 717 stored in a storage device 716 is referred to by the ATM switch control unit 714 when controlling this switching process.

In a receiving-side ATM network device 730, as a transmission path control unit 731 receives the ATM cell from the ATM network device 710, an ATM switch control unit 734 controls an ATM switch unit 732 to transfer the ATM cells towards the receiving-side ATM node 740.

Incidentally, an output buffer random control unit 715 of the transmitting-side ATM network device 710, if the ATM cell received by the transmission path control unit 711 belongs to a wiretap prevention call, allocates this wiretap prevention call to the plurality of unused ATM virtual channels shown by dotted line in FIG. 43 connected to the receiving-side ATM network device 730 in addition to the originally allocated ATM virtual channels shown by solid lines in FIG. 43. Then, the output buffer random control unit 715 controls the ATM switch unit 712 to select one ATM virtual channel at random from the plurality of ATM virtual channels allocated to the wiretap prevention call for each ATM cell and to transmit it towards the receiving-side ATM network device 730.

In the receiving-side ATM network device 730, when the transmission path control unit 731 receives the ATM cells transferred along any one of the plurality of ATM virtual channels, the output buffer random control unit 735 controls the ATM switch unit 732 to merge these ATM cells with the ATM cells transmitted through the ATM virtual channels (indicated by the solid lines) originally allocated to the call. As a result, a string of ATM cells is restored in the receiving-side ATM network device 730.

According to such a system, the ATM cells belonging to the wiretap prevention call are transferred while being distributed to the plurality of ATM virtual channels, and hence, even if the ATM cells being transferred along some ATM virtual channels are intercepted and contents of payloads thereof are connected, the information transmitted due to the wiretap prevention call can not be restored. In consequence, a confidentiality of the information is perfectly kept.

According to the wiretap prevention method described above, however, since one wiretap prevention call occupies a plurality of ATM virtual channels, it reduces using efficiency of resources. Accordingly, if a case where a large amount of calls occur simultaneously, the number of ATM virtual channels usable in the ATM network abruptly decreases. This might cause a problem in which the whole ATM network becomes short of resources.

Further, although wiretap can be prevented in a higher layer (an application layer) in the ATM network, it needs an individual wiretap prevention process for every application, and this is therefore insufficient terms of providing a service.

SUMMARY OF THE INVENTION

To overcome the problems described above, a primary object of the present invention is to provide system and device for preventing wiretap that can prevent wiretap in a lower layer than the application layer, that is an ATM layer, without using a plurality of ATM virtual channels.

To accomplish the object, the wiretap prevention system and the device according to the present invention adopt the following constructions.

According to a first aspect of the invention, there is provided a wiretap preventing system between a transmitting-side communication device for transmitting ATM cells and a receiving-side communication device for receiving the ATM cells. The transmitting-side communication device comprises a receiving unit for sequentially receiving ATM cells each stored with transmitting target information in a segmented state, a synchronous cell inserting unit for inserting a synchronous cell in a string of the ATM cells received by the receiving unit at an interval of a predetermined number of ATM cells, a sequence changing unit for changing, in accordance with a predetermined pattern, a sequence of the redetermined number of ATM cells interposed between the synchronous cells inserted by the synchronous cell inserting nit, and a transmitting unit for transmitting, towards the receiving-side communication device, the string of ATM cells the sequence of which has been changed by the sequence changing unit. The receiving-side communication device comprises a receiving unit for sequentially receiving the ATM cells transmitted from the transmitting-side communication device, and a sequence restoring unit for restoring, tracing back the predetermined pattern, the sequence of the predetermined number of ATM cells interposed between the synchronous cells in the string of ATM cells received by the receiving unit, and discarding the synchronous cells.

With this construction, the sequence changing unit changes the sequence of the grouped ATM cells interposed between the synchronous cells, in which state the ATM cell string is sent from the transmitting-side communication device. Therefore, even if the third party intercepts the ATM cell string on the path to the receiving-side communication device, the third party is unable to reproduce the original transmitting target information by connecting data contents of the respective ATM cells. It is therefore feasible to prevent the wiretap in the ATM layer without using the plurality of ATM virtual channels. Note that the receiving-side communication device is capable of recognizing the group of ATM cells the sequence of which has been changed, by identifying the synchronous cell, and has information about the predetermined pattern use for changing the sequence thereof, whereby the sequence of ATM cells can be restored.

According to a second aspect of the invention, a transmitting-side communication device comprises a receiving unit for sequentially receiving ATM cells each stored with transmitting target information in a segmented state, a synchronous cell inserting unit for inserting a synchronous cell in a string of the ATM cells received by the receiving unit at an interval of a predetermined number of ATM cells, a sequence changing unit for changing, in accordance with a predetermined pattern, a sequence of the predetermined number of ATM cells interposed between the synchronous cells inserted by the synchronous cell inserting unit, and a transmitting unit for transmitting, towards a receiving-side communication device, the string of ATM cells the sequence of which has been changed by the sequence changing unit.

According to a third aspect of the invention, there is provided a wiretap preventing system between a transmitting-side communication device for transmitting ATM cells and a receiving-side communication device for receiving the ATM cells. The transmitting-side communication device comprises a receiving unit for receiving data cells defined as the ATM cells each stored with transmitting target information in a segmented state in sequence of data stream of the transmitting target information, a transmitting buffer including a storage area storable with a single synchronous cell defined as an ATM cell for synchronization and a predetermined number of data cells, a memory for retaining a predetermined relationship between a storage location and a storage sequence from a point of time when starting a storing operation, a storing unit for storing, when starting the storing operation, a predetermined storage location in the storage area with the synchronous cell, and storing the storage area with the data cells received by the receiving unit in a receiving sequence thereof in accordance with the predetermined relationship, a fetching unit for fetching the ATM cells stored in the storage area in sequence from a head location in the storage area when the storing unit completes the storage of the predetermined number of data cells into the storage area, a notifying unit for making the storing unit start operating at a point of time when the receiving unit receives the data cell at first and when the fetching unit completes the fetching of the ATM cell out of the storage area, and a sending unit for sending the ATM cells fetched by the fetching unit towards the receiving-side communication device in a fetching sequence. The receiving-side communication device comprises a receiving unit for sequentially receiving the ATM cells transmitted from the transmitting-side communication device, a receiving buffer including a storage area storable with the predetermined number of data cells, a memory for retaining the predetermined relationship between the storage location and the storage sequence from the point of time when starting the storing operation, a storing unit, starting the storing operation when the receiving unit receives the synchronous cell, for storing the data cells received by the receiving unit in the receiving sequence thereof in accordance with a relationship reversal to the predetermined relationship, and a fetching unit for fetching the ATM cells stored in the storage area in sequence from a head location in the storage area when the storing unit completes the storage of the predetermined number of data cells into the storage area.

With this construction, the storing unit stores the storage area in the transmitting buffer with the synchronous cell as well as storing the data cells in accordance with the predetermined relationship. Hence, the ATM cell string fetched by the fetching unit is brought into a state where the sequence of the grouped data cells interposed between the synchronous cells is changed. Therefore, even if the third party intercepts the ATM cell string sent from the transmitting-side communication device in such a state on the path to the receiving-side communication device, the third party is unable to reproduce the original transmitting target information by connecting data contents of the respective data cells. It is therefore feasible to prevent the wiretap in the ATM layer without using the plurality of ATM virtual channels. Note that the storing unit in the receiving-side communication device recognizes the head of the group of data cells the sequence of which has been changed, by identifying the synchronous cell, and stores the storage area of the receiving buffer with the data cells, whereby the sequence of data cells in the ATM cell string fetched by the fetching unit can be restored.

According to a fourth aspect of the invention, a transmitting-side communication device comprises a receiving unit for receiving data cells defined as the ATM cells each stored with transmitting target information in a segmented state in sequence of data stream of the transmitting target information, a transmitting buffer including a storage area storable with a single synchronous cell defined as an ATM cell for synchronization and a predetermined number of data cells, a memory for retaining a predetermined relationship between a storage location and a storage sequence from a point of time when starting a storing operation, a storing unit for storing, when starting the storing operation, a predetermined storage location in the storage area with the synchronous cell, and storing the storage area with the data cells received by the receiving unit in a receiving sequence thereof in accordance with the predetermined relationship, a fetching unit for fetching the ATM cells stored in the storage area in sequence from a head location in the storage area when the storing unit completes the storage of the predetermined number of data cells into the storage area, a notifying unit for making the storing unit start operating at a point of time when the receiving unit receives the data cell at first and when the fetching unit completes the fetching of the ATM cell out of the storage area, and a sending unit for sending the ATM cells fetched by the fetching unit towards the receiving-side communication device in a fetching sequence.

According to a fifth aspect of the invention, in the wiretap preventing system according to the first aspect, the transmitting-side communication device is an ATM node including an ATM control unit for dividing the transmitting target information, storing the ATM cell with each of information segments, and transferring these ATM cells to the receiving unit, and the receiving-side communication device is an ATM node including an ATM control unit for reproducing the transmitting target information by connecting in sequence the data stored in the data cells the sequence of which has been restored by the sequence restoring unit.

According to a sixth aspect of the invention, in the wiretap preventing system according to the third aspect, the transmitting-side communication device is an ATM node including an ATM control unit for dividing the transmitting target information, storing the ATM cell with each of information segments, and transferring these ATM cells to the receiving unit, and the receiving-side communication device is an ATM node including an ATM control unit for reproducing the transmitting target information by connecting in sequence the data stored in the data cells fetched by the fetching unit.

According to a seventh aspect of the invention, in the wiretap preventing system according to the first or third aspect, the transmitting-side communication device and the receiving-side communication device are network devices each including an ATM switch unit for switching the ATM cell in accordance with a virtual channel identifier of the ATM cell.

According to an eighth aspect of the invention, the transmitting-side communication device according to the second or fourth aspect may further comprise an ATM switch unit for switching the ATM cell in accordance with the virtual channel identifier of the ATM cell.

According to a ninth aspect of the invention, in the wiretap preventing system according to the first aspect, the sequence changing unit changes per ATM virtual channel the sequence of the ATM cells in the ATM virtual channel, and the sequence restoring unit restores per ATM virtual channel the sequence of the ATM cells in the ATM virtual channel.

According to a tenth aspect of the invention, in the transmitting-side communication device according to the second aspect, the sequence changing unit changes per ATM virtual channel the sequence of the ATM cells in the ATM virtual channel.

According to an eleventh aspect of the invention, in the wiretap preventing system according to the third aspect, the storage area of the transmitting buffer, the storage area of the receiving buffer and the predetermined relationship, are provided per ATM virtual channel.

According to a twelfth aspect of the invention, in the transmitting-side communication device according to the fourth aspect, the storage area of the transmitting buffer and the predetermined relationship are provided per ATM virtual channel.

According to a thirteenth aspect of the invention, in the wiretap preventing system according to the seventh aspect, the sequence changing unit changes per ATM virtual path the sequence of the ATM cells on the ATM virtual path, and the sequence restoring unit restores per ATM virtual path the sequence of the ATM cells on the ATM virtual path.

According to a fourteenth aspect of the invention, in the transmitting-side communication device according to the eighth aspect, the sequence changing unit changes per ATM virtual path the sequence of the ATM cells on the ATM virtual path.

According to a fifteenth aspect of the invention, in the wiretap preventing system according to the seventh aspect, the storage area of the transmitting buffer, the storage area of the receiving buffer and the predetermined relationship, are provided per ATM virtual channel.

According to a sixteenth aspect of the invention, in the transmitting-side communication device according to the eighth aspect, the storage area of the transmitting buffer and the predetermined relationship are provided per ATM virtual channel.

According to a seventeenth aspect of the invention, in the wiretap preventing system according to the first aspect, the transmitting-side communication device may further comprise an information adding unit for adding information for indicating whether or not the sequence changing unit should change the sequence, to the synchronous cell to be inserted in the string of ATM cells by the synchronous cell inserting unit. The sequence changing unit changes the sequence of ATM cells during only a period beginning from a point of time when the information adding unit adds to the asynchronous cell the information purporting that the sequence be changed up to a point of time when the information adding unit adds to the synchronous cell the information purporting that the sequence not be changed. The sequence restoring unit restores the sequence of ATM cells during only a period beginning from a point of time when receiving the synchronous cell to which the information purporting that the sequence be changed is added up to a point of time when receiving the synchronous cell to which the information purporting that the sequence not be changed is added.

With this construction, the sequence of ATM cells can be selectively changed in the process of communications, and hence it is feasible to change the sequence of ATM cells during only a period for which the data communications requiring the prevention of wiretap and to return, even when the change of the sequence in the transmitting-side communication device desynchronizes with the restoration of the sequence in the receiving-side communication device, it to the communication state based on the normal sequence.

According to an eighteenth aspect of the invention, in the wiretap preventing system according to the first aspect, the sequence changing unit is capable of changing the predetermined pattern. The transmitting-side communication device may further comprise an information adding unit for adding information for indicating the change of the predetermined pattern, to the synchronous cell to be inserted in the string of ATM cells by the synchronous cell inserting unit. The sequence restoring unit changes the predetermined pattern in accordance with the indication of the information at a point of time when receiving the synchronous cell to which the information for indicating the change of the predetermined pattern is added.

With this construction, since the sequence changing pattern of the ATM cells can be changed in the process of communications, it is possible to prevent, even if the sequence changing pattern might have leaked to the third party, damages at the minimum by changing the sequence changing pattern at any time.

According to a nineteenth aspect of the invention, there is provided a wiretap preventing system between a transmitting-side communication device for transmitting ATM cells and a receiving-side communication device for receiving the ATM cells. The transmitting-side communication device comprises a receiving unit for receiving data cells defined as the ATM cells each stored with transmitting target information in a segmented state in sequence of data stream of the transmitting target information, a transmitting buffer including a synchronous cell storage area storable with a single synchronous cell defined as an ATM cell for synchronization, and first and second storage areas storable with a predetermined number of data cells, a memory for retaining a predetermined relationship between a storage location and a storage sequence from a point of time when starting a storing operation, a storing unit for storing, when starting the storing operation, the synchronous cell storage area with the synchronous cell and also storing any one of the storage areas with the data cells received by the receiving unit in a receiving sequence thereof in accordance with the predetermined relationship, a fetching unit for fetching a single data cell stored in a storage location closer to the head location in the other storage area each time the storing unit stores one storage area with the single data cell, a control unit for exchanging, at a point of time when the storing unit finishes storing one storing unit with the predetermined number of data cells, the storage area in which the storing unit executes the storing process with a storage area from which the fetching unit executes the fetching process, indicating the fetching unit to fetch the synchronous cell, and making the storing unit start the storing operation, and a sending unit for sending the ATM cells, fetched by one fetching unit, of the storing unit towards the receiving-side communication device in a fetching sequence. The receiving-side communication device comprises a receiving unit for sequentially receiving the ATM cells transmitted from the transmitting-side communication device, a buffer including first and second storage areas storable with the predetermined number of data cells, a memory for retaining the predetermined relationship between the storage location and the storage sequence from the point of time when starting the storing operation, a storing unit, starting the storing operation when the receiving unit receives the synchronous cell, for storing any one of the storage areas with the data cells received by the receiving unit in the receiving sequence thereof in accordance with a relationship reversal to the predetermined relationship, a fetching unit for fetching a single data cell stored in a storage location closer to the head location in the other storage area each time the storing unit stores one storage area with the single data cell, and a control unit for exchanging, at a point of time when the storing unit finishes storing one storing unit with the predetermined number of data cells, the storage area in which the storing unit executes the storing process with a storage area from which the fetching unit executes the fetching process, and making the storing unit start the storing operation.

With this construction, it is feasible to make a data cell storing period into the transmitting buffer coincident with a data cell fetching period out of the transmitting buffer, i.e., a receiving period by the receiving-side communication device, and therefore the wiretap can be prevented without deteriorating the quality even when required to make the data cell period fixed as in the case of, e.g., the voice information.

According to a twentieth aspect of the invention, a transmitting-side communication device comprises a receiving unit for receiving data cells defined as the ATM cells each stored with transmitting target information in a segmented state in sequence of data stream of the transmitting target information, a transmitting buffer including a synchronous cell storage area storable with a single synchronous cell defined as an ATM cell for synchronization, and first and second storage areas storable with a predetermined number of data cells, a memory for retaining a predetermined relationship between a storage location and a storage sequence from a point of time when starting a storing operation, a storing unit for storing, when starting the storing operation, the synchronous cell storage area with the synchronous cell and also storing any one of the storage areas with the data cells received by the receiving unit in a receiving sequence thereof in accordance with the predetermined relationship, a fetching unit for fetching a single data cell stored in a storage location closer to the head location in the other storage area each time the storing unit stores one storage area with the single data cell, a control unit for exchanging, at a point of time when the storing unit finishes storing one storing unit with the predetermined number of data cells, the storage area in which the storing unit executes the storing process with a storage area from which the fetching unit executes the fetching process, indicating the fetching unit to fetch the synchronous cell, and making the storing unit start the storing operation, and a sending unit for sending the ATM cells, fetched by the one fetching unit, of the storing unit towards the receiving-side communication device in a fetching sequence.

These together with other objects and advantages which will be subsequently apparent, reside in the details of construction and operation as more fully hereinafter described and claimed, reference being had to accompanying drawings forming a part hereof, wherein like numerals refer to like parts throughout.

BRIEF DESCRIPTION OF THE DRAWINGS

Other objects and advantages of the present invention will become apparent during the following discussion in conjunction with the accompanying drawings, in which:

FIG. 21 is a block diagram schematically showing a construction of the ATM network in a second embodiment of the present invention;

FIG. 22 is a sequence diagram showing a flow of data between the respective communication devices when transmitting the information according to the second embodiment;

DESCRIPTION OF THE PREFERRED EMBODIMENTS

Embodiments of the present invention will hereinafter be discussed with reference to the accompanying drawings.

[Embodiment 1]

A first embodiment of the present invention shows an example in which ATM nodes 100, 140 each incorporate wiretap preventing function, and wiretap is prevented in an SVC (Switched Virtual Channel) set between the transmitting-side ATM node 100 (a transmitting-side communication device) and the receiving-side ATM node 140 (a receiving-side communication device).

(Construction of ATM Network System)

Figure 1:
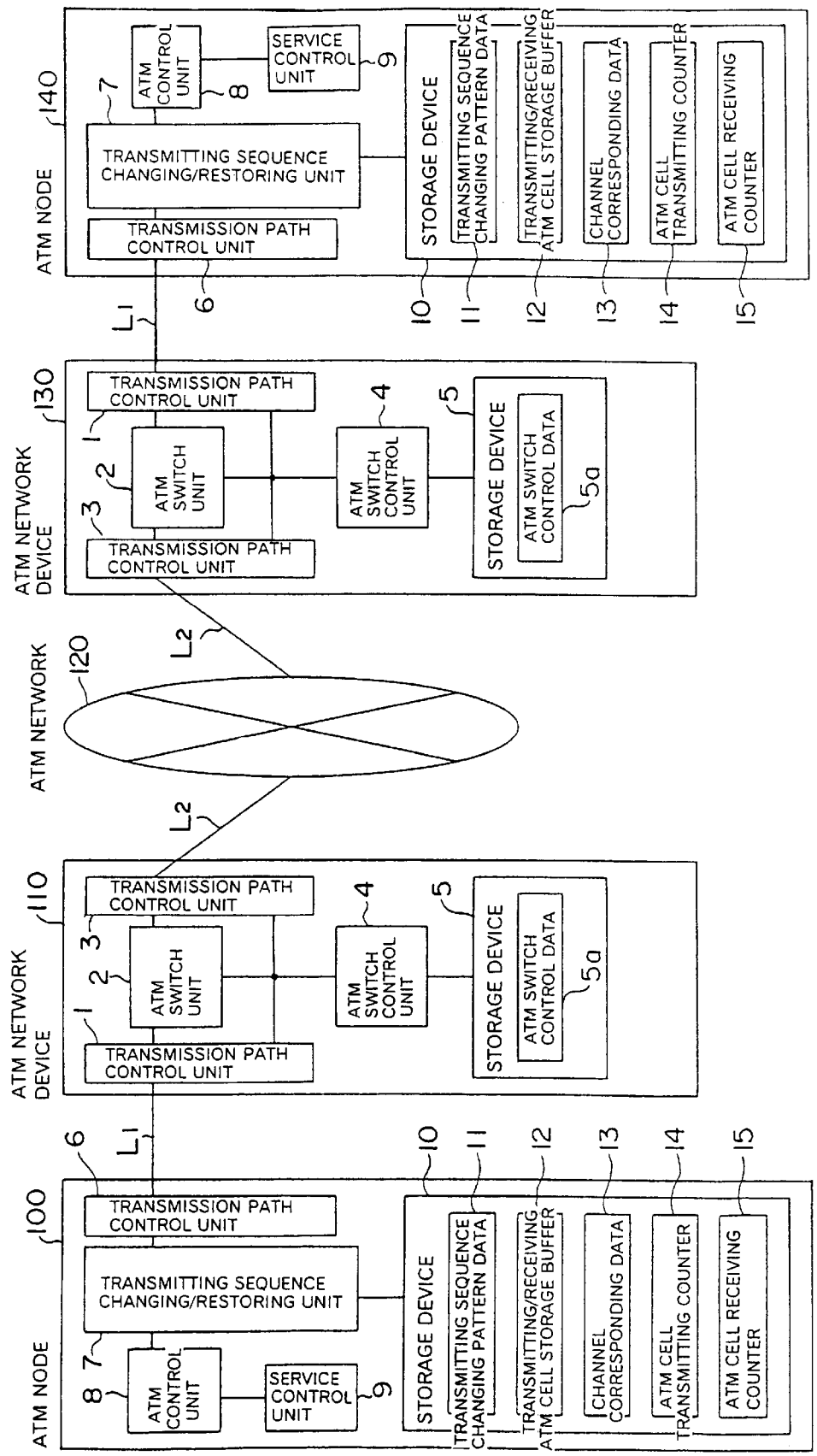
FIG. 1 is a block diagram schematically showing a construction of an ATM network in a first embodiment of the present invention.

FIG. 1 is a block diagram schematically showing a construction of an ATM network system to which a wiretap preventing method according to the first embodiment is applied as well as schematically showing constructions of respective communication devices constituting this ATM network system. As illustrated in FIG. 1, an ATM network 120 serving as the core of an ATM network system is constructed of a multiplicity of ATM network devices connected to each other. An ATM network device 110 partly constituting this ATM network 120 is connected to an ATM node 100. Further, another ATM network device 130 partly constituting the ATM network 120 is connected to other ATM node 140. These ATM nodes 100, 140 are connected respectively to user terminals (not shown).

In the following description, a user terminal connected to the ATM node 100 is assumed as a transmitting terminal and a user terminal connected to the ATM node 140 is assumed as a receiving terminal. Therefore, as the case may be, the ATM node 100 is called a transmitting-side ATM node, the ATM network device 110 is referred to as a transmitting-side ATM network device, the ATM network device 130 is termed a receiving-side ATM network device, and the ATM node 140 is called a receiving-side ATM node.

<ATM Network Device>

Each of the ATM network devices 110, 130 is classified as an ATM switch for controlling a transmission path. Each of these ATM network devices 110, 130 is constructed of a UNI (User Network Interface) transmission path control unit 1 connected to a transmission path (a physical line) $L_1$ led to the ATM node 100 or 140, an NNI (Network-to-Network Interface) transmission path control unit 3 connected to a transmission path (a physical line) $L_2$ led to other ATM network device within the ATM network 120, an ATM switch unit 2 for relaying between these transmission path control units 1 and 3, an ATM switch control unit 4 connected to these transmission path control units 1, 3 and to the ATM switch unit 2, and a storage device 5 connected to this ATM switch control unit 4.

Each of the transmission path control units 1, 3 extracts an ATM cell out of a transmission signal transmitted from outside via the transmission paths $L_1$, $L_2$, then maps the ATM cell received from the ATM switch unit 2 to a transmission signal, and transmits it to the transmission paths $L_1$, $L_2$. Further, each of the transmission path control units 1, 3 reads VPI/VCI from a header of the ATM cell extracted out of the transmission signal, reads routing information (TAG) corresponding to the read VPI/VCI by referring to a first table (not shown) set by the ATM switch control unit 4, and rewrites the VPI/VCI of the ATM according to the routing information. Further, each of the transmission path control units 1, 3, when receiving the ATM cell from the ATM switch unit 2, reads an out-VPI/VCI corresponding to the routing information of the ATM cell with reference to an second table (not shown) set by the ATM switch control unit 4, and rewrites the routing information of the ATM cell with this out-VPI/VCI. The respective transmission path control units 1, 3 are provided for every transmission path (the physical line).

The ATM switch unit 2 selects one of the transmission paths in accordance with the routing information of the header of the ATM cell inputted from the transmission path control unit 1, and transmits the ATM cell through the selected transmission path.

The ATM switch control unit 4 controls the ATM switch unit 2 to select one of the transmission paths for each of the ATM cells by setting the tables described above.

Further, the ATM switch control unit 4 receives the ATM cell with the routing information addressed to the control unit 4 itself. Then, the ATM switch control unit 4 restores control information such as a variety of signaling messages and OAM (Operation, Administration and Maintenance) cell information stored in the ATM cell received, and executes processing and control according to this item of control information. Further, the ATM switch control unit 4 generates the control information oriented towards other communication devices, then transmits the generated control information (the OAM cell information) as OAM cells to the ATM switch unit 2 and also writes the generated control information (the variety of signaling messages) into cells to transmit them to the ATM switch unit 2.

Figure 8:
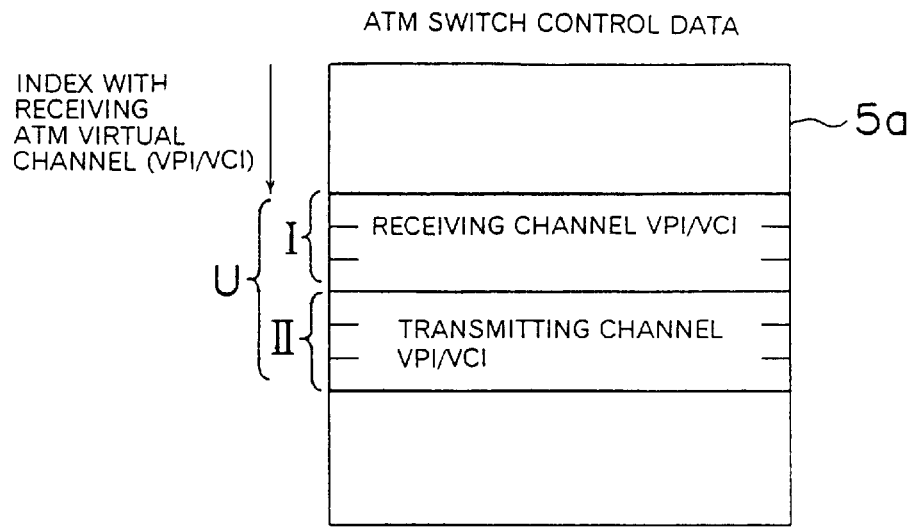
FIG. 8 is a diagram showing a data structure of ATM switch control data.

The storage device 5 is a memory for registering and managing various items of data (the ATM switch control data 5a) needed for the ATM switch control unit 4 to execute a variety of processes described above. FIG. 8 shows a specific data structure of the ATM switching control data 5a. As shown in FIG. 8, the ATM switching control data 5a is provided, per VPI/VCI of each ATM virtual channel, with a management area U composed of a column I in which the VPI/VCI of a receiving channel is written, and a column II in which the VPI/VCI of a transmitting channel is written. Each management area U is allocated within the ATM switching control data 5a so that a value of the VPI/VCI of the receiving channel is coincident with a head address thereof.

<ATM Node>

The ATM nodes 100, 140 are communication devices, to which the ATM network devices 110, 130 connected via the transmission path $L_1$ provide communication services, and each incorporate a function of terminating the ATM network. These ATM nodes 100, 140 are, to be specific, an ATM router, an ATM HUB and DTE etc.

The ATM nodes 100, 140 are constructed of the transmission path control units 6 connected to the transmission paths (the physical lines) $L_1$, transmitting sequence changing/restoring units 7 connected to the transmission path control units 6, ATM control units 8 connected to the transmitting sequence changing/restoring units 7, storage devices 10 connected to the units 7, and service control units 9 connected to the ATM control units 8.

The transmission path control units 6 extract the ATM cells out of the transmission signals transmitted from the ATM network devices 110, 130 via the transmission paths $L_1$, and transfer the extracted ATM cells to the transmitting sequence changing/restoring units 7. Further, the transmission path control unit 6 maps, to the transmission signal, the ATM cell received from the transmitting sequence changing/restoring unit 7, and transmits it to the transmission path 11 (which corresponds to a transmitting unit).

On the other hand, the service control unit 9 recognizes the received signaling message, and provides a service corresponding to a type of the signaling message. Namely, the service control unit 9 serving as an interface device, receives the information and a variety of request messages or response messages transmitted from the user terminal, and transfers them to the ATM control unit 8. The service control unit 9 also transmits, to the user terminal, the information and the variety of request messages or the response messages received from the ATM control unit 8.

At the transmission side, the ATM control unit 8 divides the information from the service control unit 9 into cells each having a predetermined size (48 bytes) and puts a predetermined cell header to each of cells, thus generating an ATM cell (a data cell). The ATM control unit 8 then transfers each of the generated ATM cells to the transmitting sequence changing/restoring unit 7. The ATM control unit 8 generates the variety signaling messages for the ATM network device 110 in accordance with the variety of request messages given from the user terminals connected to the service control units 9, then writes the signaling messages into ATM cells and transfers them to the transmitting sequence changing/restoring unit 7.

At the receiving side, the ATM control unit 8 connects, in the receiving sequence, payloads of the ATM cells (the data cells) transferred from the transmitting sequence changing/restoring unit 7, thereby restoring the information transmitted from the co-communication terminal. The ATM control unit 8 then transfers the restored information to the service control unit 9. Further, the ATM control unit 8, if the information restored from the ATM cell received from the transmitting sequence changing/restoring unit 7 is the signaling message addressed to the control unit 8 itself, notifies the service control unit 9 of this signaling message, or sends a request message or a response message corresponding to the signaling message to the user terminal connected to the service control unit 9.

The storage device 10 is a memory that includes working areas (a transmitting/receiving ATM cell storage buffer 12, an ATM cell transmitting counter 14 and an ATM cell receiving counter 15) of the transmitting sequence changing/restoring unit 7 and areas for storing various items of data (transmitting sequence changing pattern data 11, and channel corresponding data 13) used for the transmitting sequence changing/restoring unit 7. Specific structures of the working areas and the respective items of data will be explained in detail later on.

At the transmission side, the transmitting sequence changing/restoring unit 7 receives an ATM cell string that is a series of ATM cells arranged in sequence of the original information from the ATM control unit 8 (that corresponds to a function of a receiving unit), and inserts a synchronous cell each four ATM cells to make groups each including four ATM cells (that corresponds to a function of a synchronous cell inserting unit). The transmitting sequence changing/restoring unit 7 changes the sequence (order) of the ATM cells in accordance with a predetermined pattern within the groups each consisting of the four ATM cells (that corresponds to a function of a sequence changing unit), and transfers the ATM cell string to the transmission path control unit 6.

Figure 2:
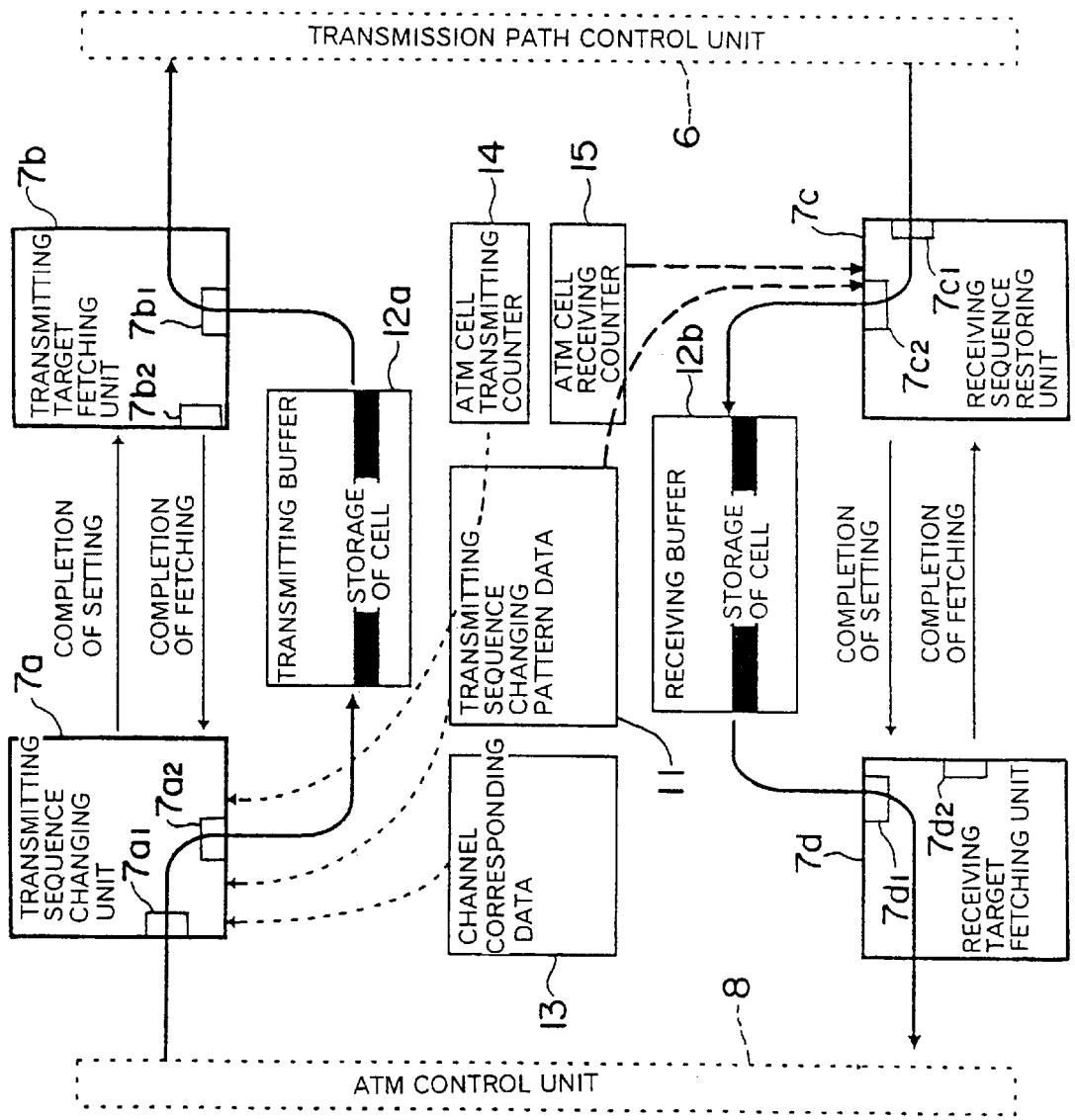
FIG. 2 is a block diagram showing an internal configuration of a transmission sequence changing/restoring unit of FIG. 1.

At the receiving side, the transmitting sequence changing/restoring unit 7 receives the ATM cell string in which the sequence of the ATM cells has been changed by the transmission side from the transmission path control unit 6 (that corresponds to a function of a receiving unit). The transmitting sequence changing/restoring unit 7 re-groups the received ATM cell string to make cell groups each having four ATM cells by tracing back the predetermined pattern on the basis of the synchronous cells (that corresponds to a function of a sequence restoring unit), and transfers it to the ATM control unit 8. Functions of this transmitting sequence changing/restoring unit 7 are further classified, as shown in FIG. 2, into a transmitting sequence changing unit 7a, a transmitting target fetching unit 7b, a receiving sequence restoring unit 7c and a receiving target fetching unit 7d.

Given hereinafter are explanations about the functions of the respective units 7a–7d, the respective working areas within the storage device 10 and specific structures of the respective items of data.

Figure 3:
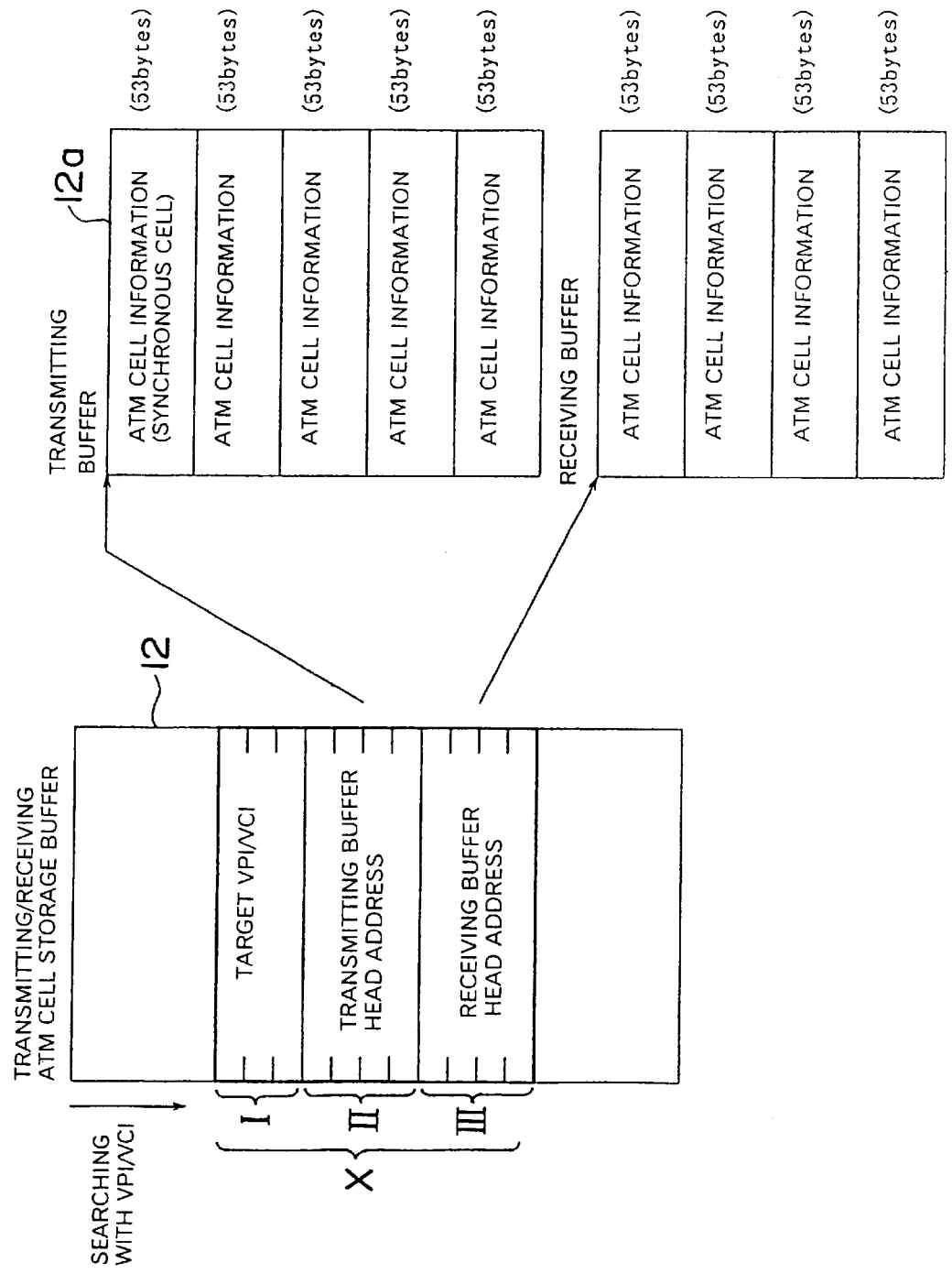
FIG. 3 is a diagram showing a data structure in an ATM cell storage buffer of FIG. 2.

The transmitting/receiving ATM cell storage buffer 12 in the storage device 10, as illustrated in FIG. 3, includes a transmitting sub-buffer 12a and a receiving sub-buffer 12b. As shown in FIG. 2, the transmitting sequence changing unit 7a writes the ATM cell to the transmitting sub-buffer 12a and the transmitting target fetching unit 7b reads the written ATM cell from the transmitting sub-buffer 12a. This transmitting sub-buffer 12a is provided per VPI/VCI with a storage area (5×53 [bytes]) for storing five pieces of ATM cells (four ATM cells and one synchronous cell) having the common VPI/VCI. FIG. 3 shows only the area for one VPI/VCI. On the other hand, the receiving sequence restoring unit 7c writes the ATM cell to the receiving sub-buffer 12b and the receiving target fetching unit 7d reads the ATM cell from the receiving sub-buffer 12b. As shown in FIG. 3, this receiving sub-buffer 12b is provided per VPI/VCI with a storage area (4×53 [bytes]) for storing four pieces of ATM cells having the common VPI/VCI. FIG. 3 shows only the area for one VPI/VCI. The transmitting/receiving ATM cell storage buffer 12, which is higher than the transmitting sub-buffer 12a and the receiving sub-buffer 12b, is provided per VPI/VCI with a management area X composed of a column I in which a management target VPI/VCI is written, a column II in which a head address of the storage area allocated for the same VPI/VCI within the transmitting sub-buffer 12a is written, and a column III in which a head address of the storage area allocated for the same VPI/VCI within the receiving sub-buffer 12b is written. Each management area X is allocated within the transmitting/receiving ATM cell storage buffer 12 so that a value of the management target VPI/VCI is coincident with the head address thereof.

Figure 4:
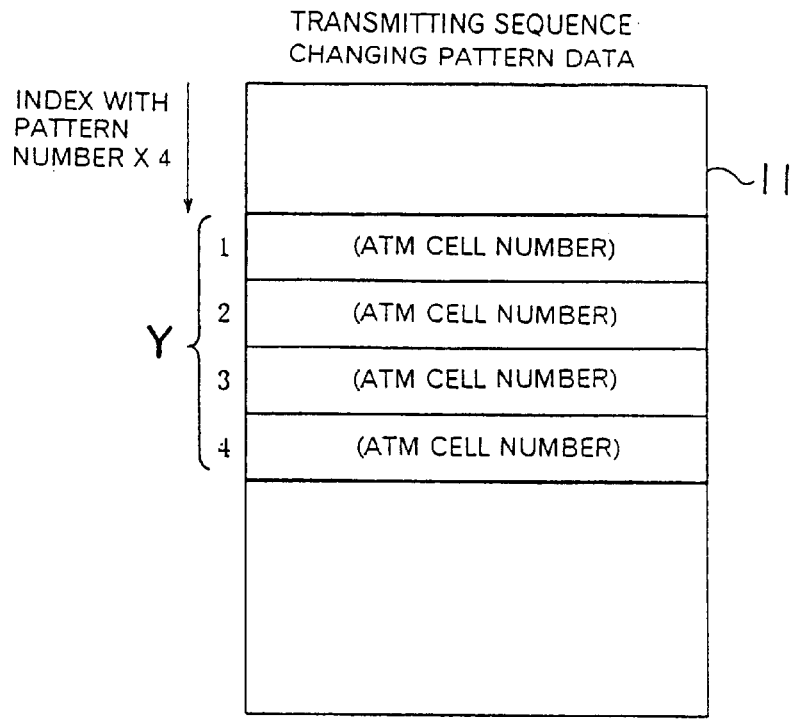
FIG. 4 is a diagram showing a data structure of transmitting sequence changing pattern data.

The transmitting sequence changing pattern data 11 in the storage device 10 is, as illustrated in FIG. 4, structured so that pattern data areas Y (a memory for retaining a predetermined relationship between a storage sequence from a starting point of the storage operation, and a storage location) consisting of four entries consecutively arranged, are provided corresponding to a plurality of sequence changing patterns. An "ATM cell number" written in each entry in the pattern data area indicates a relative storage location of the writing target ATM cell on the basis of the storage location of the synchronous cell in each storage area within the transmitting sub-buffer 12a. Further, a sequence of the entries in the pattern data area Y corresponds to a receiving sequence of the ATM cells from the ATM control unit 8. For instance, when the "ATM cell number 3" is written in the first entry in the pattern data area Y, the synchronous cell is stored in the predetermined storage area in the transmitting sub-buffer 12a and the next ATM cell received from the ATM control unit 8 is stored in a third storage location from the synchronous cell storage location in the same storage area. Further, when the "ATM cell number 1" is written in the second entry in the pattern data area Y, the synchronous cell is stored in the predetermined storage area in the transmitting sub-buffer 12a and the second received ATM cell is stored in a first storage location from the synchronous cell storage location in the same storage area. The head address in each pattern data area Y within the transmitting sequence changing pattern data 11 corresponds to a 4-fold value of a "wiretap preventing function pattern number" specified by channel corresponding data 13.

Figure 5:
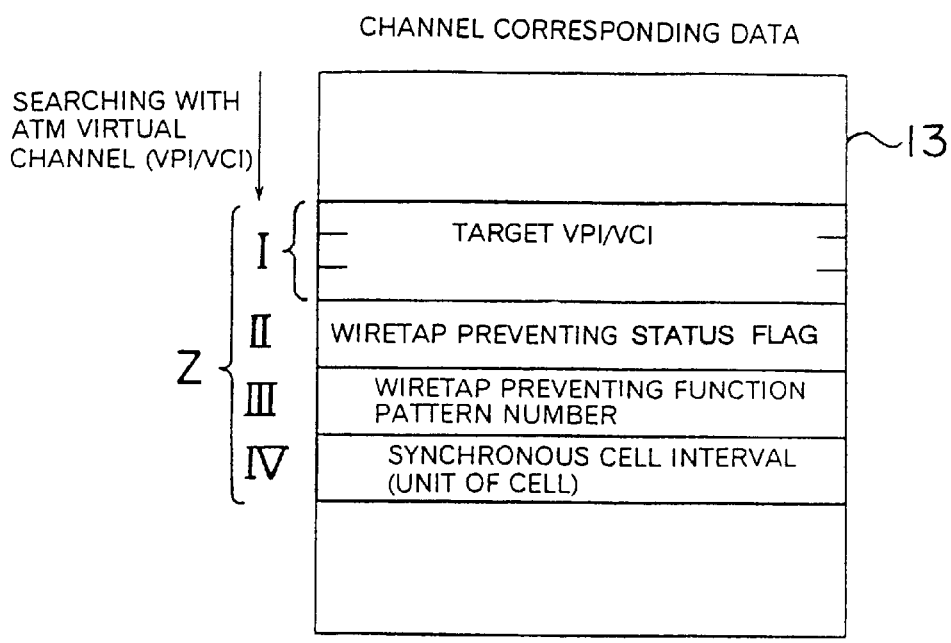
FIG. 5 is a diagram showing a data structure of channel corresponding data.
Figure 6:
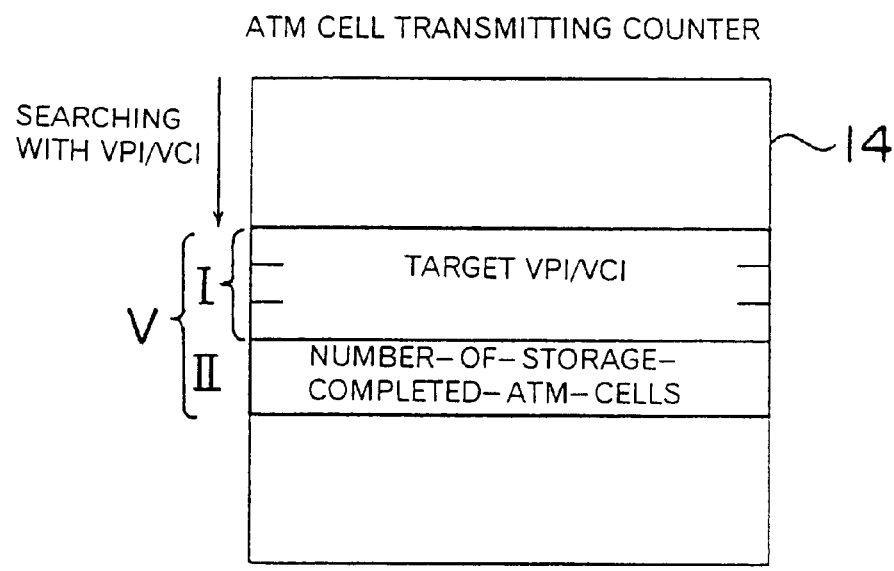
FIG. 6 is a diagram showing a data structure in an ATM cell transmitting counter according to the first embodiment.

The channel corresponding data 13 in the storage device 10 is, as shown in FIG. 5, provided per VPI/VCI with a management area Z consisting of a column I in which the management target VPI/VCI is written, a wiretap preventing status flag area II for indicating whether or not the wiretap preventing function is applied for a call allocated with an ATM virtual channel identified by the same VPI/VCI, a wiretap preventing function pattern number area III for indicating a serial number of the sequence changing pattern used in the wiretap preventing function, and a synchronous cell interval column IV for indicating an interval at which to insert the synchronous cell in the wiretap preventing function. Each management area Z is allocated within the channel corresponding data 13 so that a value of the management target VPI/VCI is coincident with the head address.

The ATM cell transmitting counter 14 in the storage device 10 is provided per VPI/VCI with a management area V consisting of a column I in which the management target VPI/VCI is written, and a number-of-storage-completed-ATM-cells column II in which a number (a value counted based on the point of time when storing the synchronous cell) of the ATM cells stored in the storage area within the transmitting sub-buffer 12a that is identified by the same VPI/VCI is written. Each management area V is allocated within the ATM cell transmitting counter 14 so that a value of the management target VPI/VCI is coincident with the head address thereof.

The transmitting sequence changing unit 7a of the transmitting sequence changing/restoring unit 7 includes a receiving unit $7a_1$ for receiving the ATM cells from the ATM control unit 8. Then, the transmitting sequence changing unit 7a, for every VPI/VCI, receives the ATM cell having the management target VPI/VCI from the ATM control unit 8, retrieves the transmitting sequence changing pattern data 11 with this management target VPI/VCI serving as an index, and checks the wiretap preventing status flag II which corresponds to this management target VPI/VCI. Then, when the flag indicates the wiretap preventing function effective state, the transmitting sequence changing unit 7a reads a wiretap preventing function pattern number and a synchronous cell interval from the management area Z. Further, the transmitting sequence changing unit 7a retrieves the ATM cell transmitting counter 14 with the management target VPI/VCI serving as an index, and reads a number-of-storage-completed-ATM-cells i from the management area V which corresponds to this management target VPI/VCI. Next, the transmitting sequence changing unit 7a retrieves the transmitting sequence changing pattern data 11 with a 4-fold value of the wiretap preventing function pattern number serves as an index, and specifies a corresponding pattern data area Y. Subsequently, the transmitting sequence changing unit 7a reads an ATM cell number j from the i-th entry (i=the number-of-storage-completed ATM-cells that is read from the ATM cell transmitting counter 14) in the specified pattern data area Y. Next, the transmitting sequence changing unit 7a retrieves the transmitting/receiving ATM cell storage buffer 12 with the management target VPI/VCI serving as an index, and specifies a storage area in the transmitting sub-buffer 12a which corresponds to this management target VPI/VCI. After the above processes, a storage unit $7a_2$ of the transmitting sequence changing unit 7a stores the ATM cell received from the ATM control unit 8 at the j-th storage location from the synchronous cell storage location in the specified storage area. Simultaneously with this process, the transmitting sequence changing unit 7a increments the number-of-storage-completed-ATM-cells i corresponding to the management target VPI/VCI in the ATM cell transmitting counter 14.

When the number-of-storage-completed-ATM-cells i reaches "4" as a result of repeating the processes of receiving and storing the ATM cells as described above, the transmitting sequence changing unit 7a notifies the transmitting target fetching unit 7b of a completion of setting, and resets the number-of-storage-completed-ATM-cells i to "0". If the number-of-storage-completed-ATM-cells i is thus reset to "0", the transmitting sequence changing unit 7a, after storing with the synchronous cell the head location in the storage area of the transmitting sub-buffer 12a that corresponds to the management target VPI/VCI, stores the next ATM cell.

Since the transmitting sequence changing unit 7a operate as described above, the ATM cell string sent from the ATM control unit 8 is grouped by every four ATM cells. Then, the synchronous cell for indicating the head location of the group is added to each group consisting of the four ATM cells, and stored in the transmitting sub-buffer 12a in a state where the ATM cells are rearranged in accordance with the transmitting sequence changing pattern data 11.

The transmitting target fetching unit 7b in the transmitting sequence changing/restoring unit 7 receives a notification of setting completion from the transmitting sequence changing unit 7a, and then the unit 7b retrieves the transmitting/receiving ATM cell storage buffer 12 with the management target VPI/VCI designated by the notification serving as an index. The transmitting target fetching unit 7b then specifies a storage area in the transmitting sub-buffer 12a which corresponds to this management target VPI/VCI. Then, a fetching unit $7b_1$ of the transmitting target fetching unit 7b sequentially reads five pieces of ATM cells stored in the specified storage area in order from the one stored in the head location (stored with the synchronous cell) in this storage area, and transfers the ATM cells to the transmission path control unit 6. As a result, the cell string having the same management target VPI/VCI is converted into a cell string where the synchronous cell is inserted every four ATM cells and where the four ATM cells interposed between the respective synchronous cells are rearranged in a predetermined sequence based on the transmitting sequence changing pattern data 11 (see FIG. 20B). When the ATM cell group which consists of five cells is transferred to the transmission path control unit 6, a notifying unit $7b_2$ of the transmitting target fetching unit 7b notifies the transmitting sequence changing unit 7a of a completion of fetching.

Figure 7:
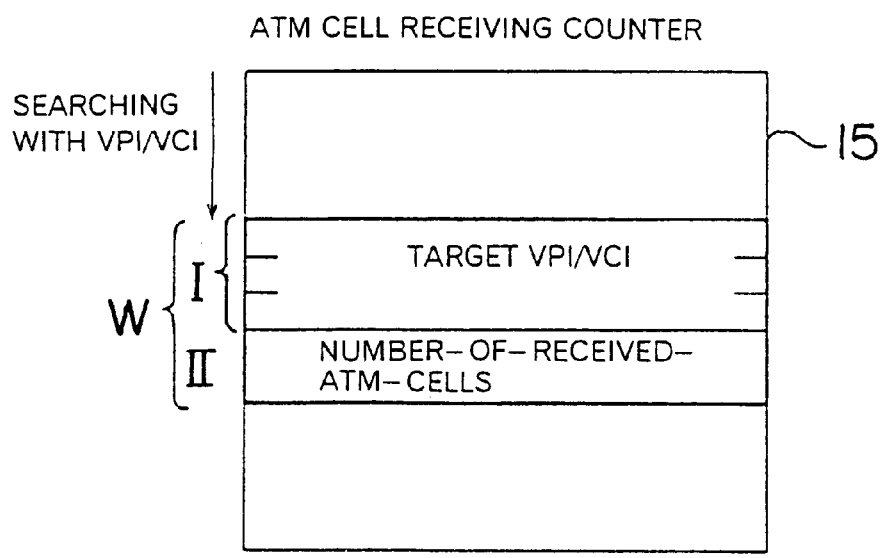
FIG. 7 is a diagram showing a data structure in an ATM cell receiving counter according to the first embodiment.

On the other hand, the ATM cell receiving counter 15 in the storage device 10 is, as shown in FIG. 7, provided per VPI/VCI with a management area W composed of a column I in which the management target VPI/VCI is written, and a number-of-received-ATM-cells column II in which to write the number of ATM cells (which is a value counted based on the point of time when receiving the synchronous cell) stored in the storage area within the receiving sub-buffer 12b which is identified by the same VPI/VCI. Each management area W is allocated within the ATM cell receiving counter 15 so that a value of the management target VPI/VCI is coincident with the head address thereof.

A receiving sequence restoring unit 7c of the transmitting sequence changing/restoring unit 7 includes a receiving unit $7c_1$ for receiving the ATM cells from the transmission path control unit 6. Then, the receiving sequence restoring unit 7c, for every VPI/VCI, retrieves the transmitting sequence changing pattern data 11 with the received management target VPI/VCI serving as an index, and checks the wiretap preventing status flag II in the management area Z which corresponds to this management target VPI/VCI. Then, when the flag II indicates the wiretap preventing function effective state, the receiving sequence restoring unit 7c reads a wiretap preventing function pattern number and a synchronous cell interval from the management area Z. Further, the receiving sequence restoring unit 7c retrieves the ATM cell receiving counter 15 with the management target VPI/VCI serving as an index, and reads a number-of-receipt-completed-ATM-cells k from the management area V which corresponds to this management target VPI/VCI. Next, the receiving sequence restoring unit 7c retrieves the transmitting sequence changing pattern data 11, wherein a 4-fold value of the wiretap preventing function pattern number read from the transmitting sequence changing pattern data 11 serves as an index. The receiving sequence restoring unit 7c then specifies a corresponding pattern data area Y. Subsequently, the receiving sequence restoring unit 7c counts a number-of-entries $n_e$, from the head location in the pattern data area Y, of the entries in which an ATM cell number k (=the number-of-receipt-completed ATM-cells which is read from the ATM cell receiving counter 15) in the specified pattern data area Y. Next, the receiving sequence restoring unit 7c retrieves the transmitting/receiving ATM cell storage buffer 12 with the management target VPI/VCI serving as an index and specifies a storage area corresponding to this management target VPI/VCI in the receiving sub-buffer 12b. After the above processes, a fetching unit $7c_2$ of the receiving sequence restoring unit 7c stores the $n_e$-th storage location in the specified storage area with the ATM cell received from the transmission path control unit 6. Simultaneously with this process, the receiving sequence restoring unit 7c increments the number-of-receipt-completed-ATM-cells k corresponding to the management target VPI/VCI in the ATM cell receiving counter 15.

When the number-of-received-ATM-cells k reaches "4" as a result of repeating the processes of receiving and storing the ATM cells as described above, the receiving sequence restoring unit 7c notifies the receiving target fetching unit 7d of the completion of setting, and resets the number-of-received-ATM-cells k to "0".

The receiving target fetching unit 7d in the transmitting sequence changing/restoring unit 7, upon receiving a notification of setting completion from the receiving sequence restoring unit 7c, retrieves the transmitting/receiving ATM cell storage buffer 12, wherein the management target VPI/VCI designated by this notification of setting completion serves as an index. The receiving target fetching unit 7d then specifies a storage area in the receiving sub-buffer 12b which corresponds to this management target VPI/VCI. Then, the receiving target fetching unit 7d sequentially reads four pieces of ATM cells stored in the specified storage area in order from the one stored in the head location (stored with the synchronous cell) in this storage area, and transfers the ATM cells to the ATM control unit 8. As a result, the cell string having the same management target VPI/VCI is restored in the original sequence. When the ATM cell group which consists of four cells are transferred to the ATM control unit 8, the receiving target fetching unit 7d notifies the receiving sequence restoring unit 7c of a completion of fetching.

<Structure of Synchronous Cell>

Figure 9:
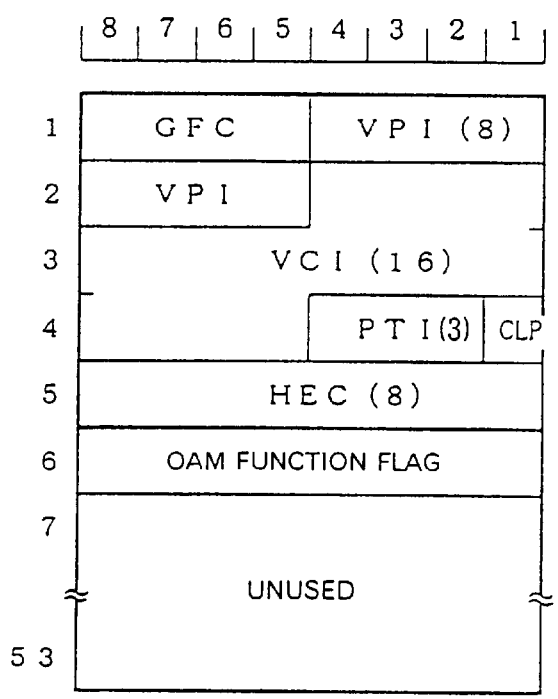
FIG. 9 is a diagram showing a data structure of a synchronous cell according to the first embodiment.

A structure of the synchronous cell with which the transmitting sequence changing unit 7a stores the transmitting sub-buffer 12a, will next be explained. In accordance with the embodiment 1, this synchronous cell involves the use of an OAM cell. As shown in a data structure diagram of FIG. 9, the synchronous cell (the OAM cell) is constructed of a 5-octet header field and a 48-octet payload field. First-half 4 bits of the first octet of the header field is a generic flow control (GFC) field but are unused in the synchronous cell. Further, second-half 4 bits of the first octet of the header filed and first-half 4 bits of the second octet thereof, are virtual path identifiers (VPI), and a virtual channel identifier (VCI) occupies a field ranging from second-half bits of the second octet to first-half 4 bits of the fourth octet. In this synchronous cell, the same value as the ATM cell stored with the information is written to the VPI/VCI. Further, a payload type identifier (PTI) for indicating a type of content of the payload field consists of 3 bits from a fifth bit of the fourth octet of the header field. In this synchronous cell, "101" giving an indication of being OAM cell of "END TO END" is written to the PTI. Moreover, the last bit of the fourth octet of the header field is a cell loss priority (CLP). In the synchronous cell, "0" indicating a high priority is written to the CLP. Further, a fifth octet of the header field is a header error control (HEC) field. Furthermore, the head octet of the payload field is an OAM function flag for indicating a type of the OAM cell. In the synchronous cell, "1110 0000" giving an indication of being the synchronous cell (no additional information) is written to the OAM function flag.

(Flow of Operation in ATM Network System)

Given next is an explanation of the operation of each communication device in the ATM network system when the wiretap preventing function is effective.

<Call Setting>

To start with, there will be described a content of control of each unit within each communication device when setting a wiretap preventing call, and a flow of the data (ATM cells) between the respective communication devices.

Figure 10:
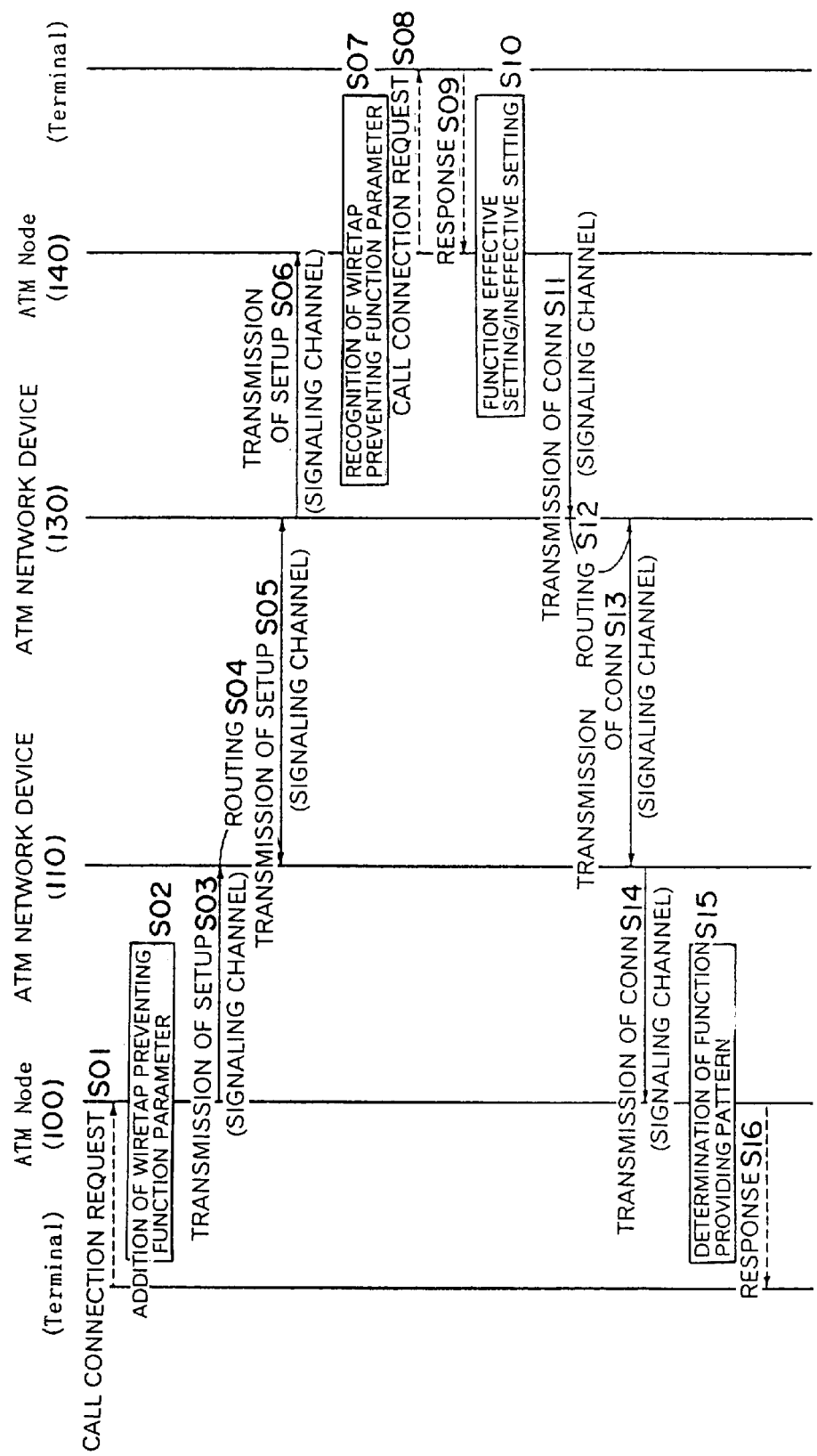
FIG. 10 is a sequence diagram showing a flow of data between respective communication devices when in a call connection.

As shown in FIG. 10, the transmitting-side ATM node 100, when receiving a call connection request from a user terminal (a transmitting terminal) connected to the node 100 itself (S01), generates a SETUP message to which a wiretap preventing function parameter is added (S02), then segments this SETUP message on the unit of ATM cell, and transmits this message towards the transmitting-side ATM network device 110 (S03).

Figure 11:
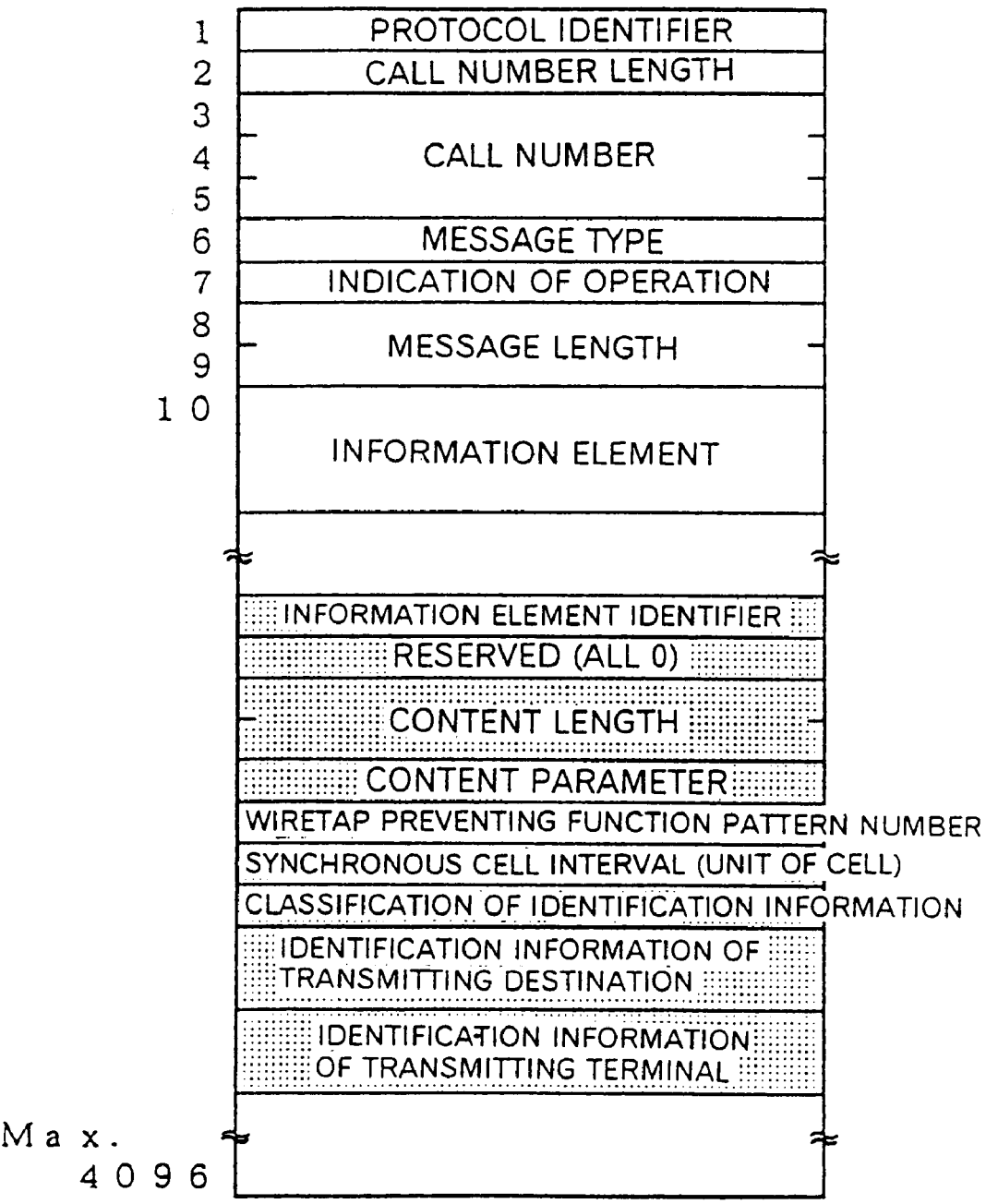
FIG. 11 is a diagram showing a data structure of a SETUP message.

FIG. 11 shows a data structure of this SETUP message. This SETUP message is pursuant to [TTC Standard User/Network Interface Signal: Vol.2, the first separate volume (part 3)], and hence explanations of respective items in the message are omitted. In the embodiment 1, respective pieces of information such as "information element identifier", "Reserved", "content length", "content parameter", "wiretap preventing function pattern number", "synchronous cell interval (cell unit)", "type of identification information", "destination identifying information" and "transmitting terminal identifying information", are added as added information on a request for the wiretap preventing function to the construction based on [TTC Standard User/Network Interface Signal: Vol.2, the first separate volume (part 3)]. The "information element identifier" is set at "01111100" to indicate the wiretap preventing function is requested. Further, a stack value "00000000" is written to "Reversed". Moreover, a value of data length hereafter is written to "content length". Further, the content parameter is set at "00000001" to indicate the wiretap preventing function is requested. Moreover, the wiretap preventing function pattern number (see FIG. 5) used for the call set by the SETUP message is designated in the item of "wiretap preventing function pattern number". Written also to "synchronous interval (cell unit)" is an interval (the number of cells) at which the synchronous cell is inserted into the cell string belonging to the call set by the SETUP message. Moreover, a type (e.g., an IP address etc) of the information for identifying the transmitting terminal and the receiving terminal is designated in "identification information type". Written to "destination identifying information" is information of a type designated by the identification information type for identifying the receiving terminal. Further, information of a type designated by the identification information type for identifying the transmitting terminal is written to "transmitting terminal identifying information".

Figure 13:
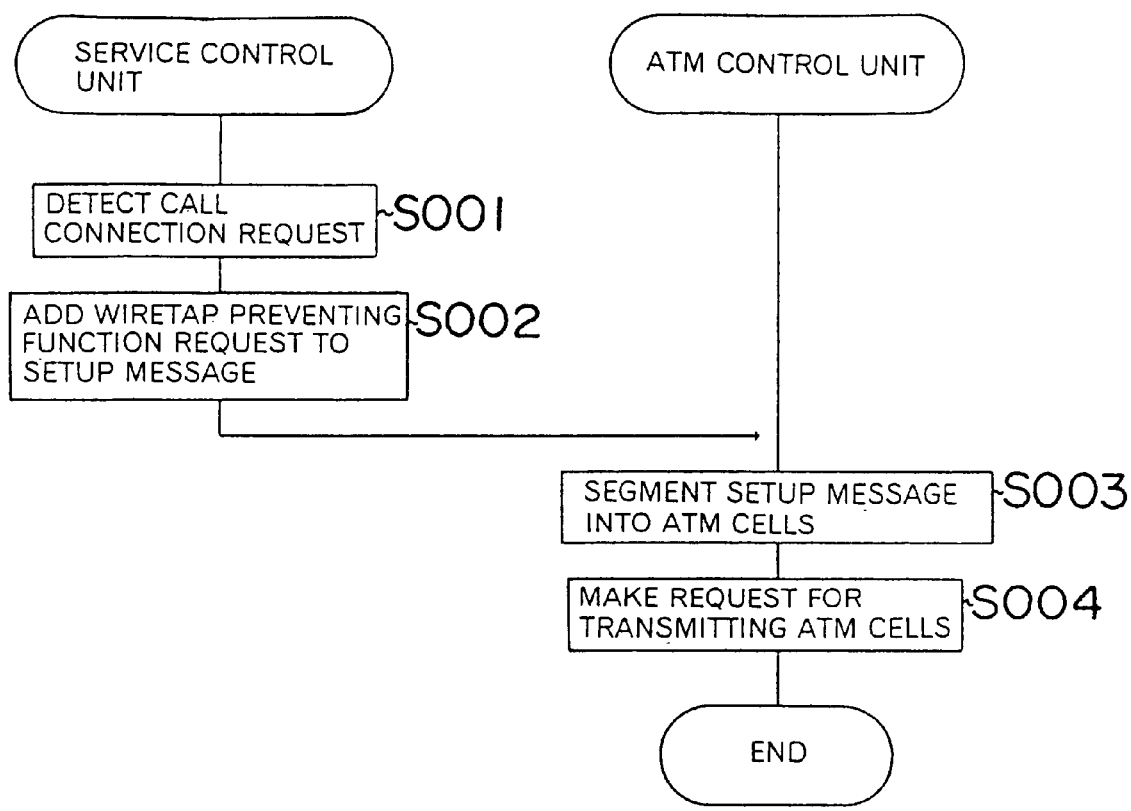
FIG. 13 is a flowchart showing a process of a transmitting-side ATM node when transmitting the SETUP message according to the first embodiment.

FIG. 13 is a flowchart showing a flow of specific processes executed in the transmitting-side ATM node 100 in order to transmit the SETUP message. According to this flowchart, the service control unit 9 detects the call connection request from the transmitting terminal in S001, generates the SETUP message and adds the wiretap preventing function request to this SETUP message in S002. The service control unit 9 transfers the thus generated SETUP message with the wiretap preventing function request to the ATM control unit 8.

In S003, the ATM control unit 8 divides (segments) the SETUP message received from the service control unit 9 into the unit of cell, and stores the ATM cell with each of them. In next S004, the ATM control unit 8 transfers the ATM cells generated in S003 to the transmission path control unit 6 via the transmitting sequence changing/restoring unit 7, and makes a request for transmission to the transmitting-side ATM network device 110. Note that, in the header added to the ATM cell for transmitting this SETUP message, the generic flow control (GFC) field is unused, the virtual path identifier (VPI) is "1", the virtual channel identifier (VCI) is "5", the payload type identifier (PTI) is "0", and the cell loss priority (CLP) is "0".

The transmission path control unit 6 transmits the ATM cells received from the ATM control unit 8 to the transmitting-side ATM network device 110 via a signaling channel (an ATM virtual channel for the signaling message, VPI=1/VCI=5) set on the transmission path 11.

Referring to FIG. 10, the ATM switch control unit 4 of the transmitting-side ATM network device 110 reproduces the SETUP message from the received ATM cell, imparts a receiving up-channel VPI/VCI and a transmission VPI/VCI to the call requested for connection through the SETUP message, and registers ATM switch control data 5a with a combination thereof. A route in the ATM switch unit 2 of the up-channel allocated to the same call is thereby determined (S04). Upon a completion of registration in the ATM switch control data 5a, the transmitting-side ATM network device 110 again segments the SETUP message on the unit of cell, and transmits the generated ATM cells towards the receiving-side ATM network device 130 (S05).

The receiving-side ATM network device 130 receives the ATM cell string having this SETUP message, as in the case of the transmitting-side ATM network device 110, determines an up-route within the ATM switch unit 2 on the basis of the SETUP message, and transfers the ATM cell string having the SETUP message to the receiving-side ATM node 140 (S06).

The receiving-side ATM network device 140 receives the ATM cell string having the SETUP message and extracts the wiretap preventing function request parameters (the wiretap preventing function pattern number, and the synchronous cell interval) from the added information about the wiretap preventing function request in the SETUP message, and registers channel corresponding data 13 with each of the wiretap preventing function request parameters (S07). Upon the registration in the channel corresponding data 13, the receiving-side ATM node 140 gives a call connection request to a receiving terminal (S08).

Figure 14:
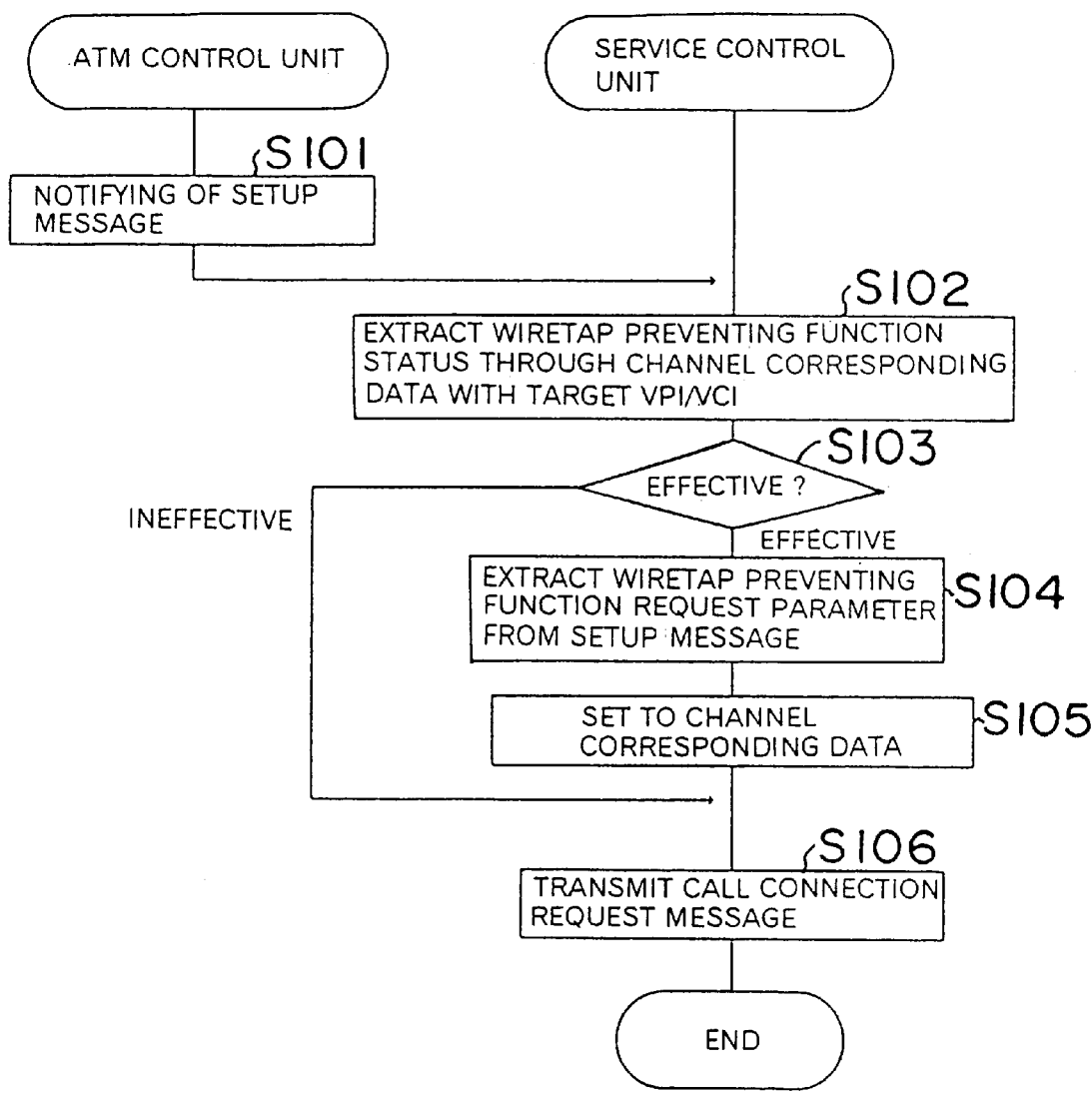
FIG. 14 is a flowchart showing a process of a receiving-side ATM node when receiving the SETUP message according to the first embodiment.

FIG. 14 is a flowchart showing a flow of specific processes in the receiving-side ATM node 140 for receiving the SETUP message. According to this flowchart, the ATM control unit 8 receives the ATM cell string via the transmission path control unit 6 and the transmitting sequence changing/restoring unit 7 reproduces the SETUP message by connecting the payload fields of the ATM cell string. Then, the ATM control unit 8 notifies the service control unit 9 of the reproduced SETUP message in S101.

The service control unit 9, upon receiving the SETUP message retrieves in S102 the channel corresponding data 13 wherein the VPI/VCI allocated by the receiving-side ATM node 140 with respect to the call pertaining to this SETUP message serves as an index, then specifies the management area Z corresponding to this VPI/VCI, and reads the wiretap preventing status flag from this management area Z. In next S103, the service control unit 9 checks the wiretap preventing status flag read in S102. Then, if the flag indicates the ineffective state, the service control unit 9 makes the processing proceed to S106. Whereas if the flag indicates the effective state, the service control unit 9 advances the processing to S104.

In S104, the service control unit 9 extracts the wiretap preventing function request parameters (the wiretap preventing function pattern number, and the synchronous cell interval) out of the SETUP message received from the ATM control unit 8.

In next S105, the service control unit 9 writes the wiretap preventing function request parameters extracted in S104 to the management area Z specified in S102. After the completion of processing in S105, the service control unit 9 sends a call connection request message to the receiving terminal in S106.

Referring to FIG. 10, when the receiving-side ATM node 140 receives a response message from the receiving terminal (S09), the node 140 generates a CONN message to which the wiretap preventing function parameters are added (S10), and transmits the CONN message towards the receiving-side ATM network device 130 (S11).

Figure 12:
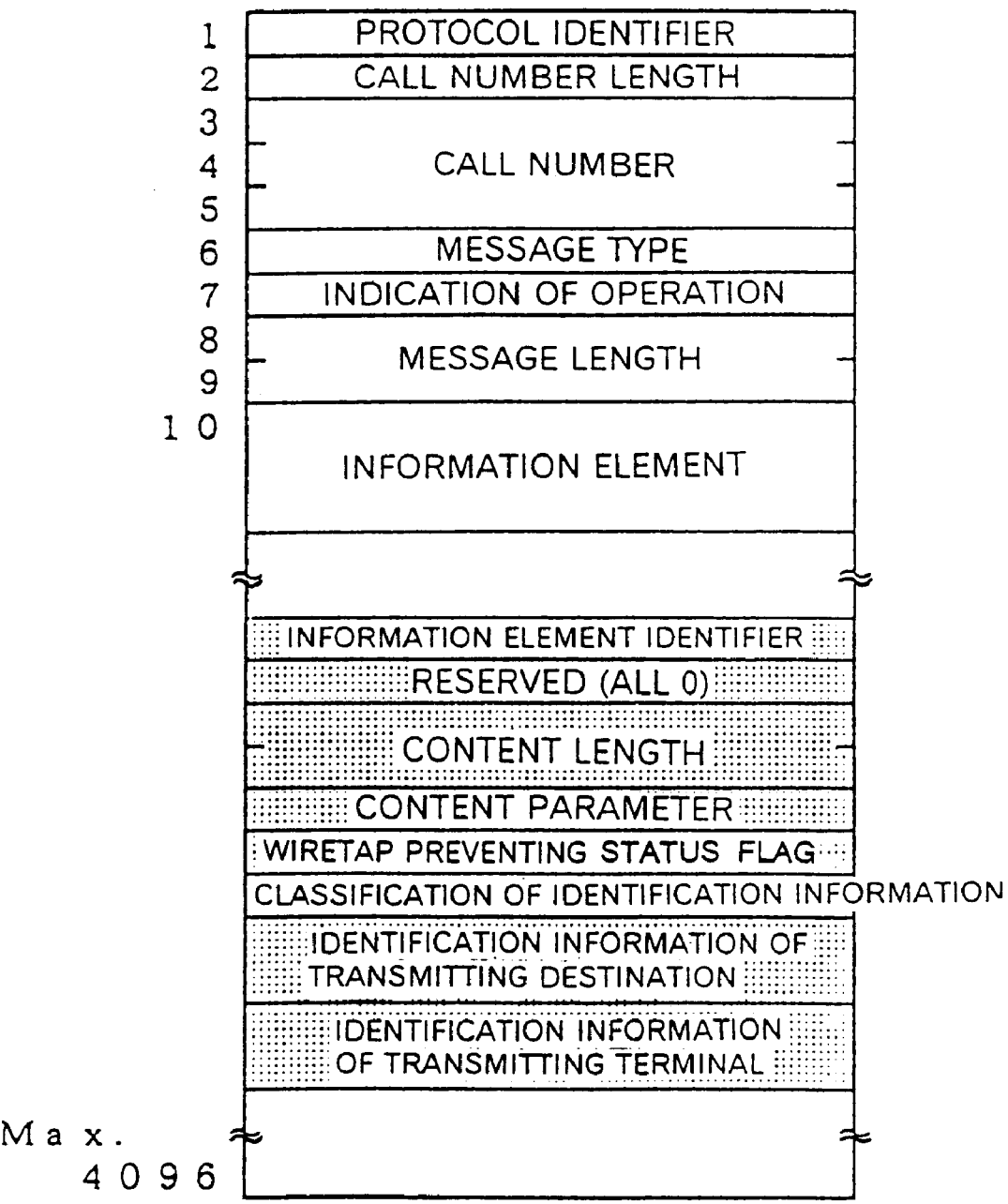
FIG. 12 is a diagram showing a data structure of a CONN message.

FIG. 12 shows a data structure of the CONN message. This CONN message is also pursuant to [TTC Standard User/Network Interface Signal: Vol.2, the first separate volume (part 3)], and hence the explanations of respective items in the message are omitted. In the embodiment 1, respective pieces of information such as "information element identifier", "Reserved", "content length", "content parameter", "wiretap preventing status flag", "type of identification information", "destination identifying information" and "transmitting terminal identifying information", are added as added information about the wiretap preventing function request to the construction based on [TTC Standard User/Network Interface Signal: Vol.2, the first separate volume (part 3)]. "00000010" showing a "wiretap preventing function response" is written to "content parameter" among those items. Further, if effective, "00000000" is written to the "wiretap preventing status flag". Whereas if, ineffective, "00000001" is written thereto. The contents of the added information other than the above-mentioned are the same as those added to the SETUP message.

Figure 15:
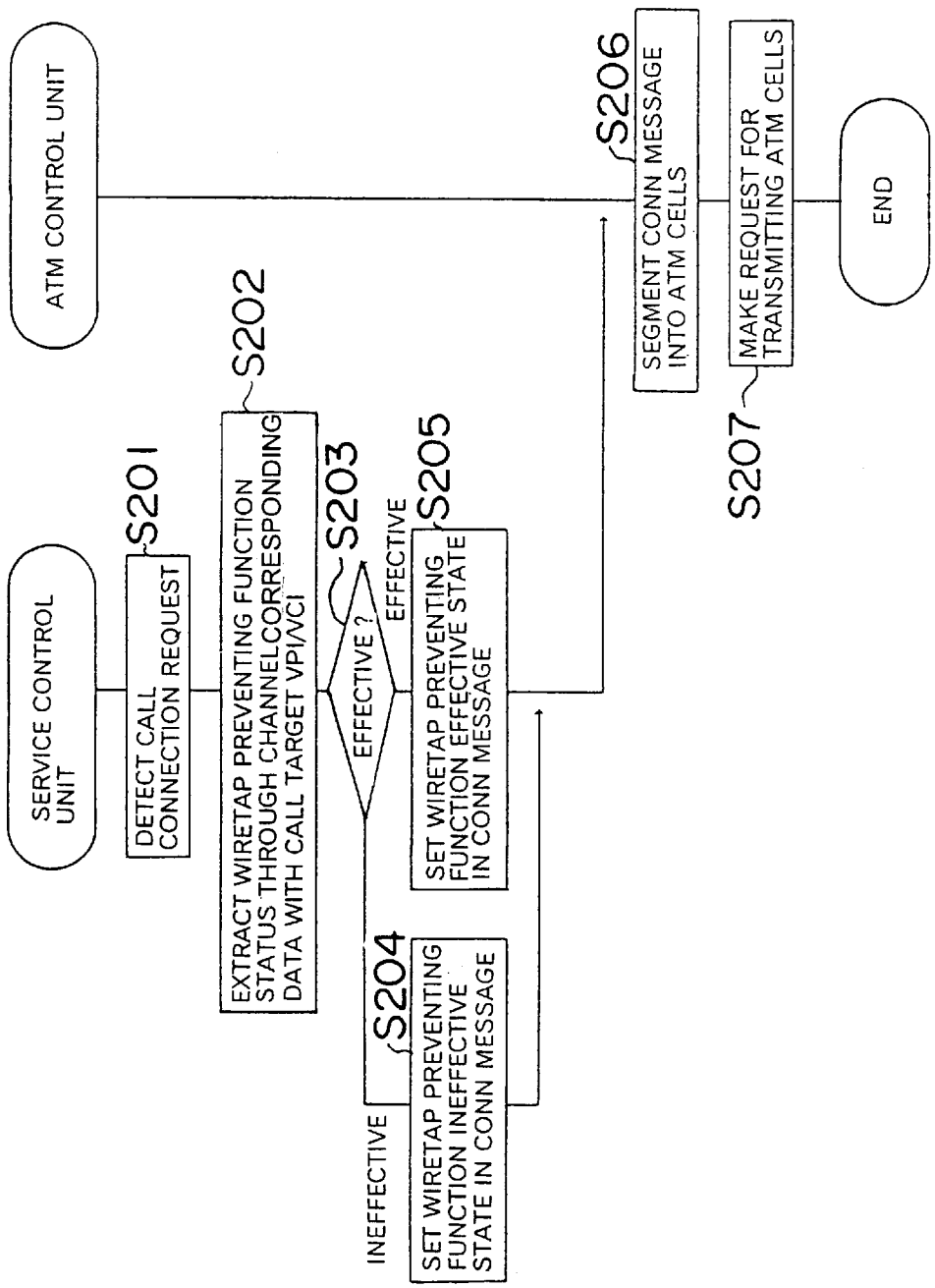
FIG. 15 is a flowchart showing a process of a receiving-side ATM node when transmitting the CONN message according to the first embodiment.

FIG. 15 is a flowchart showing a flow of specific processed executed in the receiving-side ATM node 140 in order to transmit the CONN message. According to this flowchart, the service control unit 9, when detecting a call connection response from the receiving terminal in S201, retrieves the channel corresponding data 13 in S202 wherein the up VPI/VCI allocated by the receiving-side ATM node 140 with respect to the call of the SETUP message serves as an index, then specifies the management area Z corresponding to this VPI/VCI, and reads the wiretap preventing status flag from the management area Z.

In next S203, the service control unit 9 checks the wiretap preventing status flag read in S202. Then, if the flag indicates the ineffective state, the service control unit 9 generates in S204 a CONN message in which "00000001" showing "the ineffective state" is set in "wiretap preventing status flag" thereof. Whereas if the flag indicates the effective state, the service control unit 9 generates in S205 a CONN message in which "00000000" indicating the "effective state" is set in "wiretap preventing status flag". Then, in any case, the service control unit 9 transfers the generated CONN messages to the ATM control unit 8.

In S206, the ATM control unit 8 divides the CONN message received from the service control unit 9 into the unit of cell, and stores the ATM cell with each of them. In next S207, the ATM control unit 8 transfers the ATM cells generated in S206 to the transmission path control unit 6 via the transmitting sequence changing/restoring unit 7, and makes a request for transmission to the receiving-side ATM network device 130. Note that, in the header added to the ATM cell for transmitting this CONN message, the generic flow control (GFC) field is unused, the virtual path identifier (VPI) is "1", the virtual channel identifier (VCI) is "5", the payload type identifier (PTI) is "0", and the cell loss priority (CLP) is "0".

The transmission path control unit 6 transmits the ATM cells received from the ATM control unit 8 to the receiving-side ATM network device 130 via the signaling channel (the ATM virtual channel for the signaling message, VPI=1/VCI=5) set on the transmission path 11.

Referring to FIG. 10, the ATM switch control unit 4 of the receiving-side ATM network device 130 reproduces the CONN message from the received ATM cell, imparts a receiving down-channel VPI/VCI and a transmission VPI/VCI to the call requested for response through this CONN message, and registers ATM switch control data 5a with a combination thereof. A route in the ATM switch unit 2 of the down-channel allocated to the same call is thereby determined (S12). Upon a completion of registration in the ATM switch control data 5a, the receiving-side ATM network device 130 again divides the CONN message into the unit of cell, and transmits the generated ATM cells towards the transmitting-side ATM network device 110 (S13).

The transmitting-side ATM network device 110 receives the ATM cell string for transmitting this CONN message, and determines a down-route within the ATM switch unit 2 on the basis of the CONN message, as in the case of the receiving-side ATM network device 130. Then, the device 110 transfers the ATM cell string for transmitting the CONN message to the transmitting-side ATM node 100 (S14).

The transmitting-side ATM node 100 that receives the ATM cell string for transmitting the CONN message registers the channel corresponding data 13 with each of the wiretap preventing function request parameters (the wiretap preventing function pattern number, and the synchronous cell interval) added to the SETUP message (S15). Upon a completion of the registration in the channel corresponding data 13, the transmitting-side ATM node 100 gives a call connection response to a transmitting terminal (S16).

Figure 16:
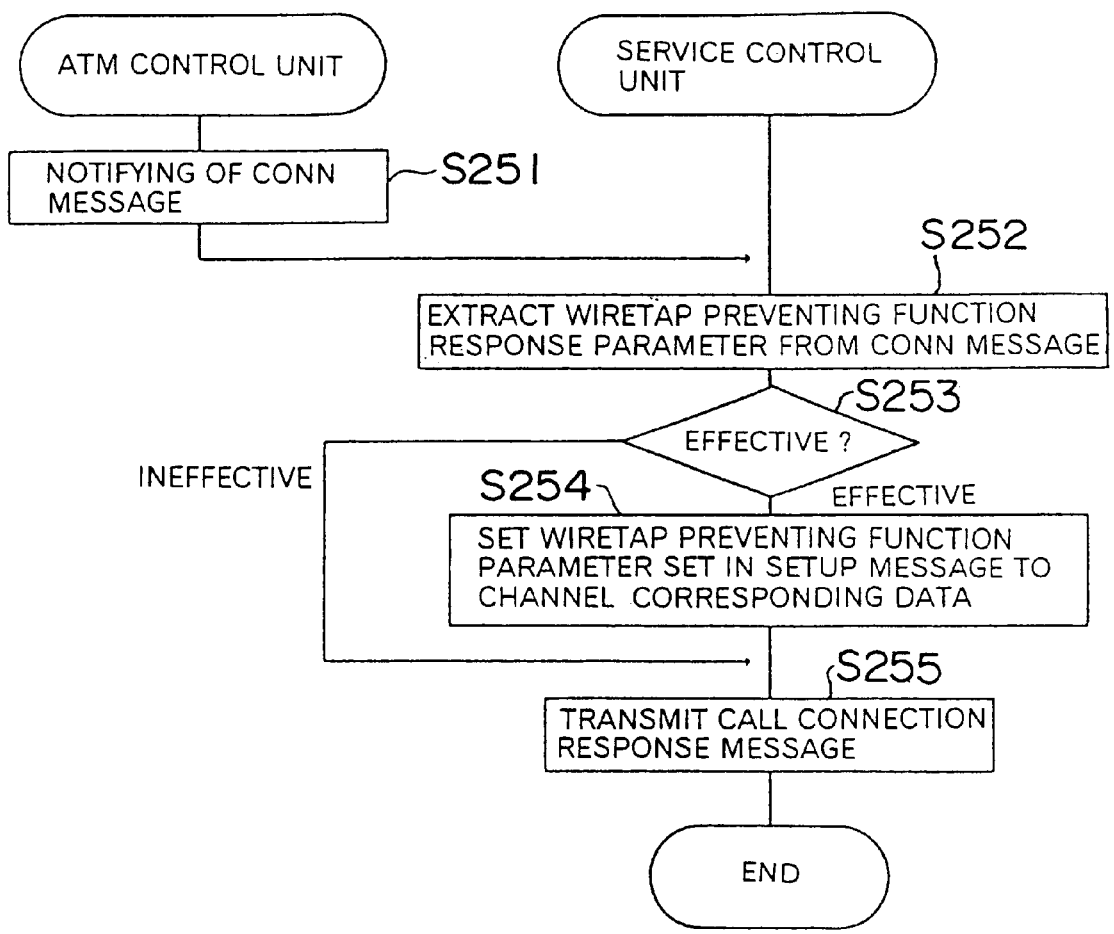
FIG. 16 is a flowchart showing a process of a transmitting-side ATM node when receiving the CONN message according to the first embodiment.

FIG. 16 is a flowchart showing a flow of specific processes executed in the transmitting-side ATM node 100 having received the CONN message. According to this flowchart, the service control unit 9 having received the ATM cell string via the transmission path control unit 6 and the transmitting sequence changing/restoring unit 7 reproduces the CONN message by connecting the payload fields of the ATM cell string. Then, the ATM control unit 8 notifies the service control unit 9 of the thus reproduced CONN message in S251.

The service control unit 9, upon receiving the CONN message reads "wiretap preventing status flag" from the CONN message in S252.

In next S253, the service control unit 9 checks the wiretap preventing status flag. Then, in the case of "00000001" showing that "wiretap preventing status flag" indicates the ineffective state, the service control unit 9 makes the processing proceed to S255. By contrast, in the case of "00000000" showing that "wiretap preventing status flag" indicates the effective state, in S254, the service control unit 9 retrieves the channel corresponding data 13 wherein the VPI/VCI allocated to the call of the SETUP message serves as an index, then specifies the management area Z corresponding to this VPI/VCI, and writes the wiretap preventing function request parameters (the wiretap preventing function pattern number, and the synchronous cell interval) added to the SETUP message to this management area Z.

After completing the processing in S254, the service control unit 9 sends a call connection response message to the transmitting terminal in S255.

With the operations described above, the call is set between the transmitting terminal and the receiving terminal via the ATM virtual up- and down-channels. With this call setting, the wiretap preventing function based in the predetermined wiretap preventing function pattern number and the predetermined synchronous cell interval is set between the ATM node 100 and the ATM node 140.

<Transmission of Information>

Hereinafter, there will be described a control content of each unit within each communication device when transmitting the information to the receiving terminal from the transmitting terminal due to the thus set call, and of a flow of information (ATM cells) between the respective communication devices.

Figure 17:
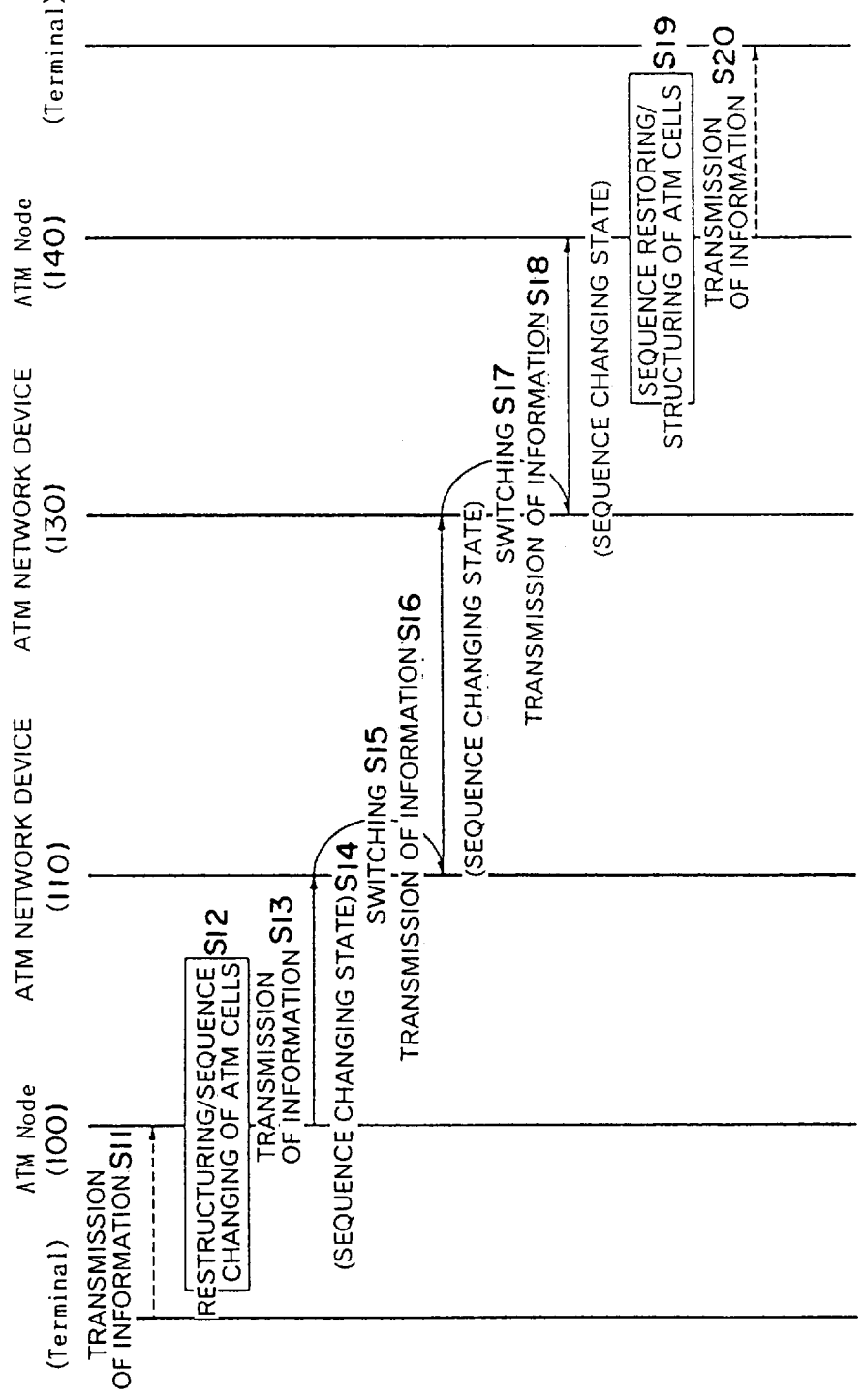
FIG. 17 is a sequence diagram showing a flow of data between respective communication devices when transmitting information according to the first embodiment.

As shown in FIG. 17, the transmitting-side ATM node 100, when receiving the information transmitted by the user terminal (the transmitting terminal) connected to the node 100 itself (S11), divides this item of information into the unit of ATM cell and changes a sequence thereof (S12), and transmits the ATM cells towards the transmitting-side ATM network device 110 (S13).

Figure 18:
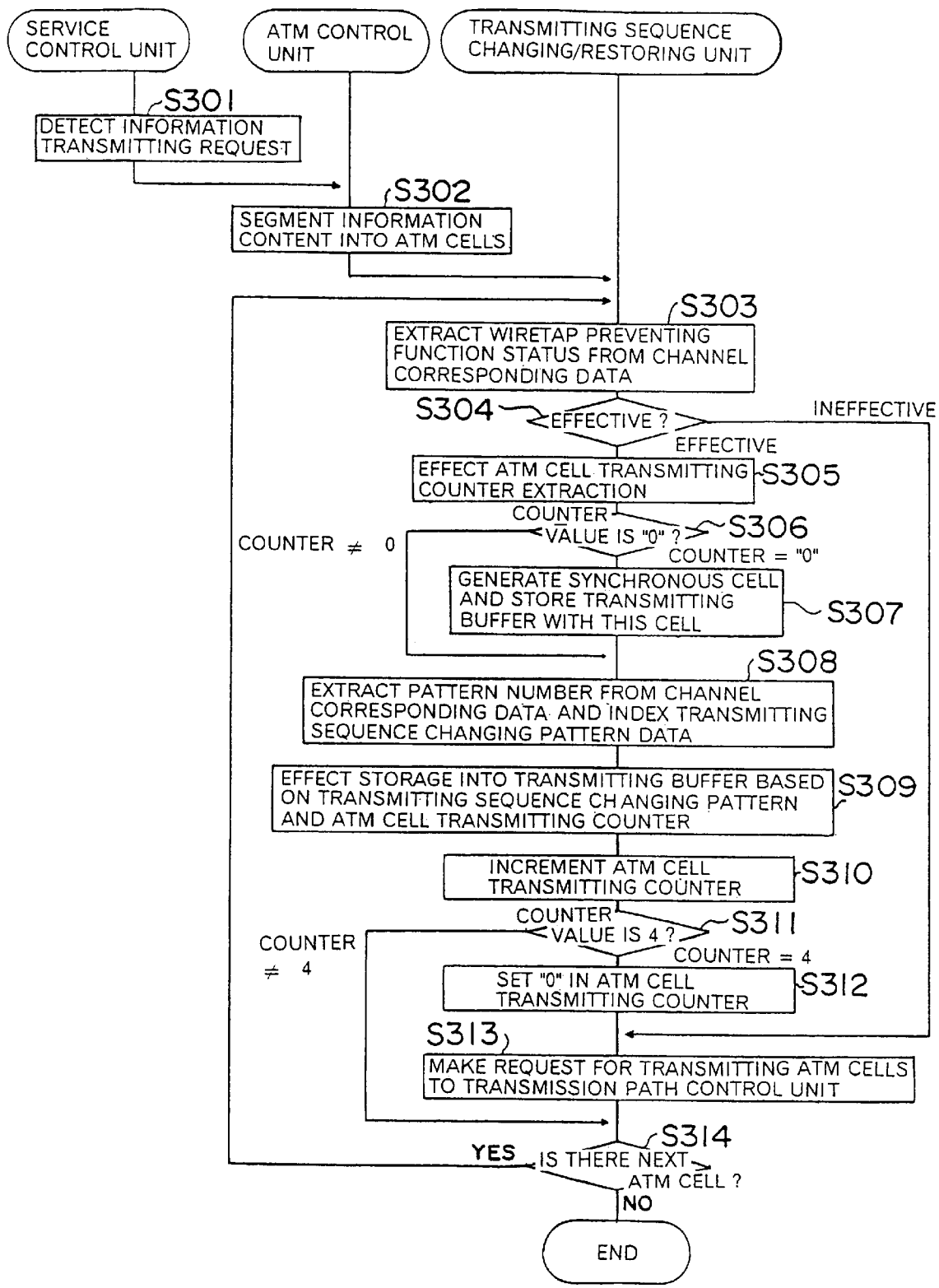
FIG. 18 is a flowchart showing a process of the transmitting-side ATM node when changing a sequence of ATM cells according to the first embodiment.

FIG. 18 is a flowchart showing a flow of specific processes executed in the transmitting-side ATM node 100 in order to transmit the cells. According to this flowchart, when the service control unit 9 detects transmitting target information together with the information transmission request from the transmitting terminal in S301, the unit 9 transfers this item of transmitting target information to the ATM control unit 8.

The ATM control unit 8 divides the transmitting target information received from the service control unit 9 into the unit of cell and stores the ATM cell with each of them in S302. The ATM control unit 8 consecutively transfers the thus generated ATM cells to the transmitting sequence changing/restoring unit 7.

The transmitting sequence changing/restoring unit 7 executes a loop of processes in S303 through S313 on each of the ATM cells received from the ATM control unit 8 in sequence of their having been received from the ATM control unit 8. In first step S303 after entering this loop of processes, the transmitting sequence changing/restoring unit 7 retrieves the channel corresponding data 13 within the storage device 10 wherein the VPI/VCI of the received ATM cell serves as an index, and reads the wiretap preventing status flag from the management area Z corresponding to this VPI/VCI.

In next step S304, the transmitting sequence changing/restoring unit 7 checks the wiretap preventing status flag. Then, if the flag indicates the ineffective state, the transmitting sequence changing/restoring unit 7 advances the processing to S313. Whereas if the flag indicates the effective state, the transmitting sequence changing/restoring unit 7 makes the processing proceed to S305.

In S305, the transmitting sequence changing/restoring unit 7 retrieves the ATM cell transmitting counter 14 of the storage device 10 wherein the VPI/VCI of the processing target ATM cell serves as an index, and specifies a management area V corresponding to this VPI/VCI. Then, the transmitting sequence changing/restoring unit 7 reads a number-of-storage-completed-ATM-cells (a counter value) from the specified management area V. It is to be noted that a counter initial value is "0".

In next step S306, the transmitting sequence changing/restoring unit 7 checks whether the counter value read in S305 is "0" or not. Then, if the counter value is not "0", the processing proceeds to S308. Whereas if the counter value is "0", the processing proceeds to S307.

In S307, the transmitting sequence changing/restoring unit 7 generates the synchronous cell having the same VPI/VCI as that of the processing target ATM cell. Then, the transmitting sequence changing/restoring unit 7 retrieves the transmitting/receiving ATM cell storage buffer 12 within the storage device 10 with this VPI/VCI serving as an index, and reads a head address of the storage area in the transmitting sub-buffer 12a which corresponds to this VPI/VCI. Then, the generated synchronous cell is stored in the head location of the storage area in the transmitting sub-buffer 12a which is specified with the read head address.

Thereafter, the transmitting sequence changing/restoring unit 7 reads a wiretap preventing function pattern number in S308 from the management area Z within the channel corresponding data 13 specified in S303. Then, the transmitting sequence changing/restoring unit 7 retrieves the transmitting sequence changing pattern data 11 in the storage device 10 wherein a 4-fold value of this pattern number serves as an index, and specifies a pattern data area Y corresponding to this value.

In next step S309, the transmitting sequence changing/restoring unit 7 sets the counter value read in S305 as being designated by i, and an ATM cell number j written in the i-th entry in the specified pattern data area Y in S308. Further, the transmitting sequence changing/restoring unit 7 retrieves the transmitting/receiving ATM cell storage buffer 12 in the storage device 10 wherein the VPI/VCI of the processing target ATM cell serves as an index, and reads the head address of the storage area within the transmitting sub-buffer 12a which corresponds to this VPI/VCI. Then, the transmitting sequence changing/restoring unit 7 specifies the storage area within the transmitting sub-buffer 12a with the read head address. Subsequently, the transmitting sequence changing/restoring unit 7 stores the j-th storage location in the specified storage area with the processing target ATM cell.

In next step S310, the transmitting sequence changing/restoring unit 7 increments the number-of-storage-completed-ATM-cells (the counter value) in the management area V specified in S305.

In next step S311, the transmitting sequence changing/restoring unit 7 checks whether the counter value after being incremented in S310 is "4" or not. Then, if the counter value is not "4", the transmitting sequence changing/restoring unit 7 diverts the processing to S314 and, whereas if the counter value is "4", advances the processing to S312.

In S312, the transmitting sequence changing/restoring unit 7 resets to "0" the number-of-storage-completed-ATM-cells (the counter value) in the management area V specified in S305 and advances the processing to S313.

In S313, the transmitting sequence changing/restoring unit 7, when the processing diverts directly from S304, transfers the processing target ATM cell to the transmission path control unit 6, and requests transmission. Further, when the processing proceeds from S312, the transmitting sequence changing/restoring unit 7 reads five ATM cells (the head thereof is the synchronous cell) out of the storage area of the transmitting sub-buffer 12a which has been specified in S309 sequentially from the head location thereof, then transfers the ATM cells to the transmission path control unit 6, and requests transmission.

After a completion of the process in S313, the transmitting sequence changing/restoring unit 7 checks whether or not the next ATM cell is received from the ATM control unit 8 in S314. Then, if the next ATM cell is received, the transmitting sequence changing/restoring unit 7 returns the processing to S303.

By contrast, if all the ATM cells received from the ATM control unit 8 have been completely transferred to the transmission path control unit 6 as a result of repeating the loop of processes in S303 through S314, the transmitting sequence changing/restoring unit 7 finishes the processing.

The transmission path control unit 6 sends the ATM cells thus received from the transmitting sequence changing/restoring unit 7 towards the ATM network device 110 via the transmission path 11 in the receiving sequence.

Referring to FIG. 17, an UNI transmission path control unit 1 of the transmitting-side ATM network device 110 rewrites the header of the ATM cell received from the ATM node 100 under the control of the ATM switch control unit 4, and sends the ATM cell to the ATM switch unit 2. The switch unit 2 switches the thus sent ATM cell along the ATM virtual channel in which the call is set, and sends it to any one of NNI transmission path control units 3 (S15). The NNI transmission path control unit 3 rewrites the header of the ATM cell received from the ATM switch unit 2 under the control of the ATM switch control unit 4, and sends it to the receiving-side ATM network device 130 via the ATM network 120 (S16).

The NNI transmission path control unit 3 of the receiving-side ATM network device 130 rewrites the header of the ATM cell received from the ATM network 120 under the control of the ATM switch control unit 4, and sends it to the ATM network switch unit 2. The switch unit 2 switches the thus sent ATM cell along the ATM virtual channel in which the call is set, and sends it to any one of UNI transmission path control units 1 (S17). The UNI transmission path control unit 1 rewrites the header of the ATM cell received from the ATM switch unit 2 under the control of the ATM switch control unit 4, and sends it to the ATM node 140 via the transmission path 11 (S18).

The receiving-side ATM node 140, upon receiving the ATM cell from the receiving-side ATM network device 130, reproduces the transmitting target information by restoring the sequence of the received ATM cells to the original one (S19), and transmits the reproduced information to the receiving terminal (S20).

Figure 19:
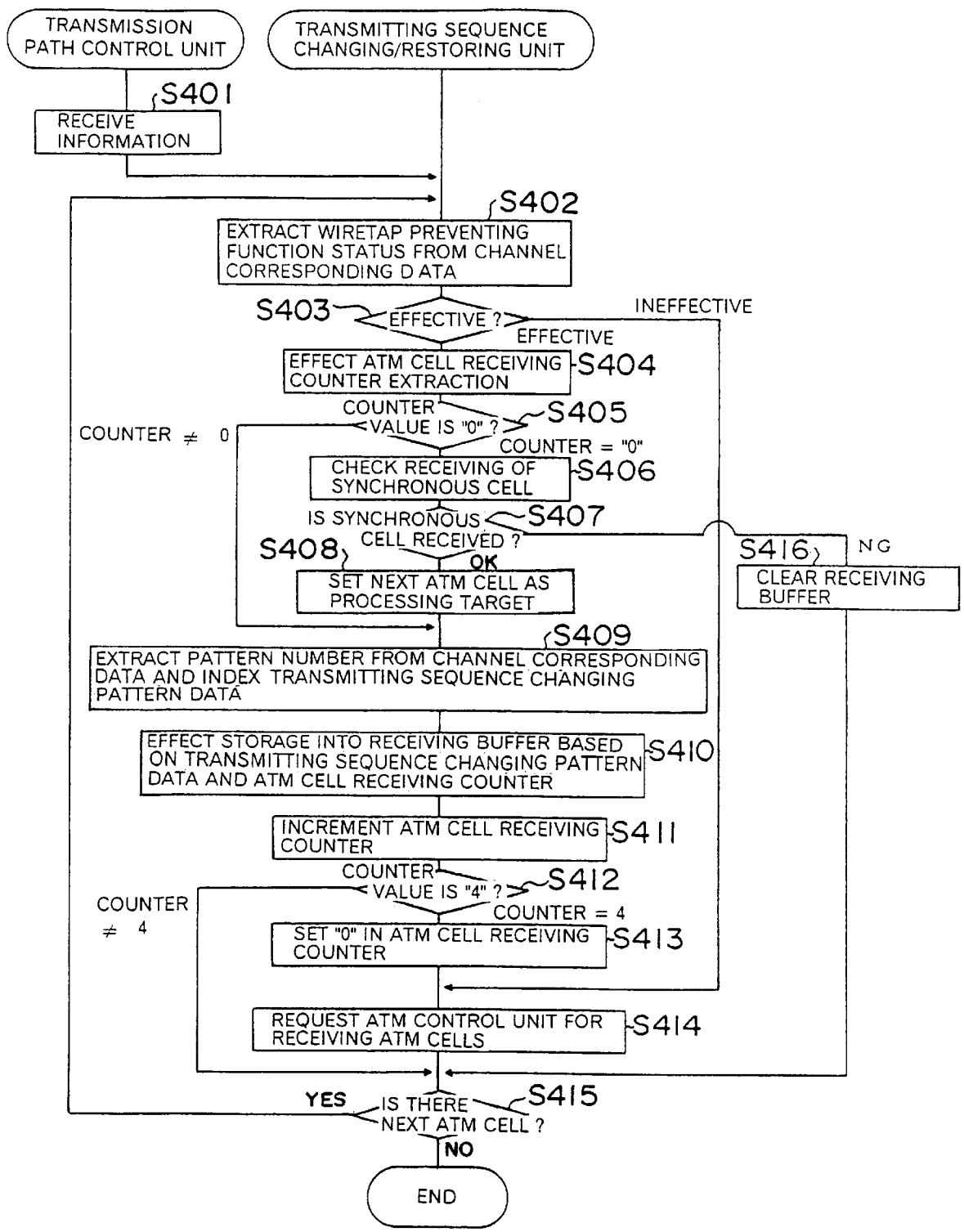
FIG. 19 is a flowchart showing a process of the receiving-side ATM node when restoring the sequence of ATM cells according to the first embodiment.

FIG. 19 is flowchart showing a flow of specific processes executed in the receiving-side ATM node 140 for reproducing this item of information. According to this flowchart, the transmission path control unit 6, in S401, when receiving the ATM cell stored with the information from the receiving-side ATM network device 130, transfers the received ATM cell to the transmitting sequence changing/restoring unit 7.

The transmitting sequence changing/restoring unit 7 executes a loop of processes in S402 through S416 on each of the ATM cells received from the transmission path control unit 6 in the sequence of their being received from the transmission path control unit 6. In first step S402 after entering this loop of processes, the transmitting sequence changing/restoring unit 7 retrieves the channel corresponding data 13 in the storage device 10 with the received ATM cell VPI/VCI serving as an index, and reads the wiretap preventing status flag from the management area Z corresponding to this VPI/VCI.

In next step S403, the transmitting sequence changing/restoring unit 7 checks the wiretap preventing status flag. Then, if the flag indicates the ineffective state, the transmitting sequence changing/restoring unit 7 advances the processing to S414.

Whereas if the flag indicates the effective state, the transmitting sequence changing/restoring unit 7 retrieves in S404 the ATM cell receiving counter 15 of the storage device 10 wherein the VPI/VCI of the processing target ATM cell serves as an index, and specifies a management area W corresponding to this VPI/VCI. Then, the transmitting sequence changing/restoring unit 7 reads a number-of-received-ATM-cells (a counter value) from the specified management area W. It is to be noted that a counter initial value is "0".

In next step S405, the transmitting sequence changing/restoring unit 7 checks whether the counter value read in S404 is "0" or not. Then, if the counter value is not "0", the processing proceeds to S409. Whereas if the counter value is "0", the processing proceeds to S406.

In S406, the transmitting sequence changing/restoring unit 7 checks whether or not the processing target ATM cell received from the transmission path control unit 6 is the synchronous cell.

Then, in S407, when judging that the processing target ATM cell is not the synchronous cell, the transmitting sequence changing/restoring unit 7 advances the processing to S416. In S416, the transmitting sequence changing/restoring unit 7 retrieves the transmitting/receiving ATM cell storage buffer 12 in the storage device 10 with the processing target ATM cell VPI/VCI serving as an index, and reads the head address of the receiving sub-buffer 12b. Then, the transmitting sequence changing/restoring unit 7 clears the storage area within the receiving sub-buffer 12b which is specified with the read head address. After a completion of the process in S416, the transmitting sequence changing/restoring unit 7 advances the processing to S415.

By contrast, when judging in S407 that the processing target ATM cell is the synchronous cell, the transmitting sequence changing/restoring unit 7 discards the processing target synchronous cell, and treats the next ATM cell received from the transmission path control unit 6 as a processing target. After a completion of the process in S408, the transmitting sequence changing/restoring unit 7 advances the processing to S409.

In S409, the transmitting sequence changing/restoring unit 7 reads the wiretap preventing function pattern number from the management area Z in the channel corresponding data 13 specified in S402. Then, the transmitting sequence changing/restoring unit 7 retrieves the transmitting sequence changing pattern data 11 in the storage device 10 wherein a 4-fold value of this pattern number serves as an index, and specifies the pattern data area Y corresponding to this value.

In next step S410, the transmitting sequence changing/restoring unit 7 sets the counter value read in S404 as being designated by k, and examines an entry in which the ATM cell number k is written in the pattern data area Y specified in S409, and specifies a number-of-entries $n_e$ ranging from the head thereof up to the entry concerned in the pattern data area Y. Further, the transmitting sequence changing/restoring unit 7 retrieves the transmitting/receiving ATM cell storage buffer 12 in the storage device 10 wherein the VPI/VCI of the processing target ATM cell serves as an index, and reads the head address in the storage area within the receiving sub-buffer 12b which corresponds to this VPI/VCI. Then, the transmitting sequence changing/restoring unit 7 specifies the storage area within the receiving sub-buffer 12b with the read head address serving as an index. Then, the transmitting sequence changing/restoring unit 7 stores the $n_e$-th storage location in the specified storage area with the processing target ATM cell.

In next step S411, the transmitting sequence changing/restoring unit 7 increments the number-of-received-ATM-cells (the counter value) in the management area W specified in S404.

In next step S412, the transmitting sequence changing/restoring unit 7 checks whether the counter value after being incremented in S411 is "4" or not. Then, if the counter value is not "4", the transmitting sequence changing/restoring unit 7 diverts the processing to S415 and, whereas if the counter value is "4", advances the processing to S413.

In S413, the transmitting sequence changing/restoring unit 7 resets to "0" the number-of-received-ATM-cells (the counter value) in the management area W specified in S404. After a completion of the process in S413, the transmitting sequence changing/restoring unit 7 advances the processing to S414.

In S414, the transmitting sequence changing/restoring unit 7, when the processing diverts directly from S403, transfers the processing target ATM cell to the ATM control unit 8, and requests transmission. Further, when the processing proceeds from S413, the transmitting sequence changing/restoring unit 7 reads four ATM cells out of the storage area of the receiving sub-buffer 12b which has been specified in S410 sequentially from the head location thereof, then transfers the ATM cells to the ATM control unit 8, and requests transmission.

After a completion of the process in S414, the transmitting sequence changing/restoring unit 7 checks whether or not the next ATM cell is received from the transmission path control unit 6 in S415. Then, if the next ATM cell is received, the transmitting sequence changing/restoring unit 7 returns the processing to S402.

By contrast, if all the ATM cells received from the transmission path control unit 6 have been completely transferred to the ATM control unit 8 as a result of repeating the loop of processes in S402 through S416, the transmitting sequence changing/restoring unit 7 finishes the processing.

The ATM control unit 8 extracts only the contents of the payload fields from the ATM cell string received from the transmitting sequence changing/restoring unit 7, and connects the contents extracted to reproduce the transmitting target information. The ATM control unit 8 transfers the thus reproduced transmitting target information to the service control unit 9. The service control unit 9 transmits the transmitting target information received from the ATM control unit 8 to the receiving terminal.

Figure 20A:
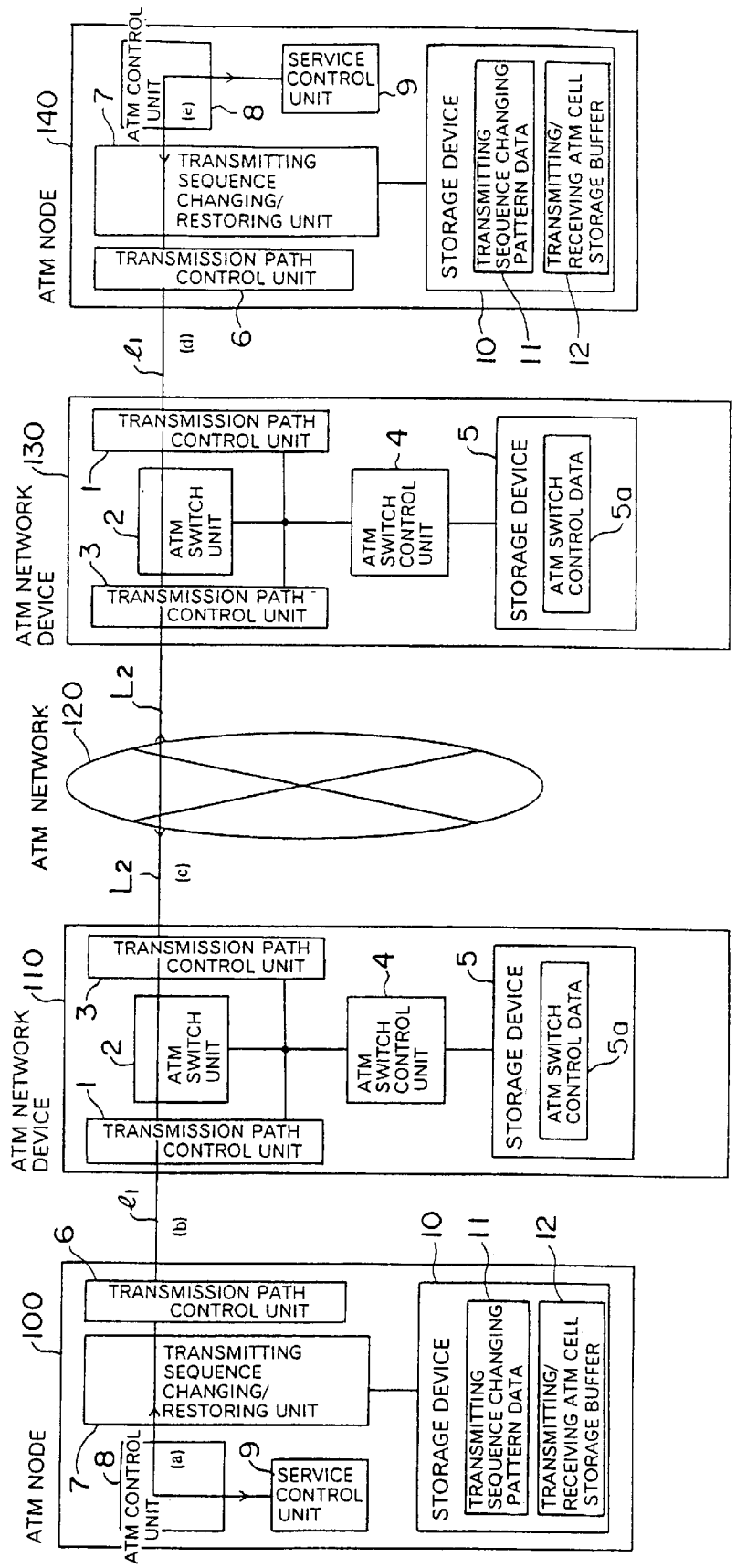
FIG. 20 is a block diagram showing an operation in the first embodiment.

In accordance with the thus constructed first embodiment of the present invention, as illustrated in FIG. 20A, the transmitting target information transmitted from the transmitting terminal is in the cell state transmitted from the receiving-side ATM node 140 from the transmitting-side ATM node 100 via the transmitting-side ATM network device 110, the ATM network 120 and the receiving-side ATM network device 130.

Figure 20B:
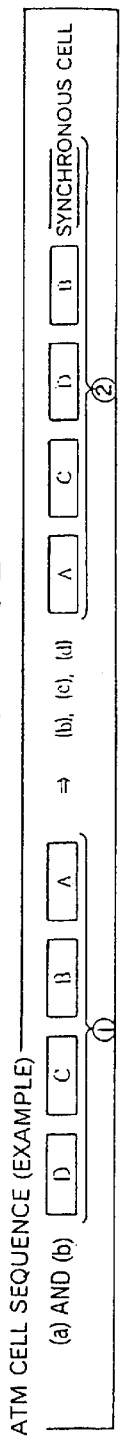

At this time, as shown in FIG. 20B(1), the ATM cells are arranged in sequence of the locations within the transmitting target information of the data stored in the respective payload fields in a section (a) ranging from the ATM control unit 8 to the transmitting sequence changing/restoring unit 7 of the transmitting-side ATM node 100. Herein, it is assumed that the cells are arranged schematically in such a sequence as A, B, C, D. Owing to the function of the transmitting sequence changing/restoring unit 7, the cells of this cell string are, as shown in FIG. 20B(2), grouped by fours, the synchronous cell is added to the head each group, and the sequence thereof is changed. Herein, it is assumed that the sequence be changed into B, D, C, A. The respective cells are transferred in the thus changed sequence in sections (b–d) ranging from the transmitting sequence changing/restoring unit 7 of the transmitting-side ATM node 100 to the transmitting sequence changing/restoring unit 7 of the receiving-side ATM node 140. Accordingly, even if the ATM cell string is intercepted by the third part in this section, this third party, even though able to identify the synchronous cell, does not know the original sequence of the four ATM cells between the respective synchronous cells and is therefore unable to reproduce the original transmitting target information. While on the other hand, the transmitting sequence changing/restoring unit 7 of the receiving-side ATM node 140 is capable of recognizing where the groups of the received cell string are delimited based on the synchronous cells and restoring the sequence of the ATM cells within the thus recognized group (on the basis of the sequence changing pattern previously agreed upon between the transmitting-side ATM node 100 and the node 140 itself through the SETUP message and the CONN message), whereby the transmitting target information can be reproduced.

[Embodiment 2]

A second embodiment of the present invention is characterized by incorporating the wiretap preventing function into each of ATM network devices 210, 230 and thus preventing the wiretap from the path between the transmitting-side ATM network device 210 and the receiving ATM network device 230.

(Construction of ATM Network System)

FIG. 21 is a block diagram schematically showing a construction of the ATM network system and constructions of the respective communication devices constituting this ATM network system in the second embodiment of the present invention. As shown in FIG. 21, the basic construction of the ATM network system in the second embodiment is the same as that in the first embodiment. Only constructions of ATM nodes 200, 240 and the ATM network devices 210, 230 in the second embodiment are, however, different from those in the first embodiment. The specific constructions thereof will hereinafter be described.

<ATM Network Device>

Each of the ATM network devices 210, 230 is classified as the ATM switch for controlling the transmission path. Each of these ATM network devices 210, 230 is constructed of the UNI (User Network Interface) transmission path control unit 1 connected to the transmission path (the physical line) $L_1$ led to the ATM node 200 or 240, the NNI (Network-to-Network Interface) transmission path control unit 3 connected to the transmission path (the physical line) $L_2$ led to other ATM network device within an ATM network 220, the ATM switch unit 2 connected to the UNI transmission path control unit 3, a transmitting sequence changing/restoring unit 16 connected between the ATM switch unit 2 and the UNI transmission path control unit 3, the ATM switch control unit 4 connected to these transmission path control units 1, 3 and to the ATM switch unit 2, and the storage device 5 connected to this ATM switch control unit 4 and to the transmitting sequence changing/restoring unit 16. Note that the two transmission path control units 1, 3 and the ATM switch control unit 2 are absolutely the same as those in the first embodiment, and the explanations thereof are omitted.

The storage device 5 is a memory stored with the ATM switch control data 5a which are absolutely the same as the data stored in the storage device 5 in the first embodiment, and the transmitting sequence changing pattern data 11, the transmitting/receiving ATM cell storage buffer 12, the channel corresponding data 13, the ATM cell transmitting counter 14 and the ATM cell receiving counter 15 that are all the same as those stored in the storage device 10 in the first embodiment.

The transmitting sequence changing/restoring unit 16 has absolutely the same construction as the construction of each of the transmitting sequence changing/restoring units 7 within the ATM nodes 100, 140 in the first embodiment. The different point is that the transmitting sequence changing/restoring unit 16 in the second embodiment changes the sequence of the ATM cells received from the ATM switch unit 2, then transfers the ATM cells to the NNI transmission path control unit 3, and also transfers the ATM cells to the ATM switch unit 2 after restoring the sequence of the ATM cells received from the NNI transmission path control unit 3.

<ATM Node>

The ATM nodes 200, 240 are communication devices, to which the ATM network devices 210, 230 connected via the transmission path 11 provide communication services, and each incorporate a function of terminating the ATM.

The ATM nodes 200, 240 are constructed of the transmission path control units 6 connected to the transmission paths (the physical lines) $L_1$ led to the ATM network devices 210, 230, the ATM control units 8 connected to the transmission path control units 6, and the service control units 9 connected to the ATM control units 8. The configurations of the transmission path control unit 6, the ATM control unit 8 and the service control unit 9 are absolutely the same as those in the first embodiment, and hence the explanations thereof are omitted.

(Flow of Operation in ATM Network System)

Next, operations of the respective communication devices when providing the wiretap preventing function in the thus constructed ATM network system, will be explained.

<Call Setting>

The content of control of each unit within each of the communication devices in the call setting process and a flow of data (the ATM cells) between the respective communication devices, are absolutely the same as those in the first embodiment, and hence the explanations thereof are omitted.

<Transmission of Information>

Explained next are the content of control of each unit within each of the communication devices when transmitting the information from the transmitting terminal to the receiving terminal due to the call set in the manner described above, and a flow of the information (the ATM cells) between the respective communication devices.

As shown in FIG. 22, the transmitting-side ATM node 200, when receiving the information transmitted from the user terminal (the transmitting terminal) connected to the node 200 itself (S21), divides this item of information into the unit of ATM cell and transmits the information towards the transmitting-side ATM network device 210 (S22).

The UNI transmission path control unit 1 of the transmitting-side ATM network device 210 rewrites the header of the ATM cell received from the transmitting-side ATM node 200 under the control of the ATM switch control unit 4, and sends the ATM cell to the ATM switch unit 2. The switch unit 2 switches the thus sent ATM cell along the ATM virtual channel in which the call is set, and sends it to the transmitting sequence changing/restoring unit 16 (S23). The transmitting sequence changing/restoring unit 16 groups the ATM cells by fours which have been received from the ATM switch unit 2, and adds the synchronous cell to the head of this group. Then, the transmitting sequence changing/restoring unit 16 changes the sequence of the ATM cells within the group consisting of the four cells, and sequentially transfers the cells to the NNI transmission path control unit 3 (S24). The operation of the transmitting sequence changing/restoring unit 16 on this occasion goes as shown in S303 through S313 in FIG. 18. The NNI transmission path control unit 3 rewrites the header of the ATM cell thus received from the transmitting sequence changing/restoring unit 16 under the control of the ATM switch control unit 4, and sends the ATM cells in the receiving sequence toward the receiving-side ATM network device 230 via the transmission path 12 (S25).

The NNI transmission path control unit 3 of the receiving-side ATM network device 230 rewrites the header of the ATM cell received from the transmission-side ATM network device 210 under the control of the ATM switch control unit 4, and sends the ATM cells to the transmitting sequence changing/restoring unit 16. The transmitting sequence changing/restoring unit 16 groups the cell string received from the NNI transmission path control unit 3 on the basis of the synchronous cell, then restores the sequence of the remaining four ATM cells of each group after excluding the synchronous cell, and sequentially transfers the cells to the ATM switch unit 2 (S27). The operation of the transmitting sequence changing/restoring unit 16 on this occasion goes as shown in S402 through S416 in FIG. 19. The ATM switch unit 2 switches the thus sent ATM cell along the ATM virtual channel in which the call is set, and sends it to the UNI transmission path control unit 1 (S26) . The UNI transmission path control unit 1 rewrites the header of the ATM cell thus received from the ATM switch unit 2 under the control of the ATM switch control unit 4, and sends the ATM cells in the receiving sequence towards the receiving-side ATM node 240 via the transmission path 11 (S28).

The receiving-side ATM node 240, upon receiving the ATM cells from the receiving-side ATM network device 230, reproduces the transmitting target information by connecting contents of the payload fields of the received ATM cells, and transmits the reproduced transmitting target information to the receiving terminal (S29).

In accordance with the thus constructed second embodiment of the present invention, the ATM cells are arranged in the sequence of locations within the transmitting target information of the data stored in the respective payload fields in the section ranging from the ATM control unit 8 of the transmitting-side ATM node 200 to the transmitting sequence changing/restoring unit 16 of the transmitting-side ATM network device 210. Owing to the function of the transmitting sequence changing/restoring unit 16, the cells of this ATM cell string are grouped by fours, the synchronous cell is added to the head of each group, and the sequence thereof is changed. The respective cells are transferred in the thus changed sequence in the section ranging from the transmitting sequence changing/restoring unit 16 of the transmitting-side ATM network device 210 to the transmitting sequence changing/restoring unit 16 of the receiving-side ATM network device 230. Accordingly, even if the ATM cell string is intercepted by the third party in this section, this third party, even though able to identify the synchronous cell, does not know the original sequence of the four ATM cells between the respective synchronous cells and is therefore unable to reproduce the original transmitting target information. While on the other hand, the transmitting sequence changing/restoring unit 16 of the receiving-side ATM network device 230 is capable of recognizing where the groups of the received cell string are delimited based on the synchronous cells and restoring the sequence of the ATM cells within the thus recognized group (on the basis of the sequence changing pattern previously agreed upon between the transmitting-side ATM node 200 and the network device 230 itself through the SETUP message and the CONN message), whereby the transmitting target information can be reproduced.

In accordance with the second embodiment, only the mechanism within the ATM network 220 is capable of providing the wiretap preventing function, and hence there must be no necessity for making the user prepare any special devices.

[Embodiment 3]

In the first and second embodiments discussed above, since the wiretap preventing function is set by switching the SETUP message and the CONN message, the wiretap is prevented during the period for which the call is set. By contrast, a third embodiment of the present invention is characterized by starting the wiretap preventing function by transmitting the OAM cell towards the receiving-side ATM node 140 from the transmitting-side ATM node 100.

(Construction of ATM Network System)

Figure 23:
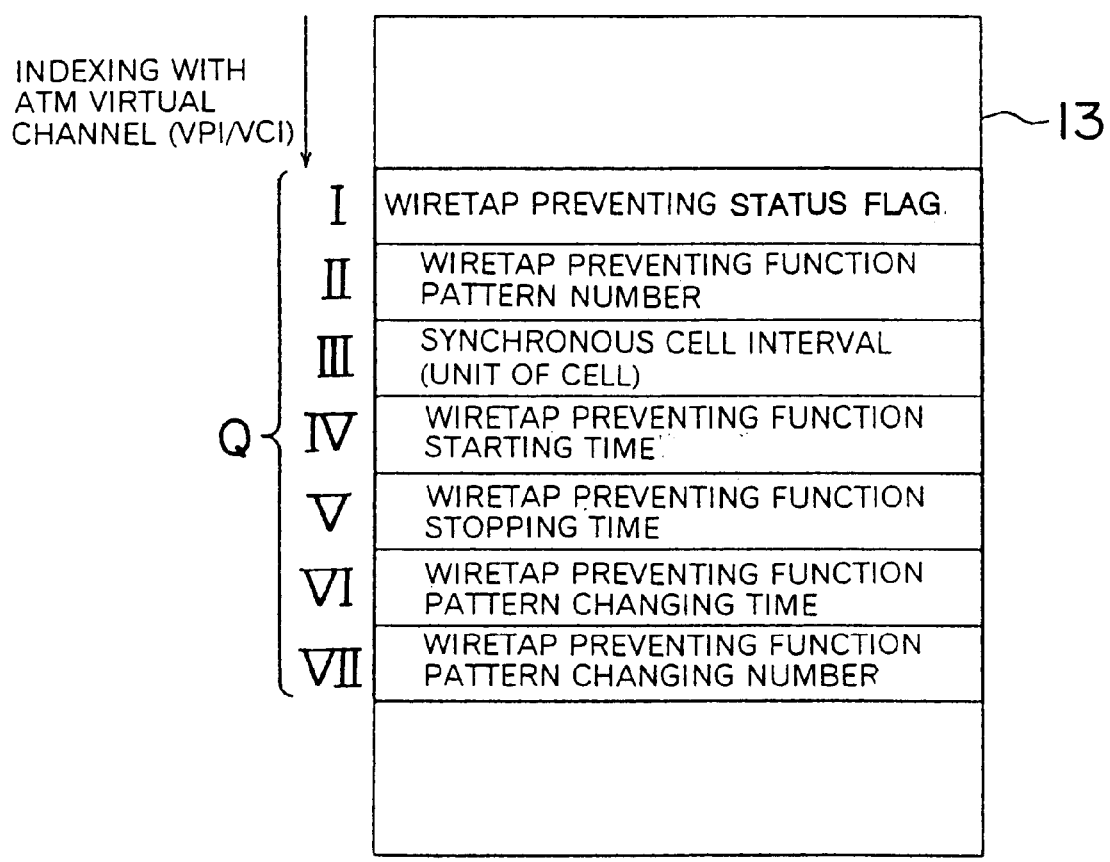
FIG. 23 is a diagram showing a data structure of channel corresponding data in a third embodiment of the present invention.

FIG. 23 is a diagram showing a data structure of the channel corresponding data 13 stored in the storage device 10 of each of the ATM nodes 100, 140. As shown in FIG. 23, the channel corresponding data 13 is provided with a management area Q consisting of a wiretap preventing status flag area I for indicating whether or not the wiretap preventing function is provided per VPI/VCI to a call allocated with an ATM virtual channel corresponding to a management target VPI/VCI, a wiretap preventing function pattern number area II for indicating a sequence changing pattern number used for the wiretap preventing function provided, a synchronous cell interval column III for showing a synchronous cell insertion interval in the wiretap preventing function provided, a wiretap preventing function starting time column IV for showing a time when starting the wiretap preventing function, a wiretap preventing function stopping time column V for showing a time when stopping the wiretap preventing function, a wiretap preventing function pattern changing time column VI for showing a time when changing the sequence changing pattern, and a wiretap preventing function pattern change number column VII for showing a sequence changing pattern number after being changed. Each management area Q is allocated within the channel corresponding data 13 so that a value of the management target VPI/VCI is coincident with the head address thereof.

Note that other configurations in the third embodiment are all the same as those in the first embodiment discussed above, and hence the explanations thereof are omitted.

Figure 24:
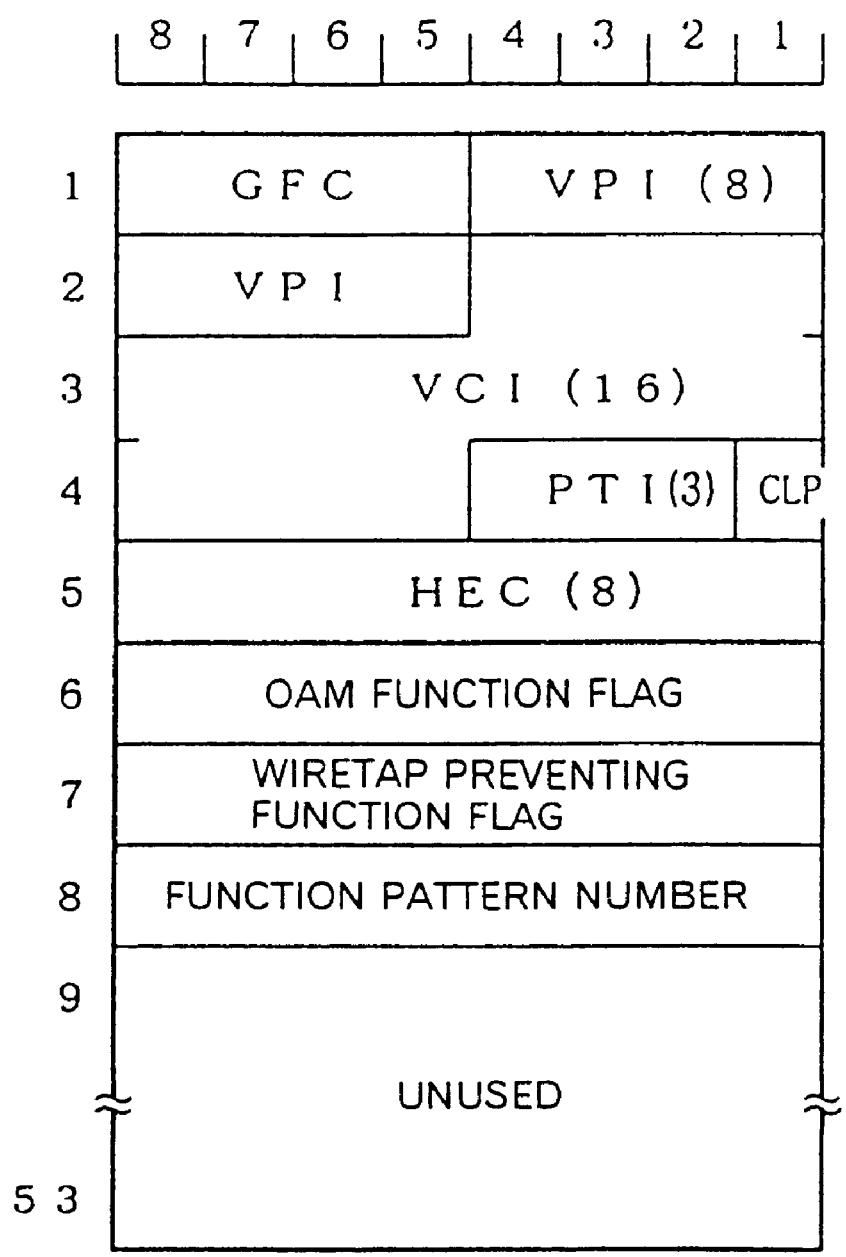
FIG. 24 is a diagram showing a data structure of the synchronous cell according to the third embodiment.

Next, there will be explained a structure of the synchronous cell (the OAM cell) inserted in the cell string by the transmitting sequence changing/restoring unit 7 of the transmitting-side ATM node 100. As illustrated in the data structure diagram of FIG. 24, this synchronous cell (the OAM cell) is characterized by adding a "wiretap preventing function flag" and a "function pattern number" as compared with the one shown in FIG. 9 in the first embodiment. Written to this "wiretap preventing function flag" are "00000001" for indicating "start of providing function", "00000010" for indicating "stop of providing function" or "00010000" for indicating "change of function pattern". Further, the wiretap preventing function pattern number after being changed is written to the "function pattern number" when "00010000" is written to the "wiretap preventing function flag".

(Flow of Operation in ATM Network System)

Given next is an explanation of the operation of each communication device when providing the wiretap preventing function in the thus constructed ATM network system.

<Call Setting>

The control content of each unit within each of the communication device when setting the call, and the flow of the data (the ATM cells) between the respective communication devices, are absolutely the same as those in the first embodiment, and hence the explanations thereof are omitted.

<Transmission of Information>

Explained next are the content of control of each unit within each of the communication devices when transmitting the information from the transmitting terminal to the receiving terminal due to the call set in the manner described above, and a flow of the information (the ATM cells) between the respective communication devices.

As shown in FIG. 17, the transmitting-side ATM node 100, when receiving the information transmitted from the user terminal (the transmitting terminal) connected to the node 100 itself (S11), divides this item of information into the unit of ATM cell and changes the sequence thereof (S12), and transmits the information towards the transmitting-side ATM network device 110 (S13).

Figure 25:
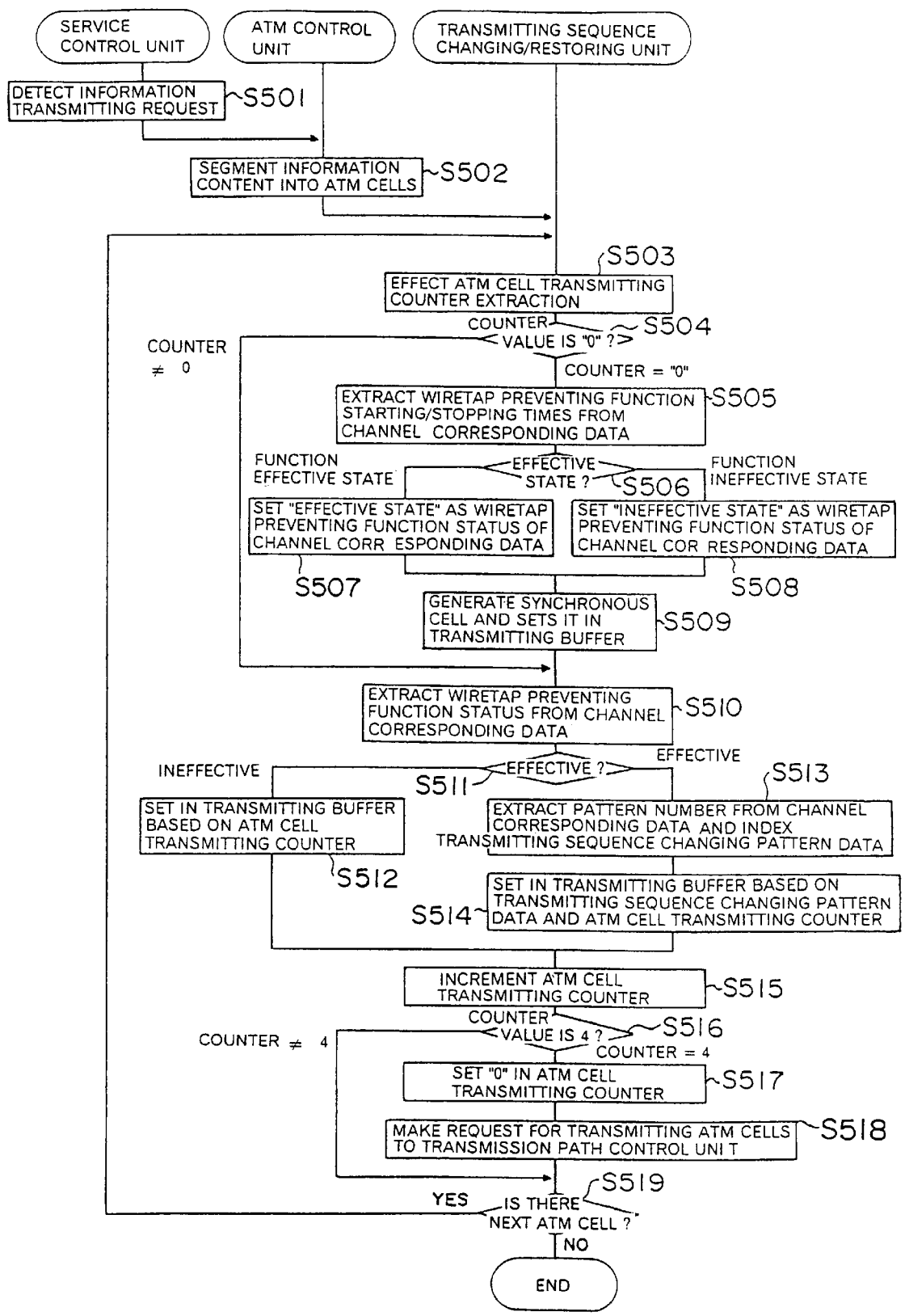
FIG. 25 is a flowchart showing a process of the transmitting-side ATM node when changing a sequence of ATM cells according to the third embodiment.

FIG. 25 is a flowchart showing a flow of specific processes executed in the transmitting-side ATM node 100 in order to transmit the cells. According to this flowchart, the service control unit 9, when detecting transmitting target information together with the information transmission request from the transmitting terminal in S501, transfers this item of transmitting target information to the ATM control unit 8.

The ATM control unit 8 divides the transmitting target information received from the service control unit 9 into the unit of cell and stores the ATM cell with each of them in S502. The ATM control unit 8 consecutively transfers the thus generated ATM cells to the transmitting sequence changing/restoring unit 7.

The transmitting sequence changing/restoring unit 7 executes a loop of processes in S503 through S519 on each of the ATM cells received from the ATM control unit 8 in sequence of their having been received from the ATM control unit 8. In first step S503 after entering this loop of processes, the transmitting sequence changing/restoring unit 7 retrieves the ATM cell transmitting counter 14 wherein the VPI/VCI of the received ATM cell serves as an index, and specifies the management area V corresponding to this VPI/VCI. Then, the transmitting sequence changing/ restoring unit 7 reads the number-of-storage-completed-ATM-cells (the counter value) from the specified management area V. Note that the counter initial value is "0".

In next step S504, the transmitting sequence changing/ restoring unit 7 checks whether the counter value read in S503 is "0" or not. Then, if the counter value is not "0", the transmitting sequence changing/restoring unit 7 diverts the processing to S510 and, if the counter value is "0", advances the processing to S505.

In S505, the transmitting sequence changing/restoring unit 7 retrieves the channel corresponding data 13 within the storage device 10 wherein the VPI/VCI of the received ATM cell serves as an index, and specifies the management area Q corresponding to this VPI/VCI. Then, the transmitting sequence changing/restoring unit 7 reads a wiretap preventing function starting time and a wiretap preventing function stopping time from the specified management area Q.

In next step S506, the transmitting sequence changing/ restoring unit 7 checks whether the wiretap preventing function is effective or not on the basis of whether or not the present time exists between the wiretap preventing function starting time and the wiretap preventing function stopping time read in S505. Then, when the wiretap preventing function is effective because of the present time existing between the starting time and the stopping time, the transmitting sequence changing/restoring unit 7 advances the processing to S507. In S507, the transmitting sequence changing/restoring unit 7 sets the effective state in the wiretap preventing status flag in the management area Q specified in S505. By contrast, when judging that there is the wiretap preventing function ineffective state, the transmitting sequence changing/restoring unit 7 advances the processing to S508. In S508, the transmitting sequence changing/restoring unit 7 sets the ineffective state in the wiretap preventing status flag in the management area Q specified in S505. In any case, the transmitting sequence changing/restoring unit 7 advances the processing to S509.

In S509, the transmitting sequence changing/restoring unit 7 generates the synchronous cell having the same VPI/VCI as that of the processing target ATM cell. At this time, the transmitting sequence changing/restoring unit 7 sets the "start of function" when the wiretap preventing function is judged as effective state or the "stop of function" when the wiretap preventing function is judged as the ineffective state in the wiretap preventing function flag of the generated synchronous cell (which corresponds to an information adding unit). Then, the transmitting sequence changing/restoring unit 7 retrieves the transmitting/ receiving ATM cell storage buffer 12 in the storage device 10 with this VPI/VCI serving as an index, and reads the head address of the storage area within the transmitting sub-buffer 12a which corresponds to this VPI/VCI. Then, the transmitting sequence changing/restoring unit 7 stores, with the generated synchronous cell, the head location in the storage area within the transmitting sub-buffer 12a which is specified with the read head address.

Thereafter, the transmitting sequence changing/restoring unit 7 retrieves the channel corresponding data 13 within the storage device 10 wherein the VPI/VCI of the received ATM cell serves as an index, and specifies the management area Q corresponding to this VPI/VCI in S510. Then, the transmitting sequence changing/restoring unit 7 reads the wiretap preventing status flag from the specified management area Q.

In next step S511, the transmitting sequence changing/ restoring unit 7 checks the wiretap preventing status flag. Then, if the flag indicates the ineffective state, the transmitting sequence changing/restoring unit 7 advances the processing to S512. In S512, the transmitting sequence changing/restoring unit 7 sets the counter value read in S503 as being designated by i. Further, the transmitting sequence changing/restoring unit 7 retrieves the transmitting/ receiving ATM cell storage buffer 12 in the storage device 10 wherein the VPI/VCI of the processing target ATM cell serves as an index, and reads the head address in the storage area within the transmitting sub-buffer 12a which corresponds to this VPI/VCI. Then, the transmitting sequence changing/restoring unit 7 specifies the storage area within the transmitting sub-buffer 12a with the read head address. Subsequently, the transmitting sequence changing/restoring unit 7 stores the i-th storage location in the specified storage area with the processing target ATM cell. After a completion of the process in S512, the transmitting sequence changing/ restoring unit 7 advances the processing to S515.

While on the other hand, when judging in S511 that the wiretap preventing status flag indicates the effective state, the transmitting sequence changing/restoring unit 7 advances the processing to S513. In S513, the transmitting sequence changing/restoring unit 7 reads the wiretap preventing function pattern number from the management area Q in the channel corresponding data 13 which is specified in S510. Then, the transmitting sequence changing/restoring unit 7 retrieves the transmitting sequence changing pattern data 11 in the storage device 10 wherein a 4-fold value of this pattern number serves as an index, and specifies the pattern data area Y corresponding to this value. In next step S514, the transmitting sequence changing/restoring unit 7 sets the counter value read in S503 as being designated by i, and reads an ATM cell number j written in the i-th entry in the pattern data area Y specified in S513. Further, the transmitting sequence changing/restoring unit 7 retrieves the transmitting/receiving ATM cell storage buffer 12 in the storage device 10 wherein the VPI/VCI of the processing target ATM cell serves as an index, and reads the head address in the storage area within the transmitting sub-buffer 12a which corresponds to this VPI/VCI. Then, the transmitting sequence changing/restoring unit 7 specifies the storage area within the transmitting sub-buffer 12a with the read head address. Subsequently, the transmitting sequence changing/restoring unit 7 stores the j-th storage location in the specified storage area with the processing target ATM cell.

After a completion of the process in S514, the transmitting sequence changing/restoring unit 7 increments in S515 the number-of-storage-completed-ATM-cells (the counter value) in the management area V specified in S503.

In next step S516, the transmitting sequence changing/restoring unit 7 checks whether the counter value after being incremented in S515 is "4" or not. Then, if the counter value is not "4", the transmitting sequence changing/restoring unit 7 diverts the processing to S519 and, whereas if the counter value is "4", advances the processing to S517.

In S517, the transmitting sequence changing/restoring unit 7 resets to "0" the number-of-storage-completed-ATM-cells (the counter value) in the management area V specified in S503. In next step S518, the transmitting sequence changing/restoring unit 7 reads the five ATM cells (the head of which is the synchronous cell) out of the storage area in the transmitting sub-buffer 12a which is specified in S512 or S514 sequentially from the head location thereof, then transfers the ATM cells to the transmission path control unit 6, and requests transmission. After a completion of the process in S518, the transmitting sequence changing/restoring unit 7 checks whether or not the next ATM cell is received from the ATM control unit 8 in S519. Then, if the next ATM cell is received, the transmitting sequence changing/restoring unit 7 returns the processing to S503.

By contrast, if all the ATM cells received from the ATM control unit 8 have been completely transferred to the transmission path control unit 6 as a result of repeating the loop of processes in S503 through S519, the transmitting sequence changing/restoring unit 7 finishes the processing.

The transmission path control unit 6 sends the ATM cells thus received from the transmitting sequence changing/restoring unit 7 towards the ATM network device 110 via the transmission path $L_1$ in the receiving sequence.

Referring to FIG. 17, the transmitting-side ATM network device 110 switches the ATM cells received from the transmitting-side ATM node 100 (S15), and sends the ATM cells to the receiving-side ATM network device 130 (S16). The receiving-side ATM network device 130 switches the ATM cells received from the transmitting-side ATM node 110 (S17), and sends the ATM cells to the receiving-side ATM network device 140 (S18).

The receiving-side ATM node 140, upon receiving the ATM cells from the receiving-side ATM network device 130, reproduces the transmitting target information by restoring the sequence of the received ATM cells (S19), and transmits the reproduced information to the receiving terminal (S20).

Figure 26:
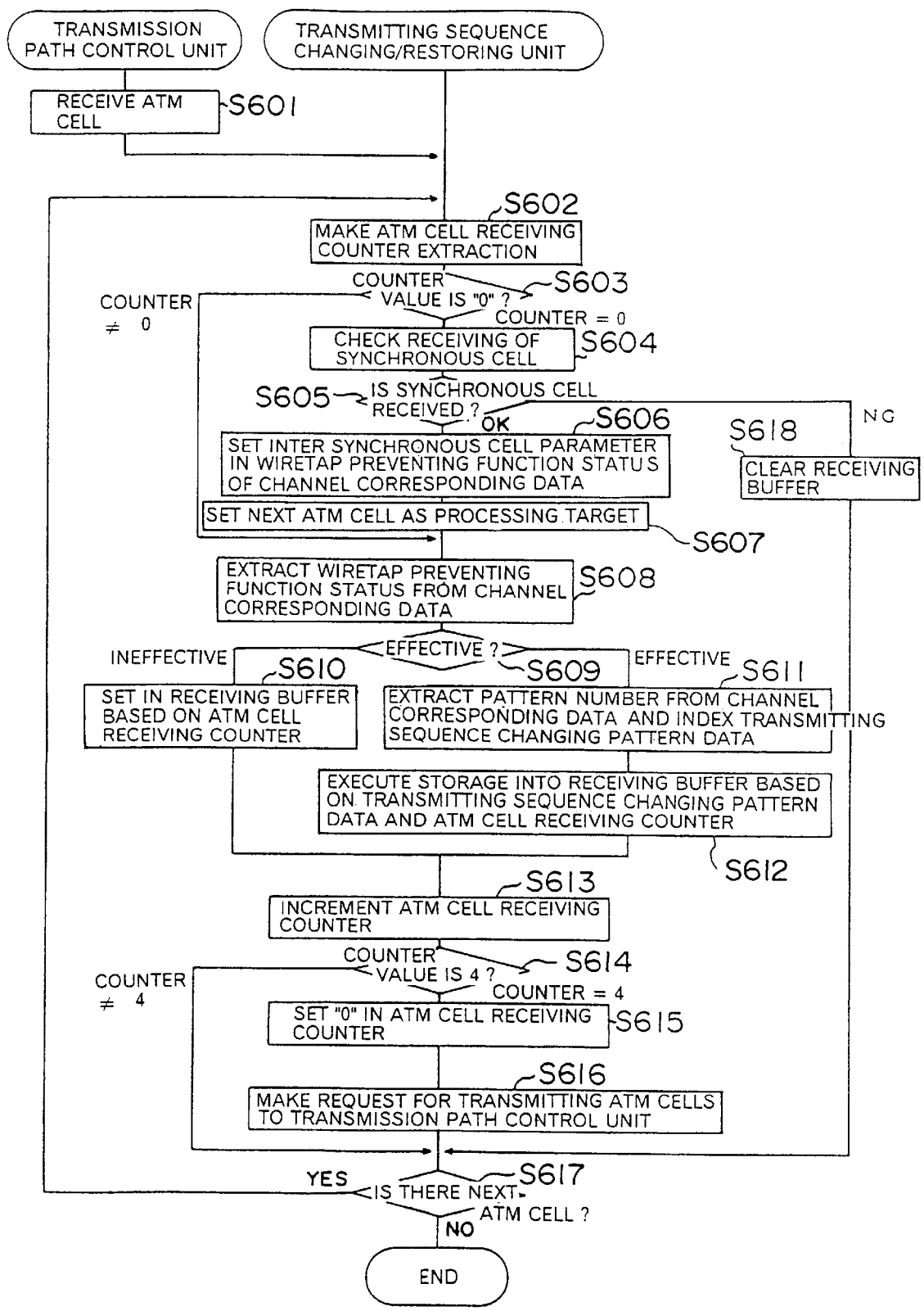
FIG. 26 is a flowchart showing a process of the receiving-side ATM node when restoring the sequence of ATM cells according to the third embodiment.

FIG. 26 is a flowchart showing a flow of specific processes executed in the transmitting-side ATM node 100 in order to reproduce this item of information. According to this flowchart, the transmission path control unit 6, when receiving the ATM cells stored with the information from the receiving-side ATM network device 130 in S601, transfers the received ATM cells to the transmitting sequence changing/restoring unit 7.

The transmitting sequence changing/restoring unit 7 executes a loop of processes in S602 through S618 on each of the ATM cells received from the transmission path control unit 6 in sequence of their having been received from the transmission path control unit 6. In first step S602 after entering this loop of processes, the transmitting sequence changing/restoring unit 7 retrieves the ATM cell receiving counter 15 wherein the VPI/VCI of the received ATM cell serves as an index, and specifies the management area W corresponding to this VPI/VCI. Then, the transmitting sequence changing/restoring unit 7 reads the number-of-received-ATM-cells (the counter value) from the specified management area W. Note that the counter initial value is "0".

In next step S603, the transmitting sequence changing/restoring unit 7 checks whether the counter value read in S602 is "0" or not. Then, if the counter value is not "0", the transmitting sequence changing/restoring unit 7 diverts the processing to S608 and, if the counter value is "0", advances the processing to S604.

In S604, the transmitting sequence changing/restoring unit 7 checks whether or not the processing target ATM cell received from the transmission path control unit 6 is the synchronous cell.

Then, in S605, when the processing target ATM cell is not the synchronous cell, the transmitting sequence changing/restoring unit 7, in S618 retrieves the transmitting/receiving ATM cell storage buffer 12 in the storage device 10 with the processing target ATM cell VPI/VCI serving as an index, and reads the head address of the receiving sub-buffer 12b. Then, the transmitting sequence changing/restoring unit 7 clears the storage area within the receiving sub-buffer 12b which is specified with the read head address. After a completion of the process in S618, the transmitting sequence changing/restoring unit 7 advances the processing to S617.

By contrast, when judging in S605 that the processing target ATM cell is the synchronous cell, the transmitting sequence changing/restoring unit 7 retrieves in S606 the channel corresponding data 13 in the storage device 10 wherein the VPI/VCI of the synchronous cell serves as an index, and specifies the management area Q corresponding to this VPI/VCI. Then, the transmitting sequence changing/restoring unit 7 reads a content of a wiretap preventing function flag from the synchronous cell, and, if the "start of providing function" is written therein, sets the "effective state" in the wiretap preventing status flag in the management area Q. If the "stop of providing function" is written therein, the transmitting sequence changing/restoring unit 7 sets the "ineffective state" in the wiretap preventing status flag in the management area Q.

In next step S607, the transmitting sequence changing/restoring unit 7 discards the processing target synchronous cell, and treats the next ATM cell received from the transmission path control unit 6 as a processing target.

After a completion of the process in next step S607, the transmitting sequence changing/restoring unit 7 retrieves the channel corresponding data 13 within the storage device 10 wherein the VPI/VCI of the received ATM cell serves as an index in S608, and reads the wiretap preventing status flag from the management area Q corresponding to this VPI/VCI.

In next step S609, the transmitting sequence changing/restoring unit 7 checks the wiretap preventing status flag.

Then, if the flag indicates the ineffective state, the transmitting sequence changing/restoring unit 7 sets the counter value read in S602 as being designated by i in S610. Further, the transmitting sequence changing/restoring unit 7 retrieves the transmitting/receiving ATM cell storage buffer 12 in the storage device 10 wherein the VPI/VCI of the processing target ATM cell serves as an index, and reads the head address in the storage area within the receiving sub-buffer 12b which corresponds to this VPI/VCI. Then, the transmitting sequence changing/restoring unit 7 specifies the storage area within the receiving sub-buffer 12b with the read head address. Subsequently, the transmitting sequence changing/restoring unit 7 stores the i-th storage location in the specified storage area with the processing target ATM cell. After a completion of the process in S610, the transmitting sequence changing/restoring unit 7 advances the processing to S613.

While on the other hand, when judging in S609 that the wiretap preventing status flag indicates the effective state, the transmitting sequence changing/restoring unit 7 advances the processing to S611, and reads the wiretap preventing function pattern number from the management area Q in the channel corresponding data 13 which is specified in S608. Then, the transmitting sequence changing/restoring unit 7 retrieves the transmitting sequence changing pattern data 11 in the storage device 10 wherein a 4-fold value of this pattern number serves as an index, and specifies the pattern data area Y corresponding to this value. In next step S612, the transmitting sequence changing/restoring unit 7 sets the counter value read in S602 as being designated by k, and specifies the number-of-entries $n_e$ from the head to the entry concerned by examining the entries in which the ATM cell number k is written in the pattern data area Y specified in S611. Further, the transmitting sequence changing/restoring unit 7 retrieves the transmitting/receiving ATM cell storage buffer 12 in the storage device 10 wherein the VPI/VCI of the processing target ATM cell serves as an index, and reads the head address in the storage area within the receiving sub-buffer 12b which corresponds to this VPI/VCI. Then, the transmitting sequence changing/restoring unit 7 specifies the storage area within the receiving sub-buffer 12b with the read head address serving as an index. Subsequently, the transmitting sequence changing/restoring unit 7 stores the first storage location in the specified storage area with the processing target ATM cell.

After a completion of the process in S612 or S610, the transmitting sequence changing/restoring unit 7 increments in S613 the number-of-received-ATM-cells (the counter value) in the management area W specified in S602.

In next step S614, the transmitting sequence changing/restoring unit 7 checks whether the counter value after being incremented in S613 is "4" or not. Then, if the counter value is not "4", the transmitting sequence changing/restoring unit 7 diverts the processing to S617 and, whereas if the counter value is "4", advances the processing to S615.

In S615, the transmitting sequence changing/restoring unit 7 resets to "0" the number-of-received-ATM-cells (the counter value) in the management area W specified in S602. In next step S616, the transmitting sequence changing/restoring unit 7 reads the four ATM cells out of the storage area in the receiving sub-buffer 12b which is specified in S610 or S612 sequentially from the head location thereof, then transfers the ATM cells to the ATM control unit 8, and requests transmission. After a completion of the process in S616, the transmitting sequence changing/restoring unit 7 advances the processing to S617.

In S617, the transmitting sequence changing/restoring unit 7 checks whether or not the next ATM cell is received from the transmission path control unit 6. Then, if the next ATM cell is received, the transmitting sequence changing/restoring unit 7 returns the processing to S602.

By contrast, if all the ATM cells received from the transmission path control unit 6 have been completely transferred to the ATM control unit 8 as a result of repeating the loop of processes in S602 through S618, the transmitting sequence changing/restoring unit 7 finishes the processing.

The ATM control unit 8 extracts only the contents of the payload fields from the ATM cell string received from the transmitting sequence changing/restoring unit 7, and connects the extracted contents, thereby reproducing the transmitting target information. The ATM control unit 8 transfers the reproduced transmitting target information to the service control unit 9. The service control unit 9 transmits the transmitting target information received from the ATM control unit 8 to the receiving terminal.

Figure 27:
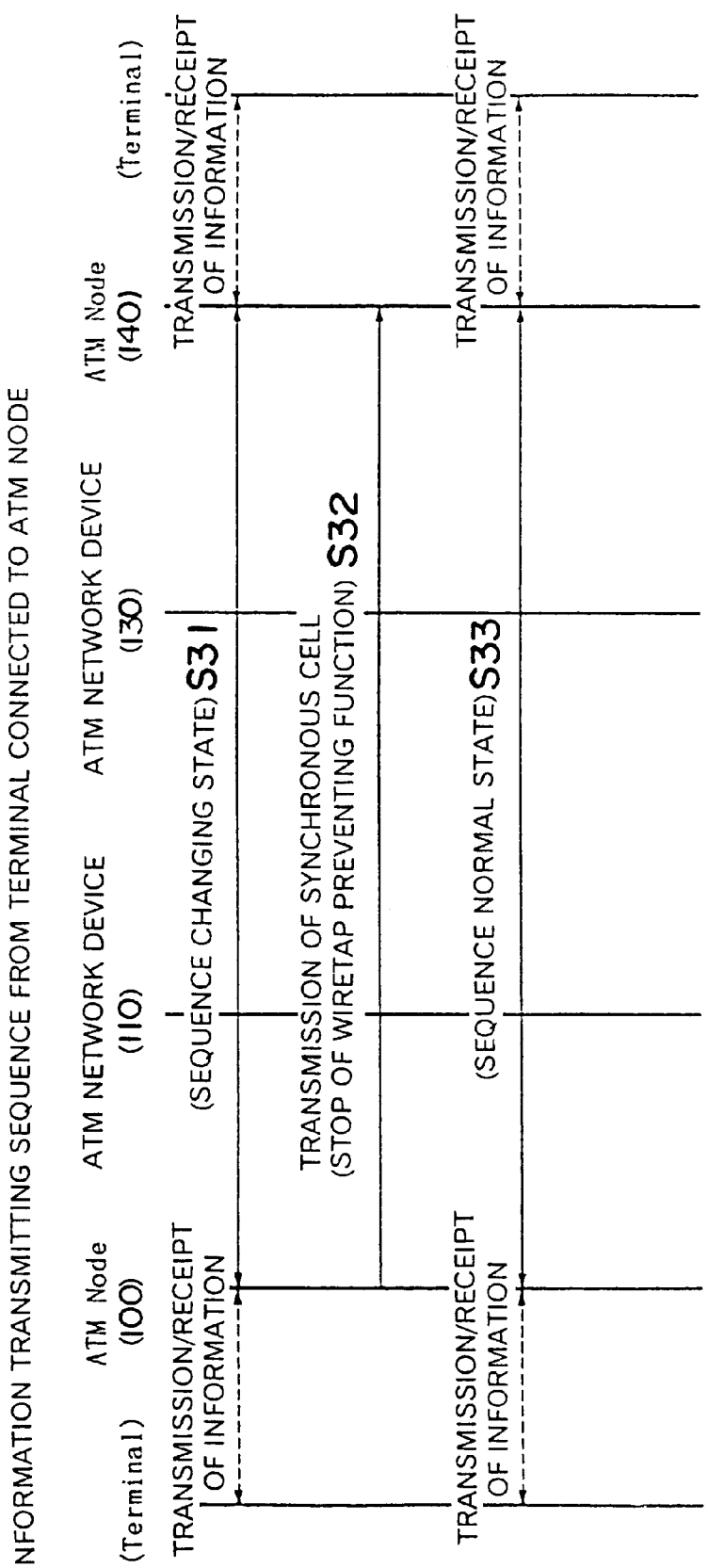
FIG. 27 is a sequence diagram showing an operation in the third embodiment.

In accordance with the third embodiment of the present invention, as illustrated in FIG. 27, even if the wiretap preventing function is provided between the transmitting-side ATM node 100 and the receiving-side ATM node 140 (S31), the synchronous cell in which the "stop of providing function" is set in the wiretap preventing function flag, is transmitted to the receiving-side ATM node 140 from the transmitting-side ATM node 100 at the time of stopping, whereby the wiretap preventing function is stopped. If the wiretap preventing function is stopped, the ATM cell string is transmitted to the receiving-side ATM node 140 from the transmitting-side ATM node 100 in the normal sequence where the contents of the payloads are arranged as the locations are disposed within the transmitting target information (S33). Then, at the time of starting, the synchronous cell in which the "start of providing function" is set in the "wiretap preventing function flag", is transmitted from the transmitting-side ATM node 100 to the receiving-side ATM node 140, whereby the wiretap preventing function resumes. Then, the ATM cell string is transmitted in the sequence-changed state to the receiving-side ATM node 140 from the transmitting-side ATM node 100.

[Embodiment 4]

In the embodiment 3 discussed above, the channel corresponding data 13 is provided with the columns of the "wiretap preventing function pattern changing time" and the "wiretap preventing function pattern change number", but these columns, in which the "function pattern number" can be wrote, are not used. A fourth embodiment of the present invention is characterized by using these columns to change the sequence changing pattern of the ATM cells during the process of communications. The construction of the ATM network system in the fourth embodiment is absolutely the same as that in the third embodiment, and hence the explanation thereof is omitted.

Figure 28:
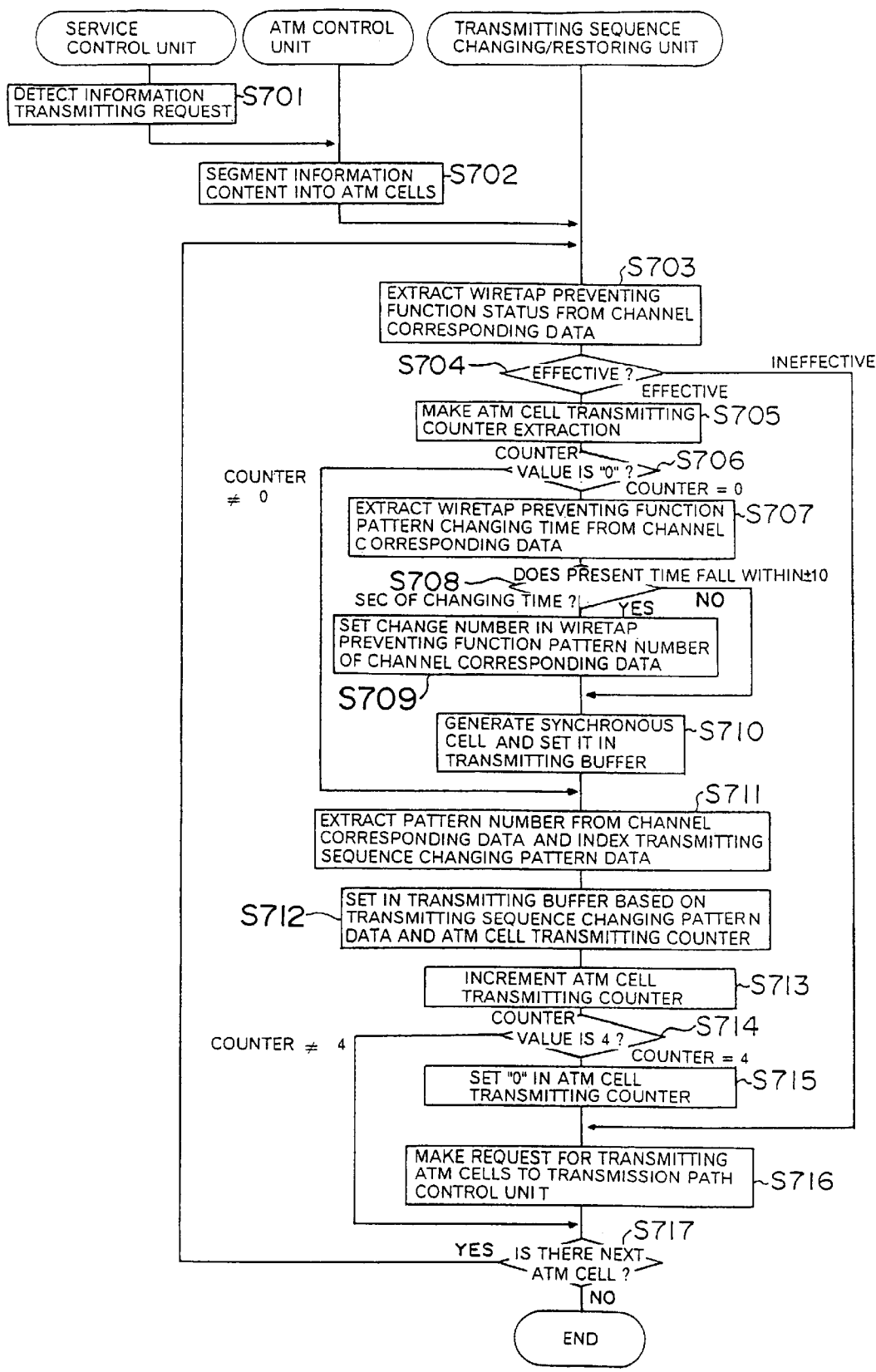
FIG. 28 is a flowchart showing a process of the transmitting-side ATM node when changing a sequence of ATM cells in a fourth embodiment of the present invention.

FIG. 28 is a flowchart showing a flow of specific processes executed in the transmitting-side ATM node 100 in order to transmit the cells. According to this flowchart, the service control unit 9 transfers the transmitting target information to the ATM control unit 8, at the time when the unit 8 detects the transmitting target information together with the information transmission request from the transmitting terminal in S701.

The ATM control unit 8 divides the transmitting target information received from the service control unit 9 into the unit of cell and stores the ATM cell with each of them in S502. The ATM control unit 8 consecutively transfers the generated ATM cells to the transmitting sequence changing/restoring unit 7.

The transmitting sequence changing/restoring unit 7 executes a loop of processes in S703 through S717 on each of the ATM cells received from the ATM control unit 8 in due order. In first step S703 after entering this loop of processes, the transmitting sequence changing/restoring unit 7 retrieves the channel corresponding data 13 in the storage device 10 wherein the VPI/VCI of the received ATM cell serves as an index, and reads the wiretap preventing status flag from the management area Q corresponding to this VPI/VCI.

In next step S704, the transmitting sequence changing/ restoring unit 7 checks the wiretap preventing function flag. Then, if the flag indicates ineffective state, the transmitting sequence changing/restoring unit 7 diverts the processing to S716.

Whereas if the effective state is indicated, the transmitting sequence changing/restoring unit 7 retrieves in S705 the ATM cell transmitting counter 14 of the storage device 10 wherein the VPI/VCI of the processing target ATM cell serves as an index, and specifies the management area V corresponding to this VPI/VCI. Then, the transmitting sequence changing/restoring unit 7 reads a number-of-storage-completed-ATM-cells (the counter value) from the specified management area V. A counter initial value is "0".

In next step S706, the transmitting sequence changing/ restoring unit 7 checks whether the counter value read in S705 is "0" or not. Then, if the counter value is not "0", the processing proceeds to S711. Whereas if the counter value is "0", the processing proceeds to S707.

In S707, the transmitting sequence changing/restoring unit 7 reads the wiretap preventing function pattern change time from the management area Q specified in S703.

In next step S708, the transmitting sequence changing/ restoring unit 7 compares the wiretap preventing function pattern change time read in S707 with the present time, and checks whether or not the present time falls within a range of 10 seconds after or before the wiretap preventing function pattern change time. Then, if the present time is beyond the range of 10 seconds after or before the wiretap preventing function pattern change time, the transmitting sequence changing/restoring unit 7 advances the processing to S710.

Whereas if the present time falls within the range of 10 seconds after or before the wiretap preventing function pattern change time, the transmitting sequence changing/ restoring unit 7 rewrites in S709 the wiretap preventing function pattern number of the management area Q specified in S703 to a wiretap preventing function pattern change number. After a completion of the process in S709, the transmitting sequence changing/restoring unit 7 advances the processing to S710.

In S710, the transmitting sequence changing/restoring unit 7 generates the synchronous cell having the same VPI/VCI as that of the processing target ATM cell. At this time, the transmitting sequence changing/restoring unit 7 sets a "change of function pattern" in the wiretap preventing function flag of the generated synchronous cell, and sets the wiretap preventing pattern number rewritten in S709 in the function pattern number (which corresponds to an information adding unit). Then, the transmitting sequence changing/ restoring unit 7 retrieves the transmitting/receiving ATM cell storage buffer 12 in the storage device 10 with this VPI/VCI serving as an index, and reads the head address of the storage area within the transmitting sub-buffer 12a which corresponds to this VPI/VCI. Then, the transmitting sequence changing/restoring unit 7 stores, with the generated synchronous cell, the head location in the storage area within the transmitting sub-buffer 12a which is specified with the read head address.

Thereafter, the transmitting sequence changing/restoring unit 7 reads in S711 the wiretap preventing function pattern number from the management area Q in the channel corresponding data 13 which is specified in S703. Then, the transmitting sequence changing/restoring unit 7 retrieves the transmitting sequence changing pattern data 11 in the storage device 10 wherein a 4-fold value of this pattern number serves as an index, and specifies the pattern data area Y corresponding to this value.

In next step S712, the transmitting sequence changing/ restoring unit 7 sets the counter value read in S705 as being designated by i, and reads the ATM cell number j written to the i-th entry in the pattern data area Y specified in S711. Further, the transmitting sequence changing/restoring unit 7 retrieves the transmitting/receiving ATM cell storage buffer 12 in the storage device 10 wherein the VPI/VCI of the processing target ATM cell serves as an index, and reads the head address in the storage area within the transmitting sub-buffer 12a which corresponds to this VPI/VCI. Then, the transmitting sequence changing/restoring unit 7 specifies the storage area within the transmitting sub-buffer 12a with the read head address serving as an index. Subsequently, the transmitting sequence changing/restoring unit 7 stores the j-th storage location in the specified storage area with the processing target ATM cell.

In S713, the transmitting sequence changing/restoring unit 7 increments the number-of-storage-completed-ATM-cells (the counter value) in the management area V specified in S705.

In next step S714, the transmitting sequence changing/ restoring unit 7 checks whether the counter value after increment in S710 is "4" or not. Then, if the counter value is not "4", the transmitting sequence changing/restoring unit 7 diverts the processing to S717 and, whereas if the counter value is "4", advances the processing to S715.

In S715, the transmitting sequence changing/restoring unit 7 resets to "0" the number-of-storage-completed-ATM-cells (the counter value) in the management area W specified in S705.

In S716, the transmitting sequence changing/restoring unit 7, when the processing diverts directly from S704, transfers the processing target ATM cell to the transmission path control unit 6, and requests transmission. Further, when the processing proceeds from S715, the transmitting sequence changing/restoring unit 7 reads five ATM cells (the head of which is the synchronous cell) out of the storage area of the transmitting sub-buffer 12a which has been specified in S712 sequentially from the head location thereof, then transfers the ATM cells to the transmission path control unit 6, and requests transmission. After a completion of the process in S716, the transmitting sequence changing/ restoring unit 7 makes the processing proceed to S717.

In S717, the transmitting sequence changing/restoring unit 7 checks whether or not the next ATM cell is received from the ATM control unit 8 in S717. Then, if the next ATM cell is received, the transmitting sequence changing/ restoring unit 7 returns the processing to S703.

By contrast, if all the ATM cells received from the ATM control unit 8 have been completely transferred to the transmission path control unit 6 as a result of repeating the loop of processes in S703 through S717, the transmitting sequence changing/restoring unit 7 finishes the processing.

Figure 29:
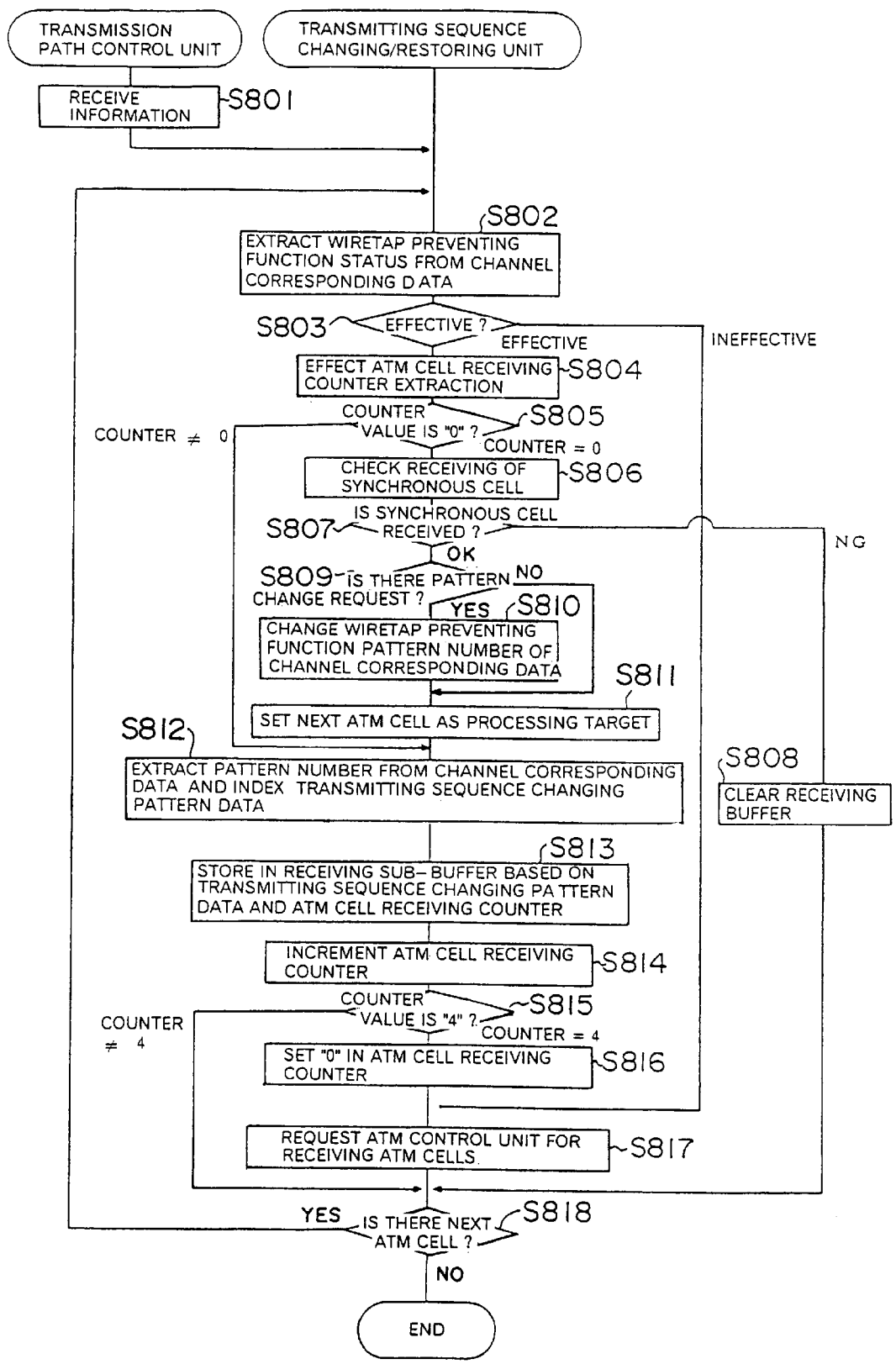
FIG. 29 is a flowchart showing a process of the receiving-side ATM node when restoring the sequence of ATM cells in the fourth embodiment.

FIG. 29 is flowchart showing a flow of specific processes executed in the receiving-side ATM node 140 in order to reproduce the information. According to this flowchart, the transmission path control unit 6, in S801, when receiving the ATM cell stored with the information from the receiving-side ATM network device 130, transfers the received ATM cell to the transmitting sequence changing/restoring unit 7.

The transmitting sequence changing/restoring unit 7 executes a loop of processes in S802 through S817 on each of the ATM cells received from the transmission path control unit 6 in the sequence of their being received from the transmission path control unit 6. In first step S802 after entering this loop of processes, the transmitting sequence changing/restoring unit 7 retrieves the channel corresponding data 13 in the storage device 10 with the received ATM cell VPI/VCI serving as an index, and reads the wiretap preventing status flag from the management area Q corresponding to this VPI/VCI.

In next step S803, the transmitting sequence changing/restoring unit 7 checks the wiretap preventing status flag. Then, if the flag indicates the ineffective state, the transmitting sequence changing/restoring unit 7 diverts the processing to S817.

Whereas if the effective state is indicated, the transmitting sequence changing/restoring unit 7 retrieves in S804 the ATM cell receiving counter 15 of the storage device 10 wherein the VPI/VCI of the processing target ATM cell serves as an index, and specifies the management area W corresponding to this VPI/VCI. Then, the transmitting sequence changing/restoring unit 7 reads the number-of-received-ATM-cells (the counter value) from the specified management area W. A counter initial value is "0".

In next step S805, the transmitting sequence changing/restoring unit 7 checks whether the counter value read in S804 is "0" or not. Then, if the counter value is not "0", the processing is diverted to S812. Whereas if the counter value is "0", the processing proceeds to S806.

In S806, the transmitting sequence changing/restoring unit 7 checks whether or not the processing target ATM cell received from the transmission path control unit 6 is the synchronous cell.

Then, in S807, when judging that the processing target ATM cell is not the synchronous cell, the transmitting sequence changing/restoring unit 7 retrieves in S808 the transmitting/receiving ATM cell storage buffer 12 in the storage device 10 with the processing target ATM cell VPI/VCI serving as an index, and reads the head address of the receiving sub-buffer 12b. Then, the transmitting sequence changing/restoring unit 7 clears the storage area within the receiving sub-buffer 12b which is specified with the read head address. After a completion of the process in S808, the transmitting sequence changing/restoring unit 7 diverts the processing to S818.

By contrast, when judging in S807 that the processing target ATM cell is the synchronous cell, the transmitting sequence changing/restoring unit 7 checks in S809 whether or not the "function pattern change" is set in the wiretap preventing function flag of the synchronous cell. Then, if the "function pattern change" is not set therein, the transmitting sequence changing/restoring unit 7 advances the processing to S811.

In contrast with this, if the "function pattern change" is set in the wiretap preventing function flag of the synchronous cell, the transmitting sequence changing/restoring unit 7 writes in S810 the function pattern number written in the synchronous cell to the wiretap preventing function pattern number column II in the management area Q specified in S802. After a completion of the process in S810, the transmitting sequence changing/restoring unit 7 advances the processing to S811.

In S811, the transmitting sequence changing/restoring unit 7 discards the processing target synchronous cell, and treats the next ATM cell received from the transmission path control unit 6 as a processing target. After a completion of the process in S811, the transmitting sequence changing/restoring unit 7 advances the processing to S812.

In S812, the transmitting sequence changing/restoring unit 7 reads the wiretap preventing function pattern number from the management area Q in the channel corresponding data 13 specified in S802. Then, the transmitting sequence changing/restoring unit 7 retrieves the transmitting sequence changing pattern data 11 in the storage device 10 wherein a 4-fold value of this pattern number serves as an index, and specifies the pattern data area Y corresponding to this value.

In next step S813, the transmitting sequence changing/restoring unit 7 sets the counter value read in S804 as being designated by k, and examines an entry in which the ATM cell number k is written in the pattern data area Y specified in S812, and specifies the number-of-entries $n_e$ ranging from the head thereof up to the entry concerned in the pattern data area Y. Further, the transmitting sequence changing/restoring unit 7 retrieves the transmitting/receiving ATM cell storage buffer 12 in the storage device 10 wherein the VPI/VCI of the processing target ATM cell serves as an index, and reads the head address in the storage area within the receiving sub-buffer 12b which corresponds to this VPI/VCI. Then, the transmitting sequence changing/restoring unit 7 specifies the storage area within the receiving sub-buffer 12b with the read head address. Then, the transmitting sequence changing/restoring unit 7 stores the $n_e$-th storage location in the specified storage area with the processing target ATM cell.

In next step S814, the transmitting sequence changing/restoring unit 7 increments the number-of-received-ATM-cells (the counter value) in the management area W specified in S804.

In next step S815, the transmitting sequence changing/restoring unit 7 checks whether the counter value after being incremented in S814 is "4" or not. Then, if the counter value is not "4", the transmitting sequence changing/restoring unit 7 advances the processing to S818 and, whereas if the counter value is "4", advances the processing to S816.

In S816, the transmitting sequence changing/restoring unit 7 resets to "0" the number-of-received-ATM-cells (the counter value) in the management area W specified in S804. After a completion of the process in S816, the transmitting sequence changing/restoring unit 7 advances the processing to S817.

In S817, the transmitting sequence changing/restoring unit 7, when the processing diverts directly from S803, transfers the processing target ATM cell to the ATM control unit 8, and requests transmission. Further, when the processing proceeds from S816, the transmitting sequence changing/restoring unit 7 reads four ATM cells out of the storage area of the receiving sub-buffer 12b which has been specified in S813 sequentially from the head location thereof, then transfers the ATM cells to the ATM control unit 8, and requests transmission.

After a completion of the process in S817, the transmitting sequence changing/restoring unit 7 checks whether or not the next ATM cell is received from the transmission path control unit 6 in S818. Then, if the next ATM cell is received, the transmitting sequence changing/restoring unit 7 returns the processing to S802.

By contrast, if all the ATM cells received from the transmission path control unit 6 have been completely transferred to the ATM control unit 8 as a result of repeating the loop of processes in S802 through S817, the transmitting sequence changing/restoring unit 7 finishes the processing.

Other processes and the flow of data in the fourth embodiment are the same as those in the first embodiment, and hence the explanations thereof are omitted.

In accordance with the constructed fourth embodiment of the present invention, the sequence changing pattern varies when the synchronous cell in which the wiretap preventing function pattern number is set in the "function pattern number" as well as setting the "change of function pattern" in the "wiretap preventing function flag", is transmitted to the receiving-side ATM node 140 from the transmitting-side ATM node 100. The synchronous cell is transmitted when falling within the range of 10 seconds before or after the preset wiretap preventing function pattern changing time. When the sequence changing pattern is thus changed, the sequence of the four ATM cells interposed between the synchronous cells is changed. Accordingly, a confidentiality of the information transmission by means of the ATM cells is further enhanced.

[Embodiment 5]

In accordance with the first to fourth embodiments, the wiretap preventing function is set, during which the five cells (one of which is the synchronous cell) are transmitted en bloc at one time just when the five cells are prepared in the storage area in the transmitting sub-buffer 12*a*. As a result, the interval at which receive the ATM cells for transmitting the same transmitting target information becomes uniform. The transmission and receipt of the information based particularly on a voice call are conducted through the ATM cell transmission at a constant period mainly known as a CBR (Constant Bit Rate) in the ATM network 120. Hence, if there occurs a deviation between the ATM cell generation interval and the ATM cell receiving interval, there might be a possibility in which the normal restoration of the voice information is hindered.

The fifth embodiment is contrived for eliminating the deviation between the ATM cell generation interval and the ATM cell receiving interval by uniformalizing the ATM cell receiving interval and for enabling the transmitting target information to be restored without causing any decline of the quality.

(Construction of ATM Network System)

Figure 30:
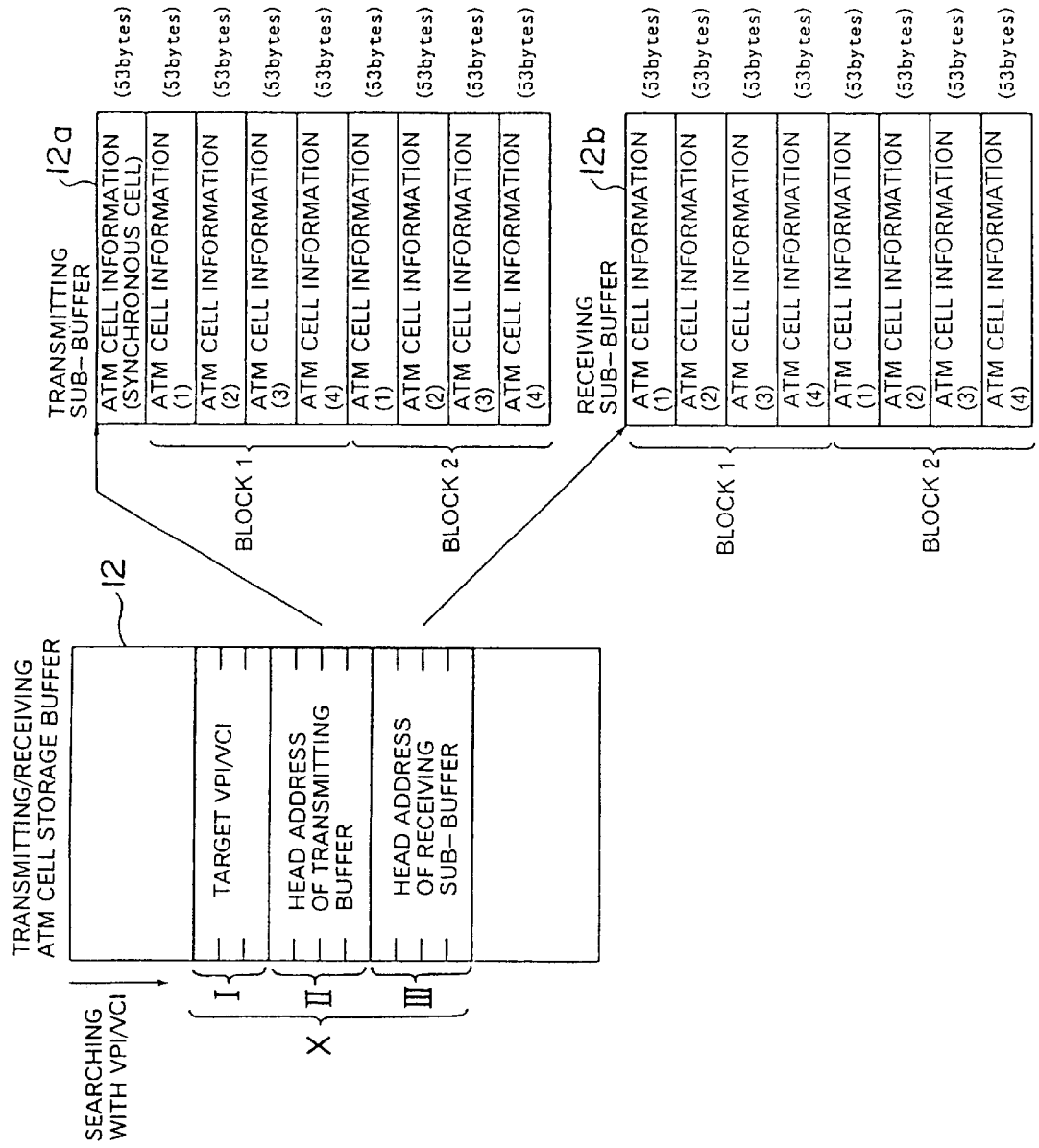
FIG. 30 is a diagram showing a data structure in a transmitting/receiving ATM cell storage buffer in a fifth embodiment of the present invention.

FIG. 30 is a data structure diagram showing a structure of the transmitting/receiving ATM cell storage buffer 12 stored in the storage device 10 of each of the ATM nodes 100, 140. As shown in FIG. 30, this transmitting/receiving ATM cell storage buffer 12 includes the transmitting sub-buffer 12*a* and the receiving sub-buffer 12*b*. The transmitting sub-buffer 12*a* is defined as a memory area to which the ATM cell is written by the transmitting sequence changing unit 7*a* and from which the ATM cell is read by the transmitting target fetching unit 7*b*. This transmitting sub-buffer 12*a* is provided per VPI/VCI with a storage area (9×53 [bytes]) (only the storage area for one VPI/VCI is illustrated in FIG. 30) consisting of a single synchronous cell storage location, a block 1 (a first storage area) for storing four ATM cells (information transmitting ATM cells), and a block 2 (a second storage area) for similarly storing the four ATM cells (the information transmitting ATM cells). On the other hand, the receiving sub-buffer 12*b* is defined as a memory area to which the ATM cell is written by the receiving sequence restoring unit 7*c* and from which the ATM cell is read by the receiving target fetching unit 7*d*. This receiving sub-buffer 12*b* is provided per VPI/VCI with a storage area (8×53 [bytes]) (only the storage area for one VPI/VCI is illustrated in FIG. 30) consisting of a block 1 (a first storage area) for storing four ATM cells (information transmitting ATM cells), and a block 2 (a second storage area) for similarly storing the four ATM cells (the information transmitting ATM cells). The transmitting/receiving ATM cell storage buffer 12 above the transmitting sub-buffer 12*a* and the receiving sub-buffer 12*b* is provided per VPI/VCI with a management area X consisting of a column I in which a management target VPI/VCI is written, a column II in which to write a head address of the storage area allocated for the same VPI/VCI within the transmitting sub-buffer 12*a*, and a column III in which to write a head address of the storage area allocated for the same VPI/VCI within the receiving sub-buffer 12*b*. Each management area X is allocated within the transmitting/receiving ATM cell storage buffer 12 so that a value of the management target VPI/VCI is coincident with the head address thereof.

Figure 31:
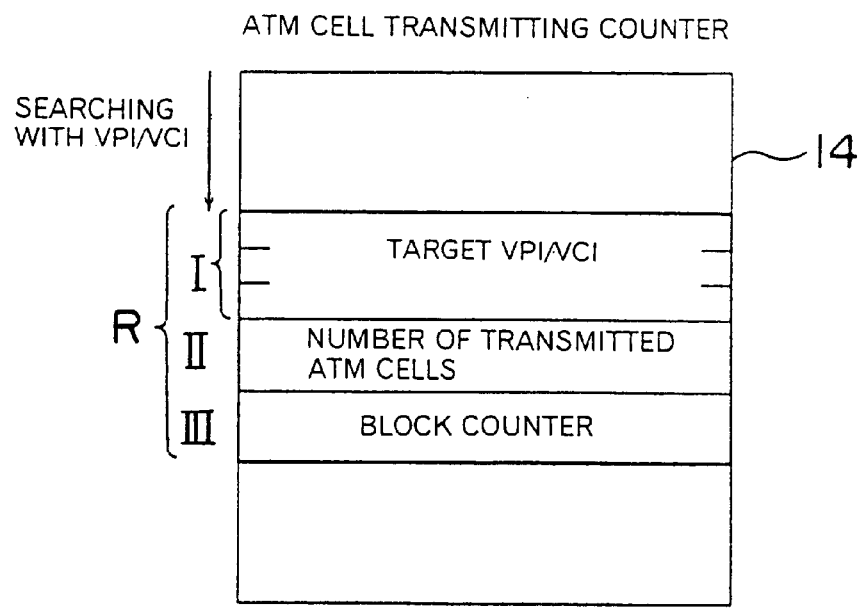
FIG. 31 is a diagram showing a data structure in the ATM cell transmitting counter according to the fifth embodiment.

FIG. 31 is a data structure diagram showing a structure of the ATM cell transmitting counter 14 stored in the storage device 10 of each of the ATM nodes 100, 140 in the fifth embodiment. As shown in FIG. 31, this ATM cell transmitting counter 14 is provided per VPI/VCI with a management area R consisting of a column I in which the management target VPI/VCI is written, a number-of-storage-completed-ATM-cells column II in which to write the number of ATM cells (which is a value counted based on a point of time when stored with the synchronous cell) stored in the storage area within the transmitting sub-buffer 12*a* which is indicated by the same VPI/VCI, and a block counter column III in which to show whether a reading target block is the block 1 or the block 2. Each management area R is allocated within the ATM cell transmitting counter 14 so that a value of the management target VPI/VCI is coincident with the head address thereof.

Figure 32:
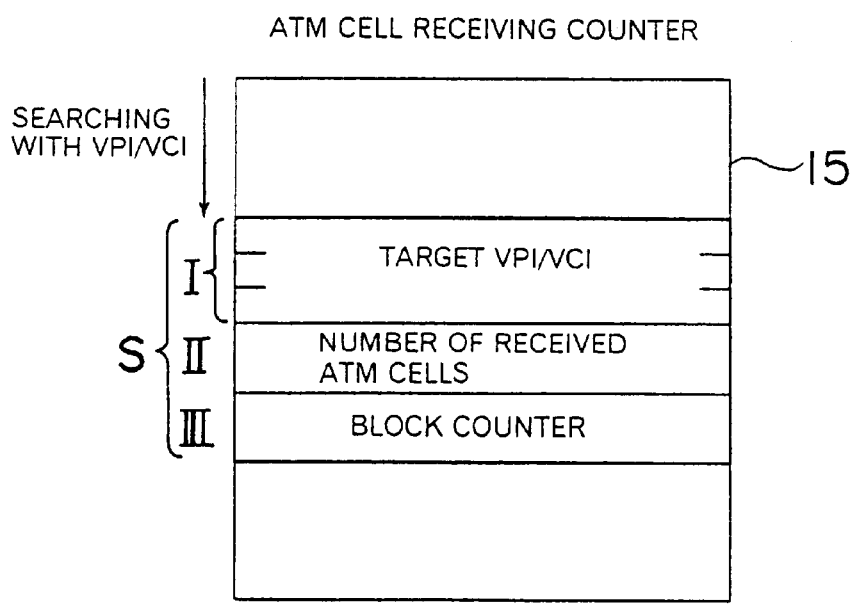
FIG. 32 is a diagram showing a data structure in the ATM cell receiving counter according to the fifth embodiment.

FIG. 32 is a data structure diagram showing a structure of the ATM cell receiving counter 15 stored in the storage device 10 of each of the ATM nodes 100, 140 in the fifth embodiment. As shown in FIG. 32, this ATM cell receiving counter 15 is provided per VPI/VCI with a management area S consisting of a column I in which the management target VPI/VCI is written, a number-of-received-ATM-cells column II in which to write the number of ATM cells (which is a value counted based on a point of time when receiving the synchronous cell) stored in the storage area within the receiving sub-buffer 12*b* which is indicated by the same VPI/VCI, and a block counter column III in which to show whether the reading target block is the block 1 or the block 2. Each management area S is allocated within the ATM cell receiving counter 15 so that a value of the management target VPI/VCI is coincident with the head address thereof.

Note that other configurations in the fifth embodiment are absolutely the same as those in the first embodiment discussed above, and hence the explanations thereof are omitted.

(Flow of Operation in ATM Network System)

Given next is an explanation of the operation of each communication device when providing the wiretap preventing function in the thus constructed ATM network system.

<Call Setting>

The control content of each unit within each of the communication device when setting the call, and the flow of the data (the ATM cells) between the respective communication devices, are absolutely the same as those in the first embodiment, and hence the explanations thereof are omitted.

<Transmission of Information>

Explained next are the content of control of each unit within each of the communication devices when transmitting the information from the transmitting terminal to the receiving terminal due to the call set in the manner described above, and a flow of the information (the ATM cells) between the respective communication devices.

As shown in FIG. 17, the transmitting-side ATM node 100, when receiving the information transmitted from the user terminal (the transmitting terminal) connected to the node 100 itself (S11), segments this item of information on the unit of ATM cell and changes the sequence thereof (S12), and transmits the information towards the transmitting-side ATM network device 110 (S13).

Figure 33:
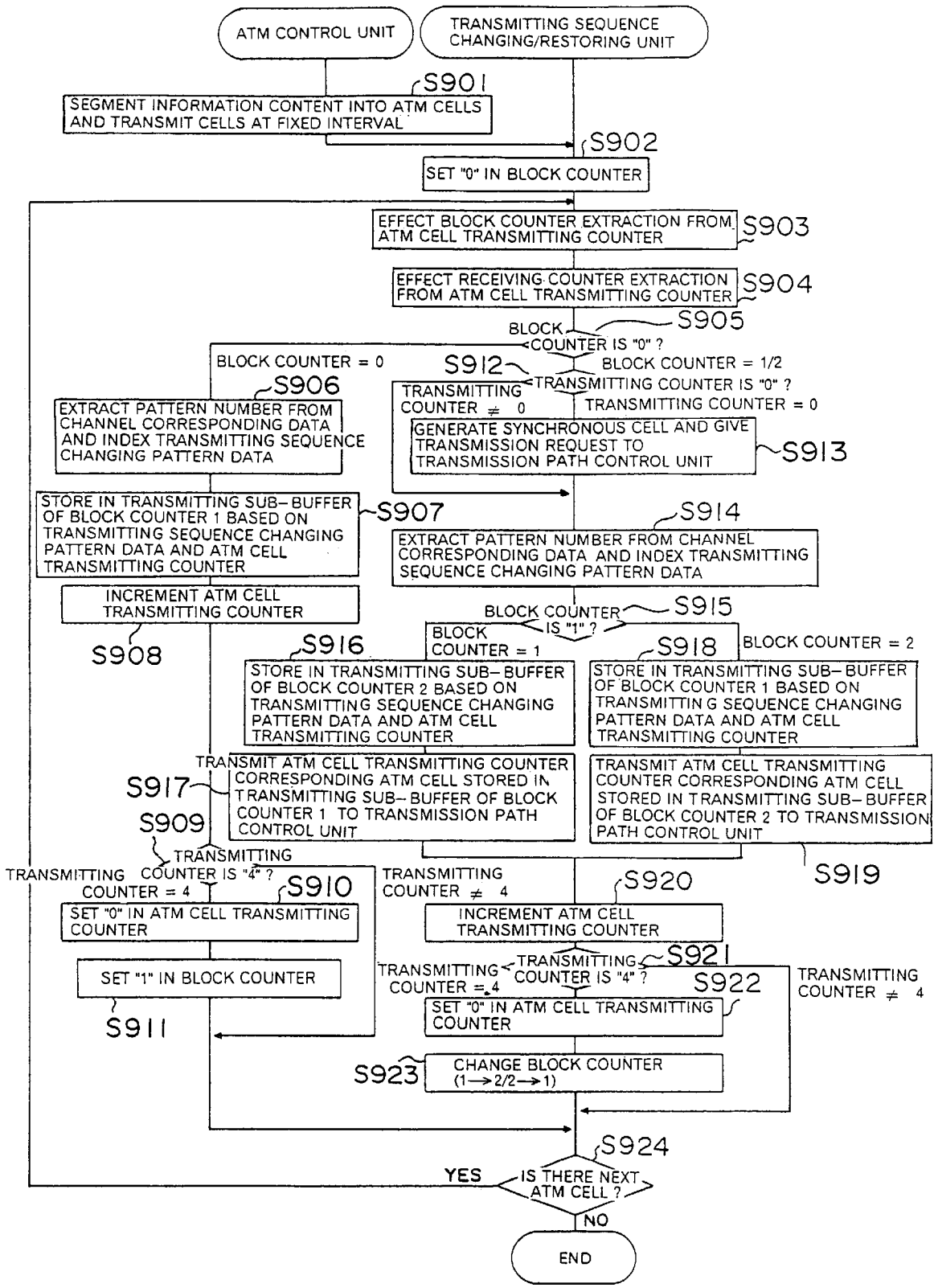
FIG. 33 is a flowchart showing a process of the transmitting-side ATM node when changing a sequence of ATM cells according to the fifth embodiment.

FIG. 33 is a flowchart showing a flow of specific processes executed in the transmitting-side ATM node 100 in order to transmit the cells. According to this flowchart, the ATM control unit 8 divides the transmitting target information received from the service control unit 9 into the unit of cell and stores the ATM cell with each of them in S901. The ATM control unit 8 transfers the generated ATM cells to the transmitting sequence changing/restoring unit 7 at a fixed interval.

The transmitting sequence changing/restoring unit 7 retrieves the ATM cell transmitting counter 14 of the storage device 10 wherein the VPI/VCI of the received ATM cell serves as an index, and specifies the management area R corresponding to this VPI/VCI. Then, the transmitting sequence changing/restoring unit 7 sets the initial value "0" in the block counter column III in the specified management area R (which corresponds to a control unit).

Next, the transmitting sequence changing/restoring unit 7 executes a loop of processes in S903 through S924 on each of the ATM cells received from the ATM control unit 8 in the receiving sequence. In first step S903 after entering this loop of processes, the transmitting sequence changing/restoring unit 7 reads a value of the block counter (a block counter value) from the management area R specified in S902. In next step S904, the transmitting sequence changing/restoring unit 7 reads the number-of-storage-completed-ATM-cells (a transmitting counter value) from the storage area R specified in S902. A counter initial value is "0".

In next step S905, the transmitting sequence changing/restoring unit 7 checks whether the block counter value read in S903 is "0" or not (which corresponds to the control unit). Then, if the block counter value is "0", the transmitting sequence changing/restoring unit 7 retrieves in S906 the channel corresponding data 13 wherein the VPI/VCI of the processing target ATM cell serves as an index, and specifies the management area Z corresponding to this VPI/VCI. Then, the transmitting sequence changing/restoring unit 7 reads a wiretap preventing function pattern number from the specified management area Z. Then, the transmitting sequence changing/restoring unit 7 retrieves the transmitting sequence changing pattern data 11 in the storage device 10 wherein a 4-fold value of this pattern number serves as an index, and specifies the pattern data area Y corresponding to this value.

In next step S907, the transmitting sequence changing/restoring unit 7 sets the transmitting counter value read in S904 as being designated by i, and reads the ATM cell number j written in the i-th entry in the pattern data area Y specified in S906. Further, the transmitting sequence changing/restoring unit 7 retrieves the transmitting/receiving ATM cell storage buffer 12 in the storage device 10 wherein the VPI/VCI of the processing target ATM cell serves as an index, and reads the head address in the storage area within the transmitting sub-buffer 12a which corresponds to this VPI/VCI. Then, the transmitting sequence changing/restoring unit 7 specifies the storage area within the transmitting sub-buffer 12a with the read head address. Then, the transmitting sequence changing/restoring unit 7 stores the j-th storage location in the block 1 in the specified storage area with the processing target ATM cell.

In next step S908, the transmitting sequence changing/restoring unit 7 increments the number-of-storage-completed-ATM-cells (the transmitting counter value) in the management area R specified in S902.

In next step S909, the transmitting sequence changing/restoring unit 7 checks whether the transmitting counter value after being incremented in S908 is "4" or not. Then, if the transmitting counter value is not "4", the transmitting sequence changing/restoring unit 7 advances the processing to S924 and, whereas if the transmitting counter value is "4", advances the processing to S910.

In S910, the transmitting sequence changing/restoring unit 7 resets to "0" the number-of-storage-completed-ATM-cells (the transmitting counter value) in the management area R specified in S902. In next step S911, the transmitting sequence changing/restoring unit 7 sets the block counter value in the management area R to "1" (which corresponds to the control unit). After a completion of the process in S911, the transmitting sequence changing/restoring unit 7 advances the processing to S924.

In S924, the transmitting sequence changing/restoring unit 7 checks whether or not the next ATM cell is received from the ATM control unit 8. Then, if the next ATM cell is received, the transmitting sequence changing/restoring unit 7 returns the processing to S903.

On the other hand, when judging in S905 that the block counter value is not already "0" because of having once executed the process in S911, the transmitting sequence changing/restoring unit 7 advances the processing to S912. In S912, the transmitting sequence changing/restoring unit 7 checks whether the transmitting counter value read in S904 is "0" or not. Then, if the transmitting counter value is not "0", the processing proceeds to S914. Whereas if the transmitting counter value is "0", the processing proceeds to S913.

In S913, the transmitting sequence changing/restoring unit 7 generates the synchronous cell having the same VPI/VCI as that of the processing target ATM cell, transfers this synchronous cell to the transmission control unit 6 and requests transmission. Thereafter, the transmitting sequence changing/restoring unit 7 advances the processing to S914.

In S914, the transmitting sequence changing/restoring unit 7 retrieves the channel corresponding data 13 wherein the VPI/VCI of the processing target ATM cell serves as an index, and specifies the management area Z corresponding to this VPI/VCI. Then, the transmitting sequence changing/restoring unit 7 reads a wiretap preventing function pattern number from the specified management area Z. Then, the transmitting sequence changing/restoring unit 7 retrieves the transmitting sequence changing pattern data 11 in the storage device 10 wherein a 4-fold value of this pattern number serves as an index, and specifies the pattern data area Y corresponding to this value.

In S915, the transmitting sequence changing/restoring unit 7 checks whether the block counter value read in S903 is "1" or "2". Then, if the counter value is "1", the processing proceeds to S916 and, if the counter value is "2", proceeds to S918 (which corresponds to the control unit).

In S916, the transmitting sequence changing/restoring unit 7 sets the transmitting counter value read in S904 as being designated by i, and reads the ATM cell number j written in the i-th entry in the pattern data area Y specified in S914. Further, the transmitting sequence changing/restoring unit 7 retrieves the transmitting/receiving ATM cell storage buffer 12 in the storage device 10 wherein the VPI/VCI of the processing target ATM cell serves as an index, and reads the head address in the storage area within the transmitting sub-buffer 12a which corresponds to this VPI/VCI. Then, the transmitting sequence changing/restoring unit 7 specifies the storage area within the transmitting sub-buffer 12a with the read head address. Then, the transmitting sequence changing/restoring unit 7 stores the j-th storage location in the block 2 in the specified storage area with the processing target ATM cell.

In next process S917, the transmitting sequence changing/restoring unit 7 transfers to the transmission path control unit 6 the ATM cell stored in the i-th storage location in the block 1 within the storage area specified in S916, and requests transmission. After a completion of the process in S917, the transmitting sequence changing/restoring unit 7 advances the processing to S920.

By contrast, in S918, the transmitting sequence changing/restoring unit 7 sets the transmitting counter value read in S904 as being designated by i, and reads the ATM cell number j written in the i-th entry in the pattern data area Y specified in S914. Further, the transmitting sequence changing/restoring unit 7 retrieves the transmitting/receiving ATM cell storage buffer 12 in the storage device 10 wherein the VPI/VCI of the processing target ATM cell serves as an index, and reads the head address in the storage area within the transmitting sub-buffer 12a which corresponds to this VPI/VCI. Then, the transmitting sequence changing/restoring unit 7 specifies the storage area within the transmitting sub-buffer 12a with the read head address. Then, the transmitting sequence changing/restoring unit 7 stores the j-th storage location in the block 1 in the specified storage area with the processing target ATM cell.

In next process S919, the transmitting sequence changing/restoring unit 7 transfers to the transmission path control unit 6 the ATM cell stored in the i-th storage location in the block 2 within the storage area specified in S918, and requests transmission. After a completion of the process in S919, the transmitting sequence changing/restoring unit 7 advances the processing to S920.

In S920, the transmitting sequence changing/restoring unit 7 increments the number-of-storage-completed-ATM-cells (the transmitting counter value) in the management area R specified in S902.

In next step S921, the transmitting sequence changing/restoring unit 7 checks whether the transmitting counter value after increment in S920 is "4" or not. Then, if the transmitting counter value is not "4", the transmitting sequence changing/restoring unit 7 advances the processing to S924 and, whereas if the transmitting counter value is "4", advances the processing to S922.

In S922, the transmitting sequence changing/restoring unit 7 resets to "0" the number-of-storage-completed-ATM-cells (the transmitting counter value) in the management area R specified in S902. In next step S923, the transmitting sequence changing/restoring unit 7, if the block counter value in the management area R specified in S902 is "1", changes the setting thereof to "2" and, if the same value is "2", changes it to "1" (which corresponds to the control unit). After a completion of the process in S923, the transmitting sequence changing/restoring unit 7 advances the processing to S924.

In S924, the transmitting sequence changing/restoring unit 7 checks whether or not the next ATM cell is received from the ATM control unit 8. Then, if the next ATM cell is received, the transmitting sequence changing/restoring unit 7 returns the processing to S903.

By contrast, if all the ATM cells received from the ATM control unit 8 have been completely transferred to the transmission path control unit 6 as a result of repeating the loop of processes in S903 through S924, the transmitting sequence changing/restoring unit 7 finishes the processing.

The transmission path control unit 6 sends the ATM cells received from the transmitting sequence changing/restoring unit 7 towards the ATM network device 110 via the transmission path $L_1$ in the receiving sequence.

Referring to FIG. 17, the transmitting-side ATM network device 110 switches the ATM cells received from the transmitting-side ATM node 100 (S15), and sends the ATM cells to the receiving-side ATM network device 130 (S16). The receiving-side ATM network device 130 switches the ATM cells received from the transmitting-side ATM node 110 (S17), and sends the ATM cells to the receiving-side ATM network device 140 (S18).

The receiving-side ATM node 140, upon receiving the ATM cells from the receiving-side ATM network device 130, reproduces the transmitting target information by restoring the sequence of the received ATM cells (S19), and transmits the reproduced information to the receiving terminal (S20).

Figure 34:
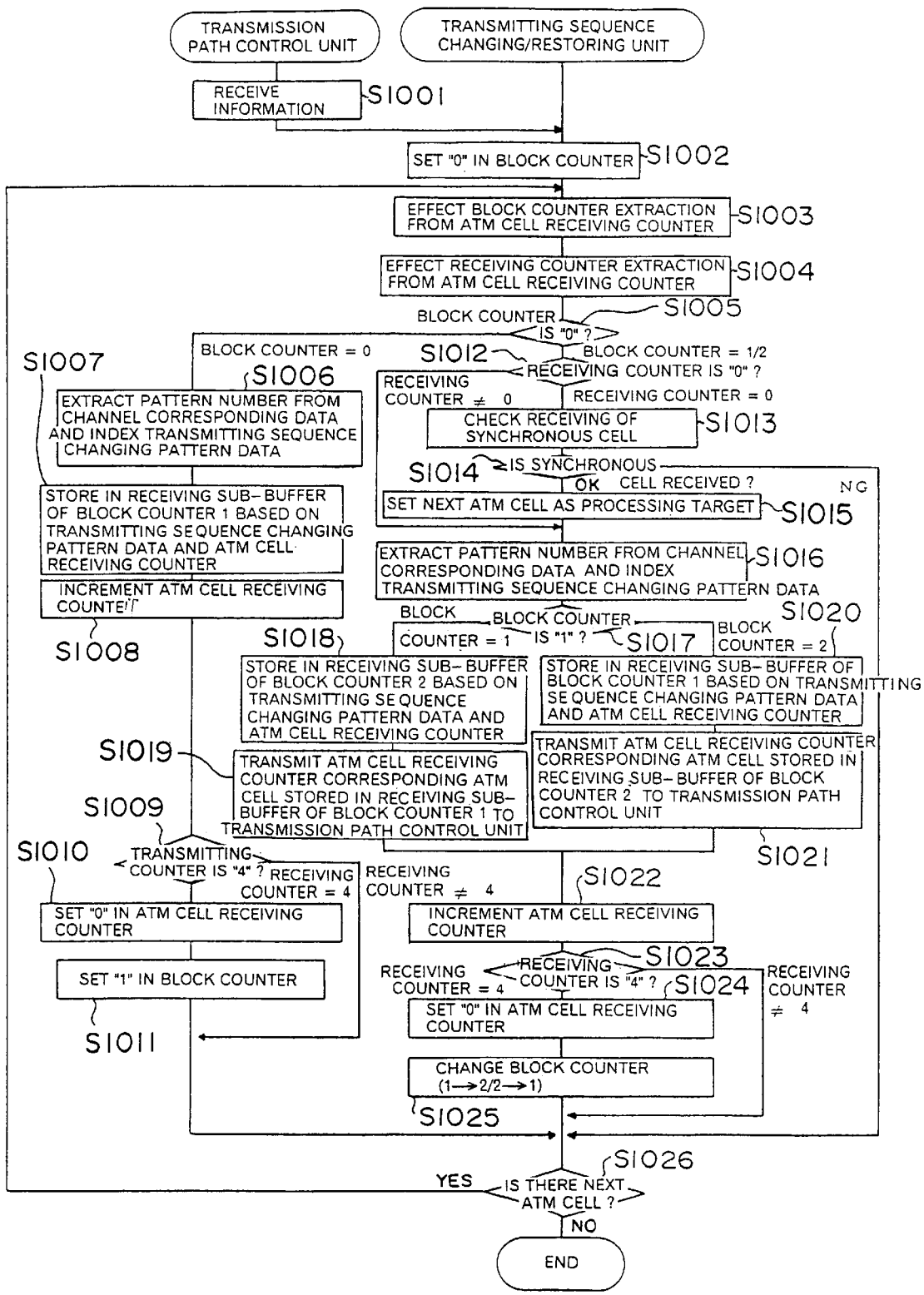
FIG. 34 is a flowchart showing a process of the receiving-side ATM node when restoring the sequence of ATM cells according to the fifth embodiment.

FIG. 34 is a flowchart showing a flow of specific processes executed in the receiving-side ATM node 140 in order to reproduce this item of information. According to this flowchart, the transmission path control unit 6, when receiving the ATM cells stored with the information from the receiving-side ATM network device 130, transfers the received ATM cells to the transmitting sequence changing/restoring unit 7 in S1001.

In S1002, the transmitting sequence changing/restoring unit 7 retrieves the ATM cell receiving counter 15 in the storage device 10 wherein the VPI/VCI of the received ATM cell serves as an index, and specifies the management area S corresponding to this VPI/VCI. Then, the transmitting sequence changing/restoring unit 7 sets the initial value "0" in the block counter column III in the specified management area S (which corresponds to the control unit).

Next, the transmitting sequence changing/restoring unit 7 executes a loop of processes in S1003 through S1026 on each of the ATM cells received from the transmission path control unit 6 in the received sequence. In first step S1003 after entering this loop of processes, the transmitting sequence changing/restoring unit 7 reads a value of the block counter (the block counter value) from the management area S specified in S1002. In next step S1004, the transmitting sequence changing/restoring unit 7 reads the number-of-received-ATM-cells (a receiving counter value) from the storage area R specified in S1002. A counter initial value is "0".

In next step S1005, the transmitting sequence changing/restoring unit 7 checks whether the block counter value read in S1003 is "0" or not (which corresponds to the control unit). Then, if the block counter value is "0", the transmitting sequence changing/restoring unit 7 retrieves in S1006 the channel corresponding data 13 wherein the VPI/VCI of the processing target ATM cell serves as an index, and specifies the management area Z corresponding to this VPI/VCI.

Then, the transmitting sequence changing/restoring unit 7 reads a wiretap preventing function pattern number from the specified management area Z. Then, the transmitting sequence changing/restoring unit 7 retrieves the transmitting sequence changing pattern data 11 in the storage device 10 wherein a 4-fold value of this pattern number serves as an index, and specifies the pattern data area Y corresponding to this value.

In next step S1007, the transmitting sequence changing/restoring unit 7 sets the receiving counter value read in S1004 as being designated by k, and specifies the number-of-entries $n_e$ ranging from the head to the entry concerned in the pattern data area Y by examining the entry in which the ATM cell number k is written in the pattern data area Y specified in S1006. Further, the transmitting sequence changing/restoring unit 7 retrieves the transmitting/receiving ATM cell storage buffer 12 in the storage device 10 wherein the VPI/VCI of the processing target ATM cell serves as an index, and reads the head address in the storage area within the receiving sub-buffer 12b which corresponds to this VPI/VCI. Then, the transmitting sequence changing/restoring unit 7 specifies the storage area within the receiving sub-buffer 12b with the read head address. Then, the transmitting sequence changing/restoring unit 7 stores the $n_e$-th storage location in the block 1 in the specified storage area with the processing target ATM cell.

In next step S1008, the transmitting sequence changing/restoring unit 7 increments the number-of-received-ATM-cells (the receiving counter value) in the management area S specified in S1002.

In next step S1009, the transmitting sequence changing/restoring unit 7 checks whether the receiving counter value after being incremented in S1002 is "4" or not. Then, if the receiving counter value is not "4", the transmitting sequence changing/restoring unit 7 advances the processing to S1026 and, whereas if the receiving counter value is "4", advances the processing to S1010.

In S1010, the transmitting sequence changing/restoring unit 7 resets to "0" the number-of-received-ATM-cells (the receiving counter value) in the management area S specified in S1002. In next step S1011, the transmitting sequence changing/restoring unit 7 sets the block counter value in the management area S to "1" (which corresponds to the control unit). After a completion of the process in S1011, the transmitting sequence changing/restoring unit 7 advances the processing to S1026.

In S1026, the transmitting sequence changing/restoring unit 7 checks whether or not the next ATM cell is received from the transmission path control unit 6. Then, if the next ATM cell is received, the transmitting sequence changing/restoring unit 7 returns the processing to S1003.

On the other hand, when judging in S1011 that the block counter value is not already "0" because of having once executed the process in S1011, the transmitting sequence changing/restoring unit 7 advances the processing to S1012. In S1012, the transmitting sequence changing/restoring unit 7 checks whether the receiving counter value read in S1004 is "0" or not. Then, if the receiving counter value is not "0", the processing proceeds to S1016. Whereas if the receiving counter value is "0", the processing proceeds to S1013.

In S1013, the transmitting sequence changing/restoring unit 7 checks whether or not the processing target ATM cell received from the transmission path control unit 6 is the synchronous cell. Then, when judging in S1014 that the processing target ATM cell is not the synchronous cell, the transmitting sequence changing/restoring unit 7 advances the processing to S1026. While on the other hand, when judging in S1014 that the processing target ATM cell is the synchronous cell, the transmitting sequence changing/restoring unit 7 discards the processing target synchronous cell, and treats the next ATM cell received from the transmission path control unit 6 as a processing target. After a completion of the process in S1015, the transmitting sequence changing/restoring unit 7 advances the processing to S1016.

In S1016, the transmitting sequence changing/restoring unit 7 retrieves the channel corresponding data 13 wherein the VPI/VCI of the processing target ATM cell serves as an index, and specifies the management area Z corresponding to this VPI/VCI. Then, the transmitting sequence changing/restoring unit 7 reads a wiretap preventing function pattern number from the specified management area Z. Then, the transmitting sequence changing/restoring unit 7 retrieves the transmitting sequence changing pattern data 11 in the storage device 10 wherein a 4-fold value of this pattern number serves as an index, and specifies the pattern data area Y corresponding to this value.

In S1017, the transmitting sequence changing/restoring unit 7 checks whether the block counter value read in S1003 is "1" or "2". Then, if the counter value is "1", the processing proceeds to S1018 and, if the counter value is "2", proceeds to S1020 (which corresponds to the control unit).

In S1018, the transmitting sequence changing/restoring unit 7 sets the transmitting counter value read in S1004 as being designated by k, and specifies the number-of-entries $n_e$ ranging from the head to the entry concerned in the pattern data area Y by examining the entry in which the ATM cell number k is written in the pattern data area Y specified in S1016. Further, the transmitting sequence changing/restoring unit 7 retrieves the transmitting/receiving ATM cell storage buffer 12 in the storage device 10 wherein the VPI/VCI of the processing target ATM cell serves as an index, and reads the head address in the storage area within the receiving sub-buffer 12b which corresponds to this VPI/VCI. Then, the transmitting sequence changing/restoring unit 7 specifies the storage area within the receiving sub-buffer 12b with the read head address. Then, the transmitting sequence changing/restoring unit 7 stores the $n_e$-th storage location in the block 2 in the specified storage area with the processing target ATM cell.

In next process S1019, the transmitting sequence changing/restoring unit 7 transfers to the ATM control unit 8 the ATM cell stored in the k-th storage location in the block 1 within the storage area specified in S1018. After a completion of the process in S1019, the transmitting sequence changing/restoring unit 7 advances the processing to S1022.

By contrast, in S1020, the transmitting sequence changing/restoring unit 7 specifies the number-of-entries $n_e$, and specifies the storage area within the receiving sub-buffer 12b in the same way as S1018. Then, the transmitting sequence changing/restoring unit 7 stores the $n_e$-th storage location in the block 1 in the specified storage area with the processing target ATM cell.

In next process S1021, the transmitting sequence changing/restoring unit 7 transfers to the ATM control unit 8 the ATM cell stored in the k-th storage location in the block 2 within the storage area specified in S1020. After a completion of the process in S1021, the transmitting sequence changing/restoring unit 7 advances the processing to S1022.

In S1022, the transmitting sequence changing/restoring unit 7 increments the number-of-received-ATM-cells (the receiving counter value) in the management area S specified in S1002.

In next step S1023, the transmitting sequence changing/ restoring unit 7 checks whether the receiving counter value after being incremented in S1022 is "4" or not. Then, if the receiving counter value is not "4", the transmitting sequence changing/restoring unit 7 advances the processing to S1026 and, whereas if the receiving counter value is "4", advances the processing to S1024.

In S1024, the transmitting sequence changing/restoring unit 7 resets to "0" the number-of-received-ATM-cells (the receiving counter value) in the management area S specified in S1002. In next step S1025, the transmitting sequence changing/restoring unit 7, if the block counter value in the management area S specified in S1002 is "1", changes the setting thereof to "2" and, if the same value is "2", changes it to "1" (which corresponds to the control unit). After a completion of the process in S1025, the transmitting sequence changing/restoring unit 7 advances the processing to S1026.

In S1026, the transmitting sequence changing/restoring unit 7 checks whether or not the next ATM cell is received from the transmission path control unit 6. Then, if the next ATM cell is received, the transmitting sequence changing/ restoring unit 7 returns the processing to S1003.

By contrast, if all the ATM cells received from the transmission path control unit 6 have been completely transferred to the ATM control unit 8 as a result of repeating the loop of processes in S1003 through S1026, the transmitting sequence changing/restoring unit 7 finishes the processing.

The ATM control unit 8 extracts only the contents of the payload fields from the ATM cell string received from the transmitting sequence changing/restoring unit 7, and connects the contents extracted to each other, thereby reproducing the transmitting target information. The ATM control unit 8 transfers the reproduced transmitting target information to the service control unit 9. The service control unit 9 transmits the transmitting target information received from the ATM control unit 8 to the receiving terminal.

In accordance with the thus constructed fifth embodiment, each storage area in the transmitting buffer 12a takes the double buffer construction composed of the block 1 and the block 2 each having the same structure, and hence the four ATM cells are written to one block, during which the four ATM cells are read one by one from another block. Namely, every time the loop of processes in S903 through S924 in FIG. 33 are executed once, one ATM cell (belonging to the group between a certain synchronous cell [n] and the next synchronous cell [n+1]) is read from one block, and one ATM cell (belonging to the group between the above synchronous cell [n+1] and the next synchronous cell [n+2]) is written to another block. As a result, the ATM cells are sent from the transmitting-side ATM node 100 at the same interval as the time for which the loop of processes in S903 through S924 are executed once. Consequently, there is cause no deviation between the ATM cell generation interval in the ATM control unit 8 in the transmitting-side ATM node 100 and the ATM cell receiving interval in the receiving-side ATM node 140, and therefore the voice information is always normally restored without causing any decline of quality.

[Embodiment 6]

A sixth embodiment of the present invention is contrived to prevent the wiretap between a transmitting-side ATM node 210 and a received-side ATM node 230 by incorporating, as in the second embodiment discussed above, the wiretap preventing function into each of ATM network devices 210, 230. Unlike such a construction that the sequence is changed based on the unit of ATM virtual channel (VPI/VCI) in the second embodiment, however, the sequence is changed based on the unit of ATM virtual path (VPI) in the sixth embodiment.

(Construction of ATM Network System)

Figure 35:
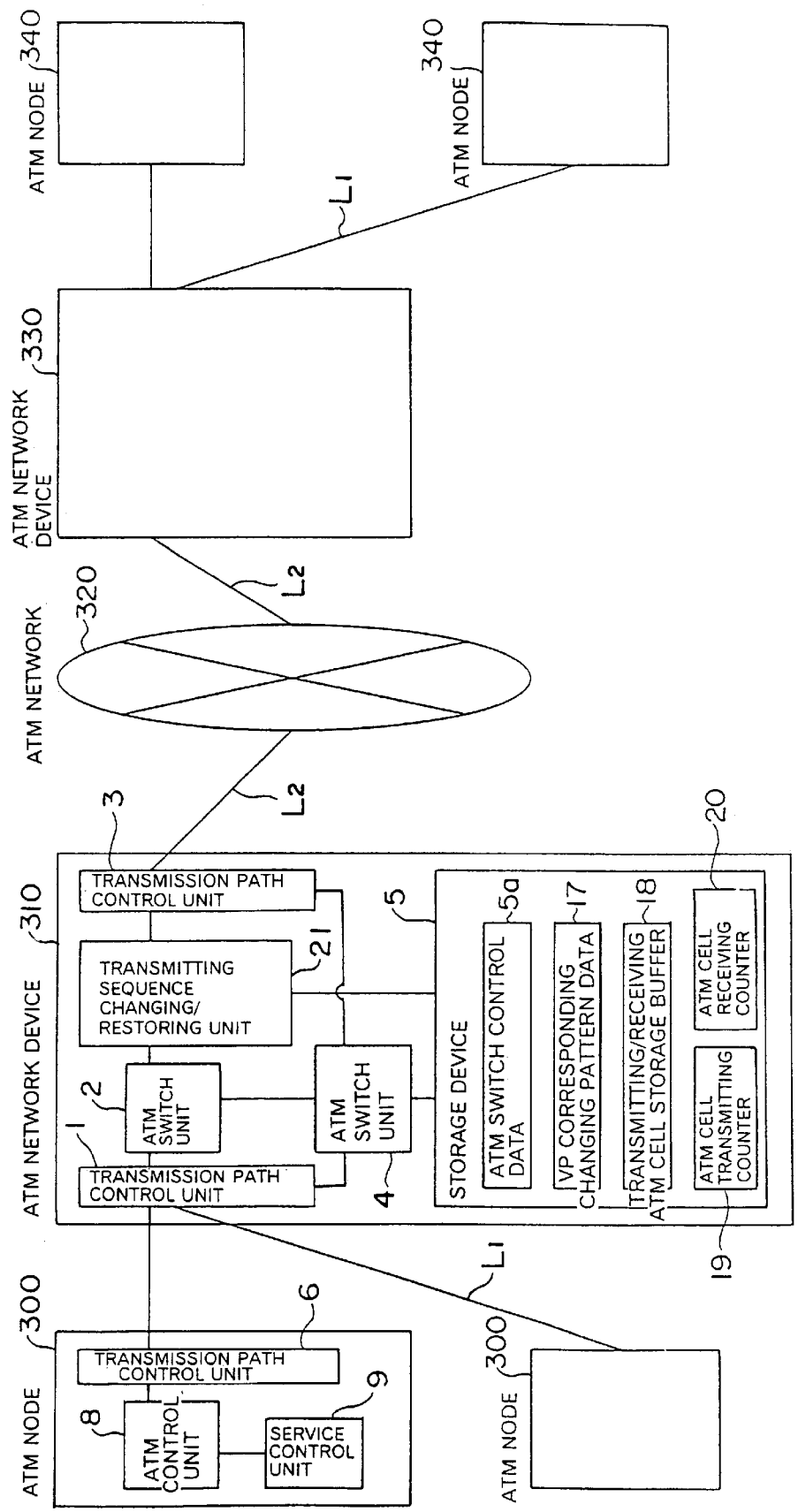
FIG. 35 is a block diagram schematically showing a construction of the ATM network in a sixth embodiment of the present invention.

FIG. 35 is a block diagram schematically showing a construction of the ATM network system as well as schematically showing constructions of respective communication devices constituting this ATM network system. As illustrated in FIG. 35, an ATM network 320 serving as the core of the ATM network system is constructed of a multiplicity of ATM network devices connected to each other. A single network device 310 partly constituting this ATM network 320 is connected to two ATM nodes 300, 300. Further, another network device 330 partly constituting the ATM network 320 is connected to other ATM nodes 340, 340. These ATM nodes 300, 340 are connected respectively to unillustrated user terminals.

In the following discussion, an explanation is given on the assumption that a user terminal (a transmitting terminal) connected to any one of the ATM nodes 300 transmits a call to a user terminal (a receiving terminal) connected to any one of the ATM nodes 340 and that a user terminal (a transmitting terminal) connected to the other ATM node 300 transmits a call and information to a user terminal (a receiving terminal) connected to the other ATM node 340. In this case, the VCIs of the ATM virtual channels set for the respective calls are separate, however, these ATM virtual channels run through the same route (the ATM virtual path) between the two ATM network devices 310, 330, and hence values of the VPIs are the same. Incidentally, in the following discussion, as the case may be, each of the ATM nodes 300, 300 is called a "transmitting-side ATM node", the ATM network device 310 is referred to as a "transmitting-side ATM network device", the ATM network device 330 is termed a "receiving-side ATM network device", and the ATM node 340 is called a "receiving-side ATM node".

<ATM Network Device>

Each of the ATM network devices 310, 330 is classified as an ATM switch for controlling a transmission path. Each of these ATM network devices 310, 330 is constructed of a transmission path control unit 1 connected to a transmission path $L_1$ led to the ATM node 300 or 340, an NNI transmission path control unit 3 connected to a transmission path $L_2$ led to other ATM network device within the ATM network 320, an ATM switch unit 2 connected to the UNI transmission path control unit 1, a transmitting sequence changing/ restoring unit 21 connected between this ATM switch unit 2 and the NNI transmission path control unit 3, an ATM switch control unit 4 connected to these transmission path control units 1, 3 and to the ATM switch unit 2, and a storage device 5 connected to the transmitting sequence changing/restoring unit 21. The two transmission control units 1, 3 and the ATM switch control unit 2 are absolutely the same as those in the second embodiment, and hence the explanations thereof are omitted.

The storage device 5 is a memory stored with the ATM switch control data 5a, VP corresponding changing pattern data 17, transmitting/receiving ATM cell storage buffer 18, an ATM cell transmitting counter 19, and an ATM cell receiving counter 20, which are all the same as those stored in the storage device 5 in the second embodiment.

The transmitting sequence changing/restoring unit 21 is provided with, as the same as the unit 7 in FIG. 2, the transmitting sequence changing unit, the transmitting target fetching unit, the receiving sequence restoring unit and the receiving target fetching unit.

Figure 36:
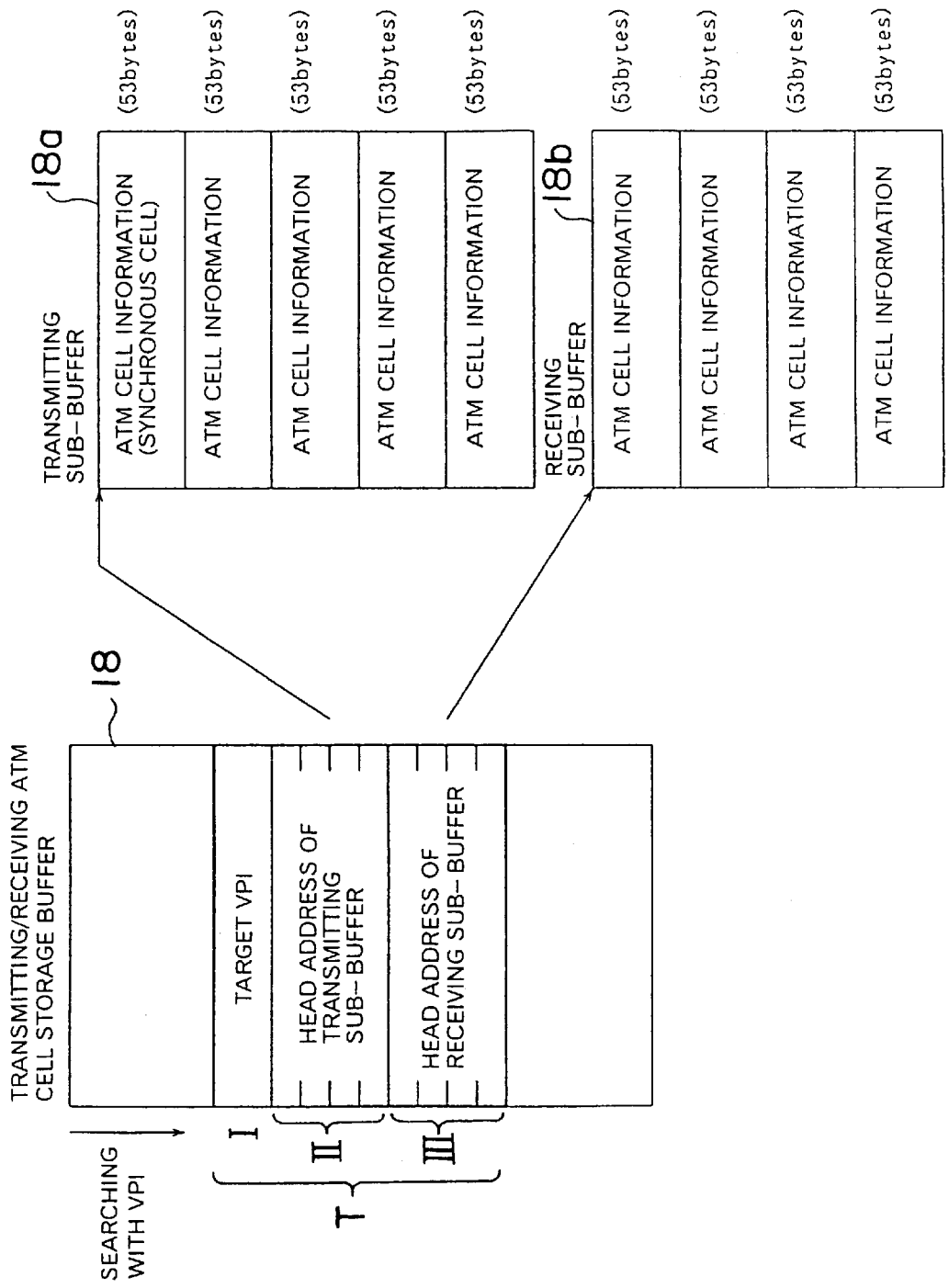
FIG. 36 is a diagram showing a data structure of VP corresponding changing pattern data.

The transmitting/receiving ATM cell storage buffer 18 in the storage device 5, as illustrated in FIG. 36, includes a transmitting sub-buffer 18*a* and a receiving sub-buffer 18*b*. This transmitting sub-buffer 18*a* is defined as a memory area to which the ATM cell is written by the transmitting sequence changing unit of the transmitting sequence changing/restoring unit 21 and from which the ATM cell is read by the transmitting target fetching unit thereof. This transmitting sub-buffer 18*a* is provided per VPI with a storage area (5×53 [bytes]) for storing five pieces of ATM cells (four ATM cells for transmitting the information and one synchronous cell) having the common VPI (only the area for one VPI is shown in FIG. 36). On the other hand, the receiving sub-buffer 18*b* is defined a memory area to which the ATM cell is written by the receiving sequence restoring unit and from which the ATM cell is read by the receiving target fetching unit. This receiving sub-buffer 18*b* ensures per VPI a storage area (4×53 [bytes]) for storing four pieces of ATM cells (four ATM cells for transmitting the information) having the common VPI (only the area for one VPI is shown in FIG. 36). The transmitting/receiving ATM cell storage buffer 18 above the transmitting sub-buffer 18*a* and the receiving sub-buffer 18*b* is provided per VPI with a management area T composed of a column I in which a management target VPI is written, a column II in which to write a head address of the storage area ensured for the same VPI within the transmitting sub-buffer 18*a*, and a column III in which to write a head address of the storage area ensured for the same VPI within the receiving sub-buffer 18*b*. Each management area T is allocated within the transmitting/ receiving ATM cell storage buffer 18 so that a value of the management target VPI is coincident with the head address thereof.

Figure 37:
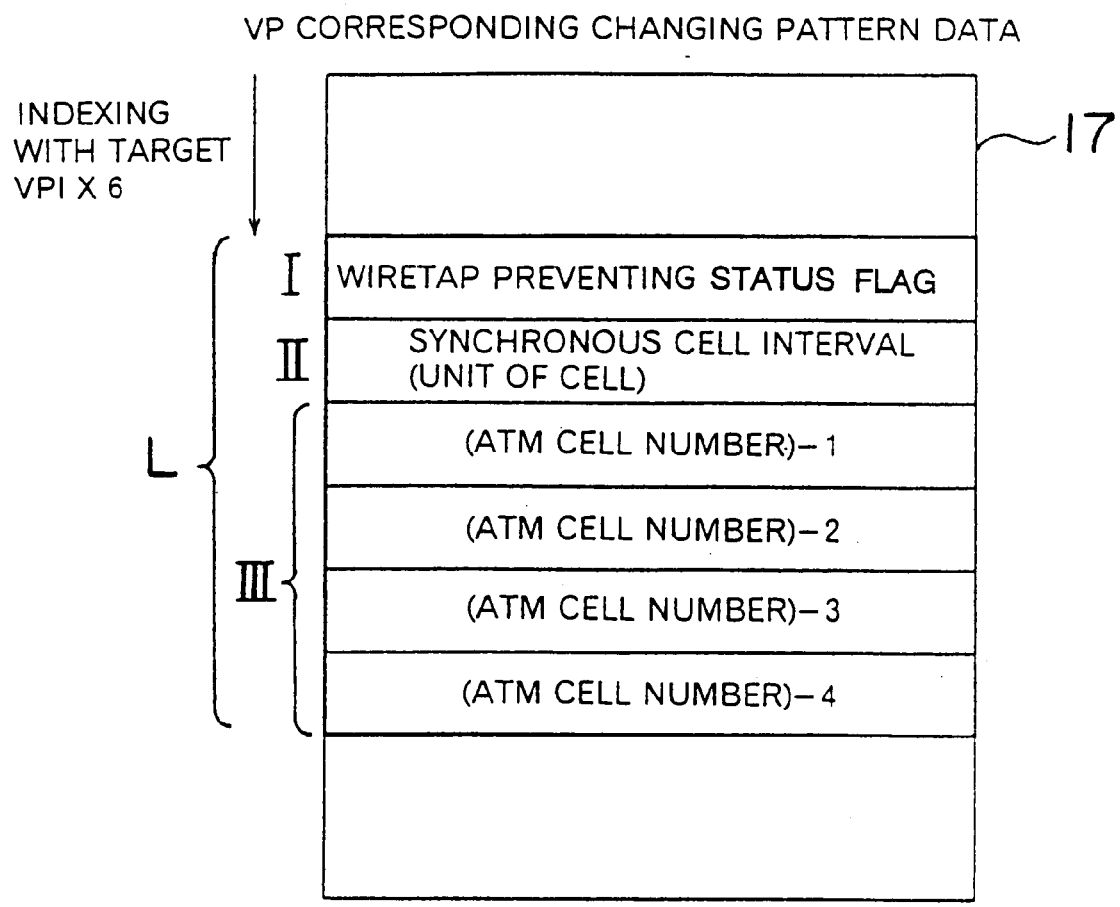
FIG. 37 is a diagram showing a data structure in the transmitting/receiving ATM cell storage buffer according to the sixth embodiment.

The VP corresponding changing pattern data 17 in the storage device 5 is, as shown in FIG. 37, provided per VPI with a management area L composed of a wiretap preventing status flag area I for indicating whether or not the wiretap preventing function should be provided to the ATM virtual path shown by the VPI concerned, an inter synchronous cell interval II for indicating an insertion interval of the synchronous cell in the wiretap preventing function provided, and a sequence changing pattern column III consisting of four entries arranged consecutively. Note that the "ATM cell number" written in each entry in each sequence changing pattern column III designates a relative storage location of a writing target ATM cell on the basis of the storage location of the synchronous cell in each storage area within the transmitting sub-buffer 18*a*. The head address in each management area L within the VP corresponding changing pattern data 17 is made corresponding to a 4-fold value of the value of the VPI managed in the management area L.

Figure 38:
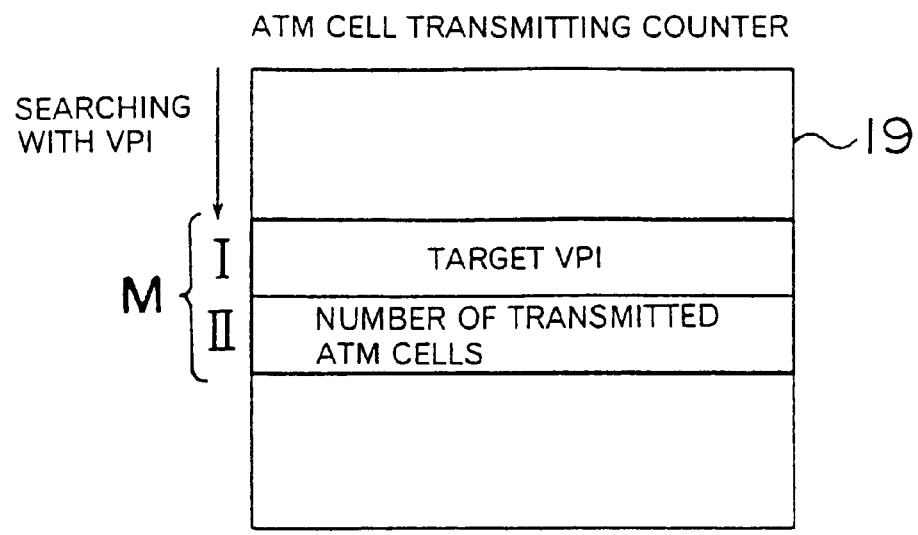
FIG. 38 is a diagram showing a data structure in the ATM cell transmitting counter according to the sixth embodiment.

As shown in FIG. 38, the ATM cell transmitting counter 19 in the storage device 5 is provided per VPI with a management area M consisting of a column I in which the management target VPI is written, and a number-of-storage-completed-ATM-cells column II in which to write a number (a value counted based on the point of time when storing the synchronous cell) of the ATM cells stored in the storage area within the transmitting sub-buffer 18*a* that is shown by the same VPI. Each management area M is allocated within the ATM cell transmitting counter 19 so that a value of the management target VPI is coincident with the head address thereof.

Figure 39:
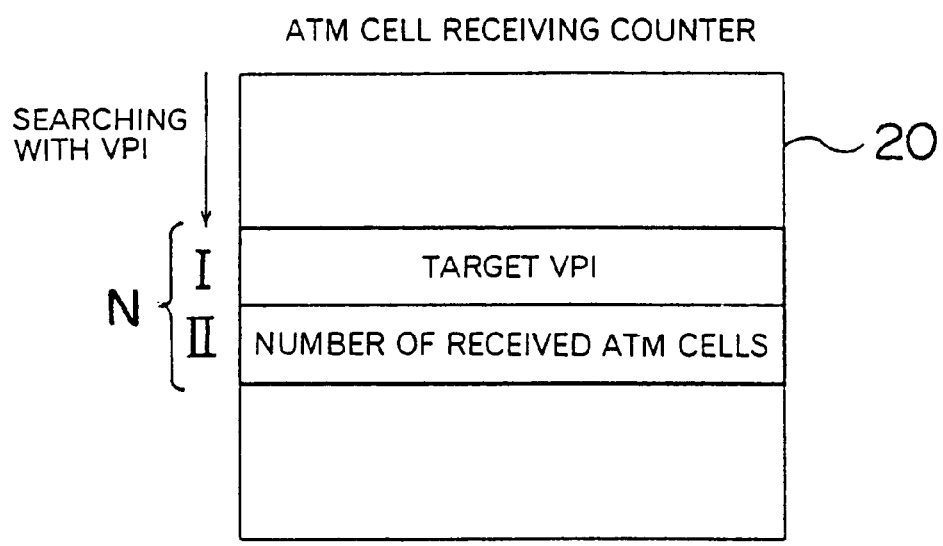
FIG. 39 is a diagram showing a data structure in the ATM cell receiving counter according to the sixth embodiment.

The ATM cell receiving counter 20 in the storage device 5 is, as shown in FIG. 39, provided per VPI with a management area N composed of a column I in which the management target VPI is written, and a number-of-received-ATM-cells column II in which to write the number of ATM cells (which is a value counted based on the point of time when receiving the synchronous cell) stored in the storage area within the receiving sub-buffer 18*b* which is shown by the same VPI. Each management area N is allocated within the ATM cell receiving counter 20 so that a value of the management target VPI is coincident with the head address thereof.

The transmitting sequence changing/restoring unit 21 has absolutely the same construction as that in the second embodiment except for such a point that the wiretap preventing function is provided based on the unit of ATM virtual path (VPI), and hence the explanation thereof is omitted.

<ATM Node>

The ATM nodes 300, 340 are communication devices, to which the ATM network devices 310, 330 connected via the transmission path 11 provide communication services, and each incorporate a function of terminating the ATM.

The ATM nodes 300, 340 are constructed of the transmission path control units 6 connected to the transmission paths $L_1$ led to the ATM network devices 310, 330, the ATM control units 8 connected to the transmission path control units 6, and the service control units 9 connected to the ATM control units 8. The configurations of the transmission path control unit 6, the ATM control unit 8 and the service control unit 9 are absolutely the same as those in the second embodiment, and hence the explanations thereof are omitted.

(Flow of Operation in ATM Network System)

Next, operations of the respective communication devices when providing the wiretap preventing function in the constructed ATM network system, will be explained.

<Call Setting>

The content of control of each unit within each of the communication devices in the call setting process and a flow of data (the ATM cells) between the respective communication devices, are absolutely the same as those in the first embodiment, and hence the explanations thereof are omitted.

<Transmission of Information>

Explained next are the content of control of each unit within each of the communication devices when transmitting the information from the transmitting terminal to the receiving terminal due to the call set in the manner, and a flow of the information (the ATM cells) between the respective communication devices.

Figure 40:
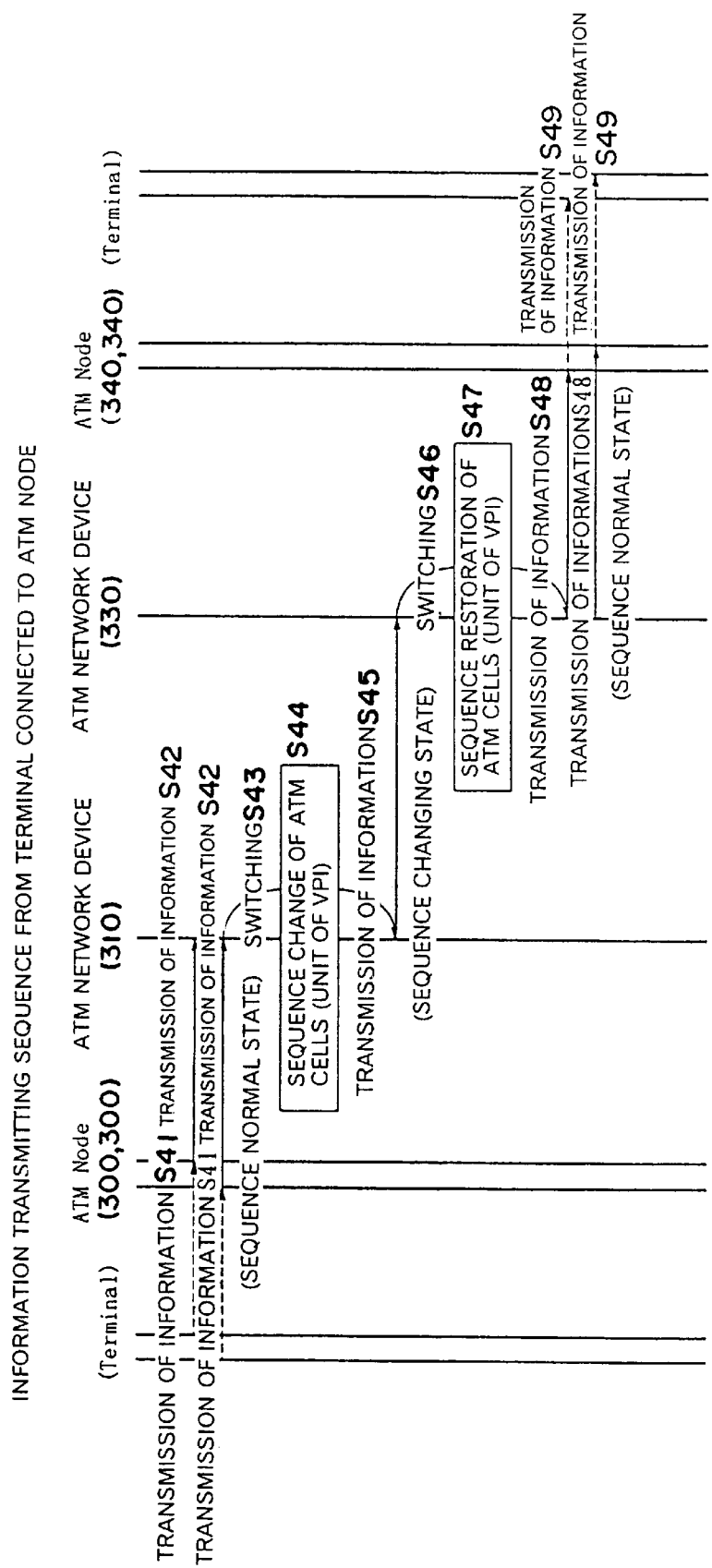
FIG. 40 is a sequence diagram showing a flow of data between respective communication devices when transmitting the information according to the sixth embodiment.

As shown in FIG. 40, each of the ATM nodes 300, 300, when receiving the information transmitted from the user terminal (the transmitting terminal) connected to the node 300 itself (S41), divides this item of information into the unit of ATM cell, adds individual VCI and a common VPI thereto, and transmits the information towards the transmitting-side ATM network device 310 (S42).

The UNI transmission path control unit 1 of the transmitting-side ATM network device 310 rewrites the header of the ATM cell received from each of the transmitting-side ATM nodes 300, 300 under the control of the ATM switch control unit 4, and sends the ATM cell to the ATM switch unit 2. The switch unit 2 switches the sent ATM cell along the ATM virtual channel in which the call is set, and sends it to the transmitting sequence changing/restoring unit 21 (S43). The transmitting sequence changing/restoring unit 21 groups the ATM cells by fours irrespective of whatever VCI they may have, which cells have the common VPI and have been received from the ATM switch unit 2, and adds the synchronous cell to the head of this group. Then, the transmitting sequence changing/restoring unit 21 changes the sequence of the ATM cells within the group consisting of the four cells, and sequentially transfers the cells to the NNI transmission path control unit 3 (S44).

Figure 41:
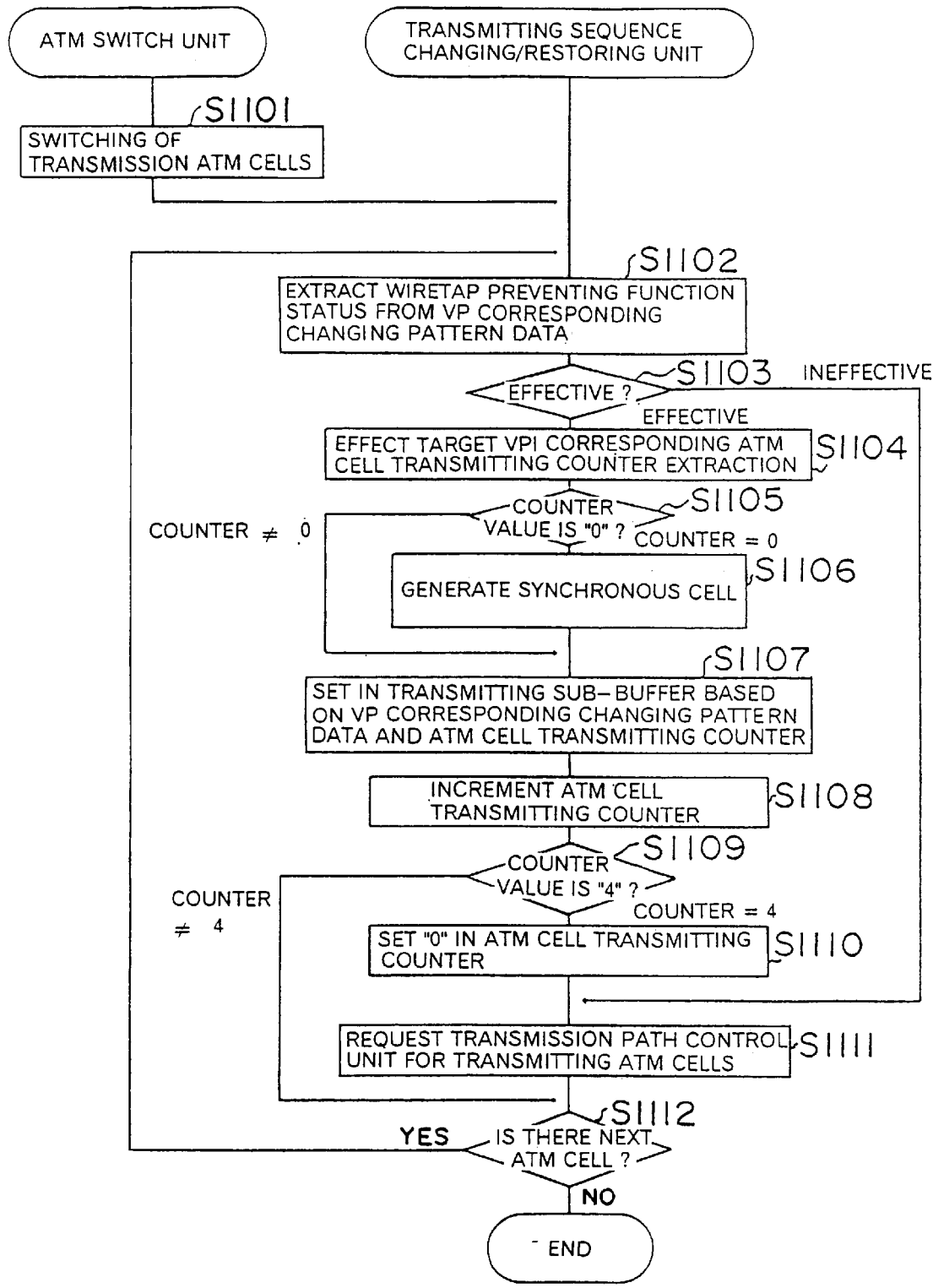
FIG. 41 is a flowchart showing a process of the transmitting-side ATM node when changing a sequence of ATM cells according to the sixth embodiment.

FIG. 41 is a flowchart showing a flow of specific processes executed in the transmitting-side ATM network device 310 in order to transmit the cells. According to this flowchart, the ATM switch unit 2 of the transmitting-side ATM network device 310 switches in S1101 the ATM cell string, and transfers the ATM cell string to the transmitting sequence changing/restoring unit 21.

The transmitting sequence changing/restoring unit 21 executes a loop of processes in S1102 through S1112 on each of the ATM cells received from the ATM switch unit 2 per VPI□s value in the received sequence. In first step S1102 after entering this loop of processes, the transmitting sequence changing/restoring unit 21 retrieves the VP corresponding changing pattern data 17 within the storage device 5 wherein the VPI of the received ATM cell serves as an index, and reads the wiretap preventing status flag from the management area L corresponding to this VPI.

In next step S1103, the transmitting sequence changing/restoring unit 21 checks the wiretap preventing function flag. Then, if the flag indicates the ineffective state, the transmitting sequence changing/restoring unit 21 advances the processing to S1111. Whereas if the flag indicates the effective state is indicated, the transmitting sequence changing/restoring unit 21 retrieves in S1104 the ATM cell transmitting counter 19 of the storage device 5 wherein the VPI of the processing target ATM cell serves as an index, and specifies a management area M corresponding to this VPI. Then, the transmitting sequence changing/restoring unit 21 reads a number-of-storage-completed-ATM-cells (a counter value) from the specified management area M. A counter initial value is "0".

In next step S1105, the transmitting sequence changing/restoring unit 21 checks whether the counter value read in S1102 is "0" or not. Then, if the counter value is not "0", the processing proceeds to S1107. Whereas if the counter value is "0", the processing proceeds to S1106.

In S1106, the transmitting sequence changing/restoring unit 21 generates the synchronous cell having the same VPI as that of the processing target ATM cell. Then, the transmitting sequence changing/restoring unit 21 retrieves the transmitting/receiving ATM cell storage buffer 18 within the storage device 5 with this VPI serving as an index, and reads a head address of the storage area in the transmitting sub-buffer 18a which corresponds to this VPI. Then, the generated synchronous cell is stored in the head location of the storage area in the transmitting sub-buffer 18a which is specified with the read head address serving as an index. Thereafter, the transmitting sequence changing/restoring unit 21 makes the processing proceed to S1107.

In S1107, the transmitting sequence changing/restoring unit 21 sets the counter value read in S1104 as being designated by i. The transmitting sequence changing/restoring unit 21 reads a content of the sequence changing pattern column from the management area L within the VP corresponding changing pattern data 17 which is specified in S1102. Then, the transmitting sequence changing/restoring unit 21 reads the ATM cell number j written in the i-th entry in this sequence changing pattern column. Next, the transmitting sequence changing/restoring unit 21 retrieves the transmitting/receiving ATM cell storage buffer 18 in the storage device 5 wherein the VPI of the processing target ATM cell serves as an index, and reads the head address of the storage area within the transmitting sub-buffer 18a which corresponds to this VPI. Then, the transmitting sequence changing/restoring unit 21 specifies the storage area within the transmitting sub-buffer 18a with the read head address. After the above processes, the transmitting sequence changing/restoring unit 21 stores the j-th storage location in the specified storage area with the processing target ATM cell.

In next step S1108, the transmitting sequence changing/restoring unit 21 increments the number-of-storage-completed-ATM-cells (the counter value) in the management area M specified in S1104.

In next step s11109, the transmitting sequence changing/restoring unit 21 checks whether the counter value after being incremented in S1108 is "4" or not. Then, if the counter value is not "4", the transmitting sequence changing/restoring unit 21 diverts the processing to S1112 and, whereas if the counter value is "4", advances the processing to S1110.

In S1110, the transmitting sequence changing/restoring unit 21 resets to "0" the number-of-storage-completed-ATM-cells (the counter value) in the management area M specified in S1104. After a completion of the process in S1110, the transmitting sequence changing/restoring unit 21 advances the processing to S1111.

In S1111, the transmitting sequence changing/restoring unit 21, when the processing diverts directly from S1103, transfers the processing target ATM cell to the NNI transmission path control unit 3, and requests transmission. Further, when the processing proceeds from S1110, the transmitting sequence changing/restoring unit 21 reads five ATM cells (the head thereof is the synchronous cell) out of the storage area of the transmitting sub-buffer 18a which has been specified in S1107 sequentially from the head location thereof, then transfers the ATM cells to the NNI transmission path control unit 3, and requests transmission. After a completion of the process in S1111, the transmitting sequence changing/restoring unit 21 checks whether or not the next ATM cell is received from the ATM switch unit 2 in S1112. Then, if the next ATM cell is received, the transmitting sequence changing/restoring unit 21 returns the processing to S1102.

By contrast, if all the ATM cells received from the ATM switch unit 2 have been completely transferred to the NNI transmission path control unit 3 as a result of repeating the loop of processes in S1102 through S1112, the transmitting sequence changing/restoring unit 21 finishes the processing.

The NNI transmission path control unit 3 sends the ATM cells received from the transmitting sequence changing/restoring unit 21 towards the receiving-side ATM network device 330 via the transmission path $L_2$ in the receiving sequence (S45).

The NNI transmission path control unit 3 of the receiving-side ATM network device 330 rewrites the header of the ATM cell received from the transmitting-side ATM network device 310 under the control of the ATM switch control unit 4, and transfers it to the transmitting sequence changing/restoring unit 21. The transmitting sequence changing/restoring unit 21 groups the cell string received from the NNI transmission path control unit 3 on the basis of the synchronous cell, then restores the sequence of the remaining four ATM cells into which the synchronous cell is excluded from each group, and sequentially transfers the cells to the ATM switch unit 2 (S46).

Figure 42:
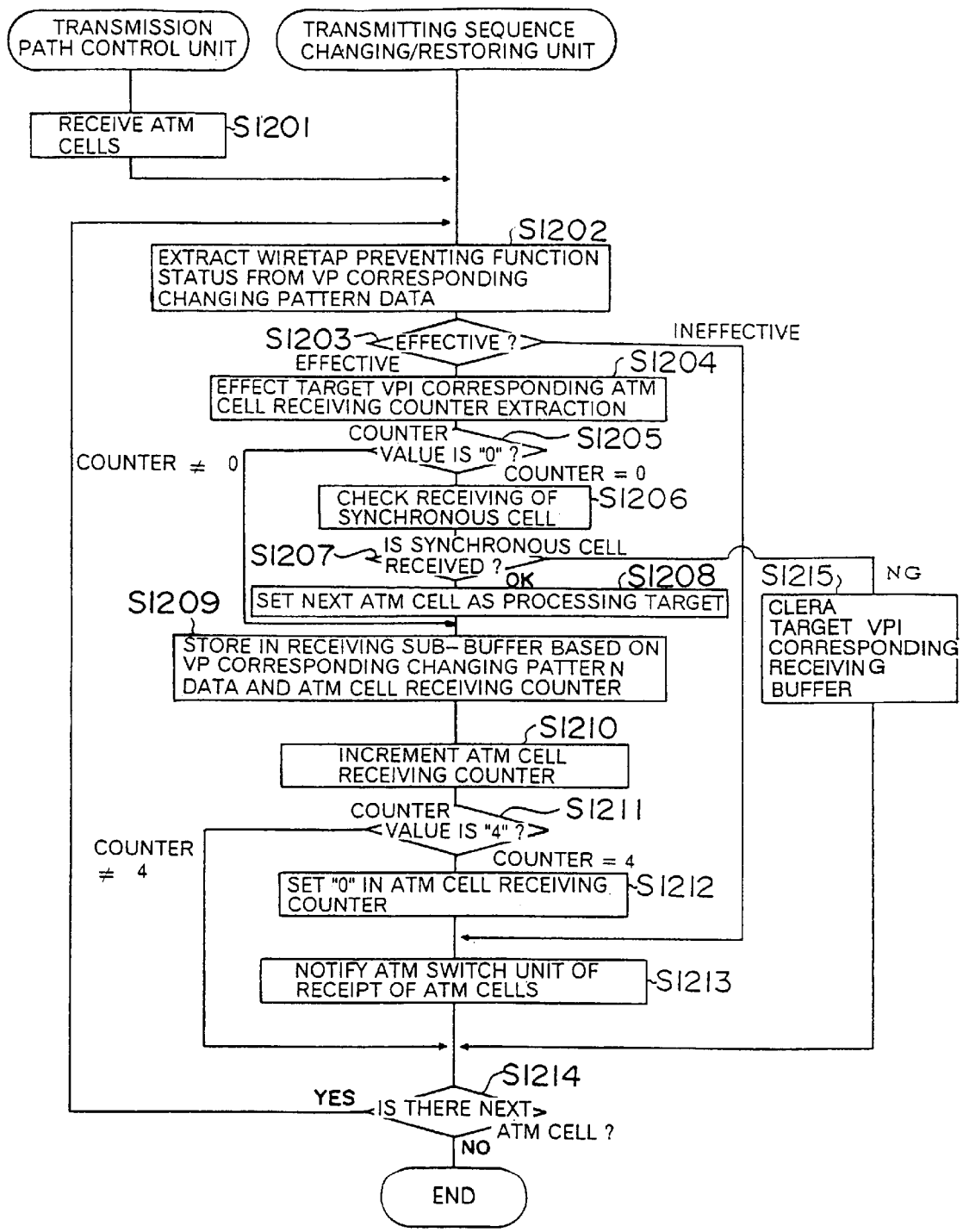
FIG. 42 is a flowchart showing a process of the receiving-side ATM node when restoring the sequence of ATM cells according to the sixth embodiment.
Figure 43:
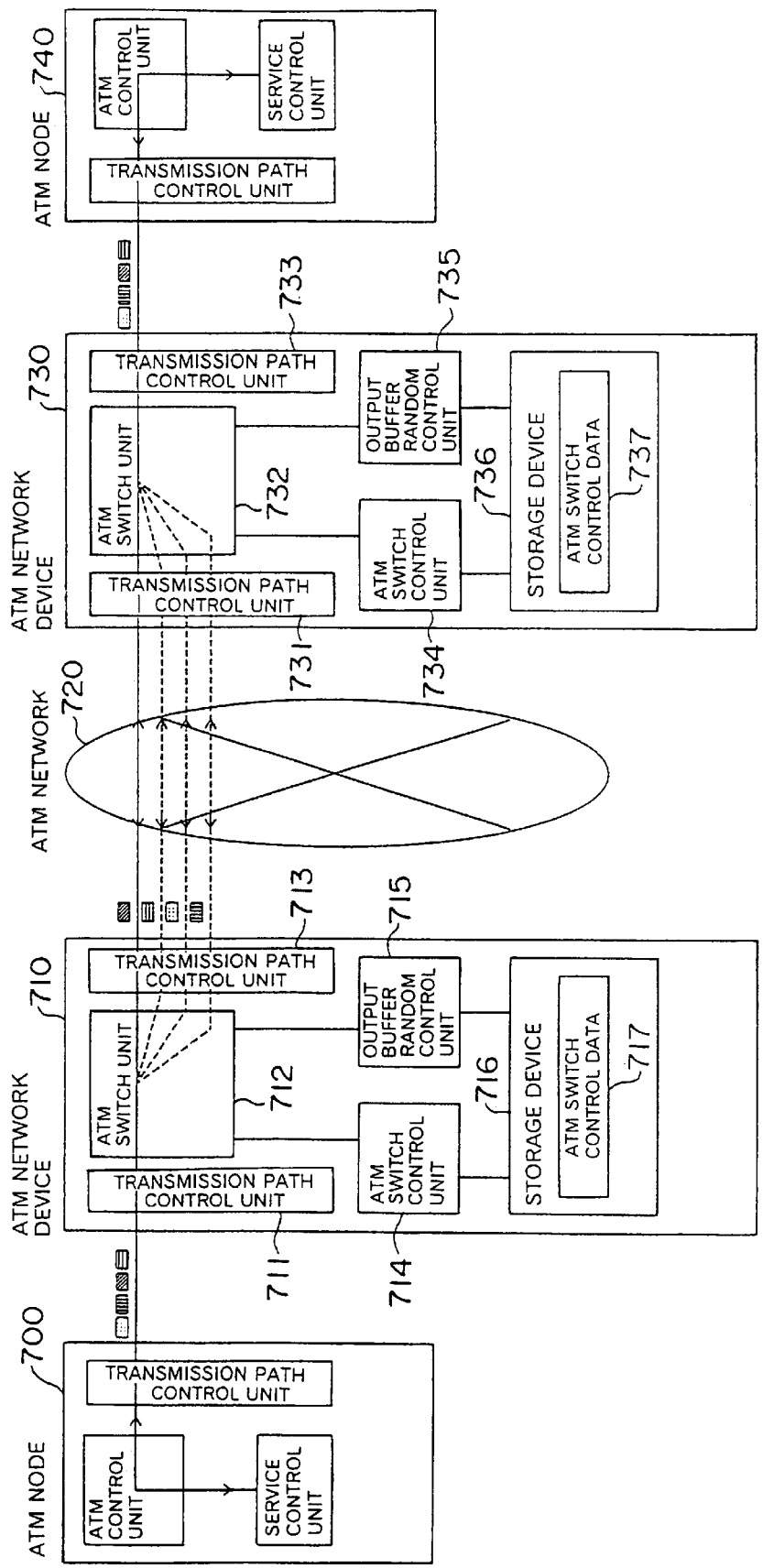
FIG. 43 is a block diagram showing a construction of the conventional ATM network.

FIG. 42 is a flowchart showing a flow of specific processed executed in the receiving-side ATM network device 330 in order to restore the sequence. According to this flowchart, the NNI transmission control unit 3, when receiving the ATM cell stored with the information given from the receiving-side ATM network device 330 in S1201, transfers the received ATM cell to the transmitting sequence changing/restoring unit 21.

The transmitting sequence changing/restoring unit 21 executes a loop of processes in S1202 through S1215 on each of the ATM cells received from the NNI transmission path control unit 3 in sequence of their having been received from the NNI transmission path control unit 3. In first step S1202 after entering this loop of processes, the transmitting sequence changing/restoring unit 21 retrieves the VP corresponding changing pattern data 17 within the storage device 5 wherein the VPI of the received ATM cell serves as an index, and reads the wiretap preventing status flag from the management area L corresponding to this VPI.

In next step S1203, the transmitting sequence changing/restoring unit 21 checks the wiretap preventing status flag. Then, if the flag indicates the ineffective state, the transmitting sequence changing/restoring unit 21 advances the processing to S1213. Whereas if the flag indicates the effective state, the transmitting sequence changing/restoring unit 21 retrieves in S1204 the ATM cell receiving counter 20 of the storage device 5 wherein the VPI of the processing target ATM cell serves as an index, and specifies a management area N corresponding to this VPI. Then, the transmitting sequence changing/restoring unit 21 reads a number-of-received-ATM-cells (a counter value) from the specified management area N. A counter initial value is "0".

In next step S1205, the transmitting sequence changing/restoring unit 21 checks whether the counter value read in S1204 is "0" or not. Then, if the counter value is not "0", the processing proceeds to S1209. Whereas if the counter value is "0", the processing proceeds to S1206.

In S1206, the transmitting sequence changing/restoring unit 21 checks whether or not the processing target ATM cell received from the transmission path control unit 6 is the synchronous cell.

Then, when judging in S1207 that the processing target ATM cell is not the synchronous cell, the transmitting sequence changing/restoring unit 21 advances the processing to S1215. In S1215, the transmitting sequence changing/restoring unit 21 retrieves the transmitting/receiving ATM cell storage buffer 18 in the storage device 5 wherein the VPI of the processing target ATM cell serves as an index, and reads the head address of the receiving sub-buffer 18b. Then, the transmitting sequence changing/restoring unit 21 clears the storage area in the receiving sub-buffer 18b which is specified with the read head address. After a completion of the process in S1215, the transmitting sequence changing/restoring unit 21 advances the processing to S1214.

While on the other hand, when judging in S1207 that the processing target ATM cell is the synchronous cell, the transmitting sequence changing/restoring unit 21 discards the processing target synchronous cell, and treats the next ATM cell received from the NNI transmission path control unit 3 as a processing target. After a completion of the process in S1208, the transmitting sequence changing/restoring unit 21 advances the processing to S1209.

In S1209, the transmitting sequence changing/restoring unit 21 sets the counter value read in S1204 as being designated by k. Further, the transmitting sequence changing/restoring unit 21 reads a content of the sequence changing pattern column from the management area L within the VP corresponding changing pattern data 17 which is specified in S1202. Then, the transmitting sequence changing/restoring unit 21 specifies the number-of-entries $n_e$ ranging from the head in the sequence changing pattern column to the entry concerned by examining the entry in which the ATM cell number k is written in this sequence changing pattern column. Next, the transmitting sequence changing/restoring unit 21 retrieves the transmitting/receiving ATM cell storage buffer 18 in the storage device 5 wherein the VPI of the processing target ATM cell serves as an index, and reads the head address of the storage area within the receiving sub-buffer 18b which corresponds to this VPI. Then, the transmitting sequence changing/restoring unit 21 specifies the storage area within the receiving sub-buffer 18b with the read head address serving as an index. Subsequently, the transmitting sequence changing/restoring unit 21 stores the $n_e$-th storage location in the specified storage area with the processing target ATM cell.

In next step S1210, the transmitting sequence changing/restoring unit 21 increments the number-of-received-ATM-cells (the counter value) in the management area N specified in S1204.

In next step S1211, the transmitting sequence changing/restoring unit 21 checks whether the counter value after being incremented in S1210 is "4" or not. Then, if the counter value is not "4", the transmitting sequence changing/restoring unit 21 diverts the processing to S1214 and, whereas if the counter value is "4", advances the processing to S1212.

In S1212, the transmitting sequence changing/restoring unit 21 resets to "0" the number-of-received-ATM-cells (the counter value) in the management area N specified in S1204. After a completion of the process in S1212, the transmitting sequence changing/restoring unit 21 advances the processing to S1213.

In S1213, the transmitting sequence changing/restoring unit 21, when the processing diverts directly from S1203, transfers the processing target ATM cell to the ATM switch unit 2, and requests transmission. Further, when the processing proceeds from S1212, the transmitting sequence changing/restoring unit 21 reads four ATM cells out of the storage area of the receiving sub-buffer 18b which has been specified in S1209 sequentially from the head location thereof, then transfers the ATM cells to the ATM switch unit 2, and requests transmission. After a completion of the process in S1213, the transmitting sequence changing/restoring unit 21 checks whether or not the next ATM cell is received from the NNI transmission path control unit 3 in S1214. Then, if the next ATM cell is received, the transmitting sequence changing/restoring unit 21 returns the processing to S1202.

By contrast, if all the ATM cells received from the NNI transmission path control unit 3 have been completely transferred to the ATM switch unit 2 as a result of repeating the loop of processes in S1202 through S1215, the transmitting sequence changing/restoring unit 21 finishes the processing.

The ATM switch unit 2 switches the sent ATM cells in accordance with the routing information added to the header thereof, and sends the ATM cells to any one of the UNI transmission path control units 1 (S46). The UNI transmission path control unit 1 rewrites the header of the ATM cells thus received from the ATM switch unit 2 under the control of the ATM switch control unit 4. Then, the ATM cells are, per VPI/VCI after being rewritten, sent towards the receiving-side ATM nodes 340, 340 corresponding to the VPI/VCI in the receiving sequence (S48).

The respective receiving-side ATM nodes 340, 340, when receiving the ATM cells from the receiving-side ATM network devices 330, 330, reproduce the transmitting target information by connecting the contents of the payload fields of the received ATM cells, and transmits the reproduced transmitting target information to the receiving terminal (S49).

In accordance with the thus constructed sixth embodiment, as compared with the second embodiment discussed above, the sequence of the ATM cells is changed between the ATM network devices 310, 330 on each ATM virtual path (VPI) on the whole. Accordingly, the processing load of the transmitting sequence changing/restoring unit 21 can be reduced, and the respective items of data 17–20 may be enough if prepared on the unit of VPI, whereby a small quantity of data might suffice.

Note that the ATM virtual channel for transferring the ATM cells is set as the SVC (Switched Virtual Channel) in each of the embodiments discussed above, however, the wiretap preventing function may be provided for an ATM virtual channel set as a PVC.

According to the thus constructed wiretap preventing system and communication device in the ATM network system of the present invention, the prevention of the wiretap can be actualized without using other ATM virtual channels in addition to the ATM virtual channel essentially used for transmitting the information.

A wide range of different working modes can be formed based on the present invention without deviating from the spirit and scope of the present invention. The present invention, therefore, is not restricted by its specific working modes except being limited by the appended charges.

The present invention is not limited to the embodiments described above, but also encompasses variations thereof.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A wiretap preventing system between a transmitting-side communication device for transmitting ATM cells and a receiving-side communication device for receiving the ATM cells, said transmitting-side communication device comprising:
a receiving unit for sequentially receiving ATM cells each stored with transmitting target information in a segmented state;
synchronous cell inserting means for inserting a synchronous cell in a string of the ATM cells received by said receiving unit at an interval of a predetermined number of ATM cells;
sequence changing means for changing, in accordance with a predetermined pattern, a sequence of the predetermined number of ATM cells interposed between the synchronous cells inserted by said synchronous cell inserting means; and
a transmitting unit for transmitting, towards said receiving-side communication device, the string of ATM cells the sequence of which has been changed by said sequence changing means, and said receiving-side communication device comprising:
a receiving unit for sequentially receiving the ATM cells transmitted from said transmitting-side communication device; and
sequence restoring means for restoring, tracing back the predetermined pattern, the sequence of the predetermined number of ATM cells interposed between the synchronous cells in the string of ATM cells received by said receiving unit, and discarding the synchronous cells.

2. A transmitting-side communication device comprising:
a receiving unit for sequentially receiving ATM cells each stored with transmitting target information in a segmented state;
synchronous cell inserting means for inserting a synchronous cell in a string of the ATM cells received by said receiving unit at an interval of a predetermined number of ATM cells;
sequence changing means for changing, in accordance with a predetermined pattern, a sequence of the predetermined number of ATM cells interposed between the synchronous cells inserted by said synchronous cell inserting means; and
a transmitting unit for transmitting, towards a receiving-side communication device, the string of ATM cells the sequence of which has been changed by said sequence changing means.

3. A wiretap preventing system between a transmItting-side communication device for transmitting ATM cells and a receiving-side communication device for receiving the ATM cells, said transmitting-side communication device comprising:
a receiving unit for receiving data cells defined as the ATM cells each stored with transmitting target information in a segmented state in sequence of data stream of the transmitting target information;
a transmitting buffer including a storage area storable with a single synchronous cell defined as an ATM cell for synchronization and a predetermined number of data cells;
a memory for retaining a predetermined relationship between a storage location and a storage sequence from a point of time when starting a storing operation;
storing means for storing, when starting the storing operation, a predetermined storage location in the storage area with the synchronous cell, and storing the storage area with the data cells received by said receiving unit in a receiving sequence thereof in accordance with the predetermined relationship;
fetching means for fetching the ATM cells stored in the storage area in sequence from a head location in the storage area when said storing means completes the storage of the predetermined number of data cells into the storage area;
notifying means for making said storing means start operating at a point of time when said receiving means receives the data cell at first and when said fetching means completes the fetching of the ATM cell out of the storage area; and
sending means for sending the ATM cells fetched by said fetching means towards said receiving-side communication device in a fetching sequence, and said receiving-side communication device comprising:

a receiving unit for sequentially receiving the ATM cells transmitted from said transmitting-side communication device;

a receiving buffer including a storage area storable with the predetermined number of data cells;

a memory for retaining the predetermined relationship between the storage location and the storage sequence from the point of time when starting the storing operation;

storing means, starting the storing operation when said receiving unit receives the synchronous cell, for storing the data cells received by said receiving unit in the receiving sequence thereof in accordance with a relationship reversal to the predetermined relationship; and fetching means for fetching the ATM cells stored in the storage area in sequence from a head location in the storage area when said storing means completes the storage of the predetermined number of data cells into the storage area.

4. A transmitting-side communication device comprising:

a receiving unit for receiving data cells defined as the ATM cells each stored with transmitting target information in a segmented state in sequence of data stream of the transmitting target information;

a transmitting buffer including a storage area storable with a single synchronous cell defined as an ATM cell for synchronization and a predetermined number of data cells;

a memory for retaining a predetermined relationship between a storage location and a storage sequence from a point of time when starting a storing operation;

storing means for storing, when starting the storing operation, a predetermined storage location in the storage area with the synchronous cell, and storing the storage area with the data cells received by said receiving unit in a receiving sequence thereof in accordance with the predetermined relationship;

fetching means for fetching the ATM cells stored in the storage area in sequence from a head location in the storage area when said storing means completes the storage of the predetermined number of data cells into the storage area;

notifying means for making said storing means start operating at a point of time when said receiving means receives the data cell at first and when said fetching means completes the fetching of the ATM cell out of the storage area; and sending means for sending the ATM cells fetched by said fetching means towards a receiving-side communication device in a fetching sequence.

5. The wiretap preventing system according to claim 1, wherein said transmitting-side communication device is an ATM node including an ATM control unit for dividing the transmitting target information, storing the ATM cell with each of information segments, and transferring these ATM cells to said receiving unit, and wherein said receiving-side communication device is an ATM node including an ATM control unit for reproducing the transmitting target information by connecting in sequence the data stored in the data cells the sequence of which has been restored by said sequence restoring means.

6. The wiretap preventing system according to claim 3, wherein said transmitting-side communication device is an ATM node including an ATM control unit for dividing the transmitting target information, storing the ATM cell with each of information segments, and transferring these ATM cells to said receiving unit, and wherein said receiving-side communication device is an ATM node including an ATM control unit for reproducing the transmitting target information by connecting in sequence the data stored in the data cells fetched by said fetching means.

7. The wiretap preventing system according to claim 1, wherein said transmitting-side communication device and said receiving-side communication device are network devices each including an ATM switch unit for switching the ATM cell in accordance with a virtual channel identifier of the ATM cell.

8. The transmitting-side communication device according to claim 2 or 4, further comprising an ATM switch unit for switching the ATM cell in accordance with the virtual channel identifier of the ATM cell.

9. The wiretap preventing system according to claim 1, wherein said sequence changing means changes per ATM virtual channel the sequence of the ATM cells in the ATM virtual channel, and wherein said sequence restoring means restores per ATM virtual channel the sequence of the ATM cells in the ATM virtual channel.

10. The transmitting-side communication device according to claim 2, wherein said sequence changing means changes per ATM virtual channel the sequence of the ATM cells in the ATM virtual channel.

11. The wiretap preventing system according to claim 3, wherein the storage area of said transmitting buffer, the storage area of said receiving buffer and the predetermined relationship, are provided per ATM virtual channel.

12. The transmitting-side communication device according to claim 4, wherein the storage area of said transmitting buffer and the predetermined relationship are provided per ATM virtual channel.

13. The wiretap preventing system according to claim 7, wherein said sequence changing means changes per ATM virtual path the sequence of the ATM cells on the ATM virtual path, and wherein said sequence restoring means restores per ATM virtual path the sequence of the ATM cells on the ATM virtual path.

14. The transmitting-side communication device according to claim 8, wherein said sequence changing means changes per ATM virtual path the sequence of the ATM cells on the ATM virtual path.

15. The wiretap preventing system according to claim 7, wherein the storage area of said transmitting buffer, the storage area of said receiving buffer and the predetermined relationship, are provided per ATM virtual channel.

16. The transmitting-side communication device according to claim 8, wherein the storage area of said transmitting buffer and the predetermined relationship are provided per ATM virtual channel.

17. The wiretap preventing system according to claim 1, wherein said transmitting-side communication device further comprises information adding means for adding information for indicating whether or not said sequence changing means should change the sequence, to the synchronous cell to be inserted in the string of ATM cells by said synchronous cell inserting means, wherein said sequence changing means changes the sequence of ATM cells during only a period beginning from a point of time when said information adding means adds to the asynchronous cell the information purporting that the sequence be changed up to a point of time when said information adding means adds to the synchronous cell the information purporting that the sequence not be changed, and wherein said sequence restoring means restores the sequence of ATM cells during only a period beginning from a point of time when receiving the synchronous cell to which the information purporting that the sequence be changed is added up to a point of time when receiving the synchronous cell to which the information purporting that the sequence not be changed is added.

18. The wiretap preventing system according to claim 1, wherein said sequence changing means is capable of changing the predetermined pattern, wherein said transmitting-side communication device further comprises information adding means for adding information for indicating the change of the predetermined pattern, to the synchronous cell to be inserted in the string of ATM cells by said synchronous cell inserting means, and wherein said sequence restoring means changes the predetermined pattern in accordance with the indication of the information at a point of time when receiving the synchronous cell to which the information for indicating the change of the predetermined pattern is added.

19. A wiretap preventing system between a transmitting-side communication device for transmitting ATM cells and a receiving-side communication device for receiving the ATM cells, said transmitting-side communication device comprising:
a receiving unit for receiving data cells defined as the ATM cells each stored with transmitting target information in a segmented state in sequence of data stream of the transmitting target information;
a transmitting buffer including a synchronous cell storage area storable with a single synchronous cell defined as an ATM cell fro synchronization, and first and second storage areas storable with a predetermined number of data cells;
a memory for retaining a predetermined relationship between a storage location and a storage sequence from a point of time when starting a storing operation;
storing means for storing, when starting the storing operation, the synchronous cell storage area with the synchronous cell and also storing any one of the storage areas with the data cells received by said receiving unit in a receiving sequence thereof in accordance with the predetermined relationship;
fetching means for fetching a single data cell stored in a storage location closer to the head location in the other storage area each time said storing means stores one storage area with the single data cell;
control means for exchanging, at a point of time when said storing means finishes storing said one storing means with the predetermined number of data cells, the storage area in which said storing means executes the storing process with a storage area from which said fetching means executes the fetching process, indicating said fetching means to fetch the synchronous cell, and making said storing means start the storing operation; and
sending means for sending the ATM cells, fetched by said one fetching means, of said storing means towards said receiving-side communication device in a fetching sequence, and said receiving-side communication device comprising:
a receiving unit for sequentially receiving the ATM cells transmitted from said transmitting-side communication device;
a buffer including first and second storage areas storable with the predetermined number of data cells;
a memory for retaining the predetermined relationship between the storage location and the storage sequence from the point of time when starting the storing operation;
storing means, starting the storing operation when said receiving unit receives the synchronous cell, for storing any one of the storage areas with the data cells received by said receiving unit in the receiving sequence thereof in accordance with a relationship reversal to the predetermined relationship;
fetching means for fetching a single data cell stored in a storage location closer to the head location in the other storage area each time said storing means stores one storage area with the single data cell; and
control means for exchanging, at a point of time when said storing means finishes storing said one storing means with the predetermined number of data cells, the storage area in which said storing means executes the storing process with a storage area from which said fetching means executes the fetching process, and making said storing means start the storing operation.

20. A transmitting-side communication device comprising:
a receiving unit for receiving data cells defined as the ATM cells each stored with transmitting target information in a segmented state in sequence of data stream of the transmitting target information;
a transmitting buffer including a synchronous cell storage area storable with a single synchronous cell defined as an ATM cell fro synchronization, and first and second storage areas storable with a predetermined number of data cells;
a memory for retaining a predetermined relationship between a storage location and a storage sequence from a point of time when starting a storing operation;
storing means for storing, when starting the storing operation, the synchronous cell storage area with the synchronous cell and also storing any one of the storage areas with the data cells received by said receiving unit in a receiving sequence thereof in accordance with the predetermined relationship;
fetching means for fetching a single data cell stored in a storage location closer to the head location in the other storage area each time said storing means stores one storage area with the single data cell;
control means for exchanging, at a point of time when said storing means finishes storing said one storing means with the predetermined number of data cells, the storage area in which said storing means executes the storing process with a storage area from which said fetching means executes the fetching process, indicating said fetching means to fetch the synchronous cell, and making said storing means start the storing operation; and
sending means for sending the ATM cells, fetched by said one fetching means, of said storing means towards said receiving-side communication device in a fetching sequence.

* * * * *

UNITED STATES PATENT AND TRADEMARK OFFICE
CERTIFICATE OF CORRECTION

PATENT NO.    : 6,470,015 B1
DATED         : October 22, 2002
INVENTOR(S)   : M. Koga et al.

It is certified that error appears in the above-identified patent and that said Letters Patent is hereby corrected as shown below:

<u>Column 58,</u>
Line 32, currently reads "A wiretap preventing system between a transmItting-" please change the same to read -- A wiretap preventing system between a transmitting- --

<u>Column 60,</u>
Line 10, currently reads "The wiretap preventing system according to claim 1," please change the same to read -- The wiretap preventing system according to claim 1 or 3, --

<u>Column 61,</u>
Line 39, currently reads "defined as an ATM cell fro synchronization, and first" please change the same to read -- defined as an ATM cell for synchronization, and first --

<u>Column 62,</u>
Line 36, currently reads "an ATM cell fro synchronization, and first and second" please change the same to read -- an ATM cell for synchronization, and first and second --

Signed and Sealed this

Eleventh Day of March, 2003

JAMES E. ROGAN
*Director of the United States Patent and Trademark Office*